United States Patent
Krumel

(10) Patent No.: US 8,879,427 B2
(45) Date of Patent: *Nov. 4, 2014

(54) METHODS FOR UPDATING THE CONFIGURATION OF A PROGRAMMABLE PACKET FILTERING DEVICE INCLUDING A DETERMINATION AS TO WHETHER A PACKET IS TO BE JUNKED

(75) Inventor: Andrew K. Krumel, San Jose, CA (US)

(73) Assignee: 802 Systems Inc., Marshall, TX (US)

( * ) Notice: Subject to any disclaimer, the term of this patent is extended or adjusted under 35 U.S.C. 154(b) by 154 days.

This patent is subject to a terminal disclaimer.

(21) Appl. No.: 12/925,655

(22) Filed: Oct. 25, 2010

(65) Prior Publication Data

US 2011/0164533 A1    Jul. 7, 2011

Related U.S. Application Data

(63) Continuation of application No. 09/746,519, filed on Dec. 21, 2000, now Pat. No. 7,031,267, which is a continuation-in-part of application No. 09/611,775, filed on Jul. 7, 2000, now Pat. No. 7,013,482.

(51) Int. Cl.
    *H04L 12/28* (2006.01)
(52) U.S. Cl.
    USPC ............... 370/255; 370/395.21; 370/465
(58) Field of Classification Search
    None
    See application file for complete search history.

(56) References Cited

U.S. PATENT DOCUMENTS

| 5,343,471 A | 8/1994 | Cassagnol | 370/401 |
| 5,426,378 A | 6/1995 | Ong | 326/39 |

(Continued)

FOREIGN PATENT DOCUMENTS

| JP | 09117448 A | 5/1997 |
| WO | WO 96/34479 | 10/1996 |
| WO | WO 99/48303 | 9/1999 |
| WO | WO 00/02114 | 1/2000 |

OTHER PUBLICATIONS

"Baseband Specification Part B", Bluetooth Spec. v. 1.1, Edited by Henrik Hedlund in conjunction with Bluetooth.org, Feb. 2001, Available from Internet: http://www.bluetooth.com/developer/specification/core.asp, pp. 41-46.

(Continued)

Primary Examiner — Donald Mills
(74) Attorney, Agent, or Firm — Loudermilk & Associates

(57) ABSTRACT

Methods and systems for a PLD-based network update transport (PNUT) protocol that utilizes UDP and other protocols for transmitting update or other commands or information over a packet-based or IP network. PNUT is a hardware-based network communication protocol that does not require the full TCP/IP stack and may be utilized for exchanging commands and information with such PLD-based and other devices. Protocols may include a set of core commands and a set of custom commands. Logic components within the PLD-based devices may consist of a command dispatcher, a transmitter/controller, a MAC receiver, a MAC transmitter, a packet parser, a packet generator, and core receiving and transmitting commands. The present invention may be implemented without requiring CPU cores, special controllers, stringent timings, or operating systems as compared with conventional network protocols. Various methods for exchanging and updating PNUT commands are disclosed. The methods and systems of the present invention may be utilized to provide other functions, such as filtering, logging, polling, testing, debugging, and monitoring, and may be implemented between a server and a PLD-based device or solely between PLD-based devices.

30 Claims, 25 Drawing Sheets

(56) References Cited

U.S. PATENT DOCUMENTS

| | | | |
|---|---|---|---|
| 5,426,379 A | 6/1995 | Trimberger | 326/39 |
| 5,473,607 A * | 12/1995 | Hausman et al. | 370/392 |
| 5,530,695 A | 6/1996 | Dighe | 370/232 |
| 5,590,060 A | 12/1996 | Granville | 702/155 |
| 5,657,316 A | 8/1997 | Nakagaki | 370/394 |
| 5,740,375 A | 4/1998 | Dunne et al. | 395/200.68 |
| 5,745,229 A | 4/1998 | Jung | 356/73 |
| 5,794,033 A | 8/1998 | Aldebert et al. | 395/653 |
| 5,835,726 A | 11/1998 | Shwed et al. | 395/200.59 |
| 5,884,025 A | 3/1999 | Baehr et al. | 395/187.01 |
| 5,903,566 A | 5/1999 | Flammer | 370/406 |
| 5,905,859 A | 5/1999 | Holloway | 713/201 |
| 5,909,686 A * | 6/1999 | Muller et al. | 1/1 |
| 5,968,176 A | 10/1999 | Nessett et al. | 713/201 |
| 5,974,547 A | 10/1999 | Klimenko | 713/2 |
| 6,003,133 A | 12/1999 | Moughanni et al. | 713/200 |
| 6,009,475 A | 12/1999 | Shrader | 709/249 |
| 6,011,797 A | 1/2000 | Sugawara | 370/395.51 |
| 6,020,758 A | 2/2000 | Patel | 326/40 |
| 6,049,222 A | 4/2000 | Lawmann | 326/38 |
| 6,052,785 A | 4/2000 | Lin | 709/225 |
| 6,052,788 A | 4/2000 | Wesinger | 713/201 |
| 6,076,168 A | 6/2000 | Fiveash | 713/201 |
| 6,078,736 A | 6/2000 | Guccione | 395/500.17 |
| 6,092,108 A | 7/2000 | DiPlacido | 709/224 |
| 6,092,123 A | 7/2000 | Steffan | 710/8 |
| 6,108,786 A | 8/2000 | Knowlson | 726/11 |
| 6,133,844 A | 10/2000 | Ahne | 340/815.45 |
| 6,134,662 A | 10/2000 | Levy | 713/200 |
| 6,151,625 A | 11/2000 | Swales | 709/218 |
| 6,154,775 A * | 11/2000 | Coss et al. | 709/225 |
| 6,175,839 B1 | 1/2001 | Takao | 715/500 |
| 6,175,902 B1 * | 1/2001 | Runaldue et al. | 711/159 |
| 6,182,225 B1 | 1/2001 | Hagiuda | 713/201 |
| 6,215,769 B1 | 4/2001 | Ghani | 370/230 |
| 6,219,706 B1 | 4/2001 | Fan et al. | 709/225 |
| 6,222,547 B1 | 4/2001 | Schwuttke et al. | 345/419 |
| 6,223,242 B1 | 4/2001 | Sheafor et al. | 710/317 |
| 6,243,815 B1 | 6/2001 | Antur et al. | 726/11 |
| 6,289,013 B1 | 9/2001 | Lakshman et al. | 370/389 |
| 6,310,692 B1 | 10/2001 | Fan | 358/1.14 |
| 6,321,338 B1 | 11/2001 | Porras et al. | 726/25 |
| 6,326,806 B1 | 12/2001 | Fallside | 326/38 |
| 6,333,790 B1 | 12/2001 | Kageyama | 358/1.15 |
| 6,335,935 B2 | 1/2002 | Kadambi | 370/395 |
| 6,343,320 B1 | 1/2002 | Fairchild | 709/224 |
| 6,363,519 B1 | 3/2002 | Levi | 716/16 |
| 6,374,318 B1 | 4/2002 | Hayes | 710/107 |
| 6,389,544 B1 | 5/2002 | Katagiri | 713/300 |
| 6,414,476 B2 | 7/2002 | Yagi | 324/127 |
| 6,430,711 B1 | 8/2002 | Sekizawa | 714/47 |
| 6,549,947 B1 | 4/2003 | Suzuki | 709/229 |
| 6,608,816 B1 | 8/2003 | Nichols | 370/235 |
| 6,628,653 B1 | 9/2003 | Salim | 370/389 |
| 6,640,334 B1 | 10/2003 | Rasmussen | 717/171 |
| 6,691,168 B1 | 2/2004 | Bal | 709/238 |
| 6,700,891 B1 | 3/2004 | Wong | |
| 6,734,985 B1 | 5/2004 | Ochiai | 358/1.15 |
| 6,771,646 B1 | 8/2004 | Sarkissian | 370/392 |
| 6,779,004 B1 | 8/2004 | Zintel | 709/227 |
| 6,791,992 B1 | 9/2004 | Yun | 370/415 |
| 6,990,591 B1 | 1/2006 | Pearson | 726/22 |
| 7,031,267 B2 * | 4/2006 | Krumel | 370/255 |
| 7,421,734 B2 * | 9/2008 | Ormazabal et al. | 726/11 |
| 7,499,405 B2 * | 3/2009 | Gilfix et al. | 370/241 |
| 2001/0039579 A1 | 11/2001 | Trcka et al. | 709/224 |
| 2006/0146792 A1 * | 7/2006 | Ramachandran et al. | 370/352 |

OTHER PUBLICATIONS

Comer, Douglas, "Internetworking with TCP/IP. vol. 1: Principles, Protocols, and Architectures", 4th Edition, New Jersey: Prentice Hall, 2000, Ch. 7, pp. 95-113, Ch. 12, pp. 197-206.

Feit. Dr. Sidnie, "Architecture, Protocols, and Implementation with IPv6 and IP Security," TCP/IP Signature Edition, San Francisco: McGraw-Hill, Ch. 9: pp. 274-282, Ch. 11 : pp. 432-457, 1999.
"Host Controller Interface Functional Specification, Part H: 1" Edited by Christian Johansson in conjunction with Bluetooth.org., Feb. 2001, Available from Internet: http://www.bluetooth.com/developer/specification/core.asp, pp. 543-550.
"Jini Architecture Specifications." Version 1.1, Sun Microsystems, Inc., Oct. 2000. Available from Internet: http://www.sun.com/jini/specs/jini1_1.pdf, pp. 1-20.
"Jini Device Architecture Specifications." Version 1.1, Sun Microsystems, Inc., Oct. 2000. Available from Internet: http://www.sun.com/jini/specs/devicearch1_1.pdf, pp. 1-14.
"Logical Link Control and Adaptation Protocol Specification." Part D, Edited by Jon Inouye in conjunction with Bluetooth.org., Feb. 2001, Available from Internet: http://www.bluetooth.com/developer/specification/core.asp, pp. 257-260.
Sollins, K., "The TFTP Protocol (Revision 2.0)", MIT, Jul. 1992. Available from Internet: http://www.cis.ohio-state.edu/cgi-bin/rfc/rfc1350.html, pp. 1-10.
Tanenbaum, Andrew S., "Computer Networks", 3rd Edition, Vrije Universiteit, Amsterdam, The Netherlands, pub. New Jersey: Prentice Hall, 1996, 28-44.
Wilder, Floyd, "A Guide to the TCP/IP Protocol Suite", 2nd Edition, Boston: Artech House, 1998, Ch. 3, pp. 123-162.
3Com, "SuperStack 3 Firewall" 2000 3Com.
Hughes, James "A High Speed Firewall Architecture for ATM/OC-3c" Feb. 1996.
IBM Technical Disclosure Bulletins NN8606320 (1986), NN950431 (1995), NA81123528 (1981), NN9704141 (1997), NN9512419 (1995), NN9502341 (1995), NN9308183 (1993), NN8606254 (1986), NN83102393 (1983).
Lakshman, T.V. "High Speed Policy-Based Packet Forwarding Using Efficient Multi-Dimensional Range Matching" 1998 ACM, pp. 203-214.
Network ICE Corp., "Black ICE Pro User's Guide Version 2.0" Jun. 2000 (archive.org).
Packeteer, Inc., "PacketShaper 4000 Getting Started Version 4.0" Mar. 1999.
Symantec, Inc. "Norton Personal Firewall 2000 User's Guide Version 2.0" Jun. 2000 (archive.org).
Xu, Jun and Mukesh Singhal "Design of a High-Performance ATM Firewall" 1999 ACM.
Xu, Jun and Mukesh Singhal, "Design of a High-Performance ATM Firewall" 1998 ACM pp. 93-102.
AARNet, "ATM", <http://www.aarnet.edu.au/engineering/networkdesign/mtu/atm.html>.
Derfler, Jr., Frank J. et al. "How Networks Work" Sep. 2000, pp. 162-167.
Newton, Harry, "Newton's TELECOM Dictionary" 2003 CMP Books, pp. 78-79.
Unknown, "ATM Efficiency" <http://homepages.uel.ac.uk/u0227461/Website/efficiency.htm>.
OfficeConnect Internet Firewall User Guide, 3Com, Feb. 2000, pp. 1-178.
Mogul, Jeffrey C., "Simple and Flexible Datagram Access Controls for Unix-based Gateways", Mar. 1989.
Biodata GmbH, "BIGfire + User Manual", V0306+, 1999.
Excerpts from File History of related U.S. Appl. No. 09/611,775.
Excerpts from File History of related U.S. Appl. No. 11/374,465.
Excerpts from File History of related U.S. Appl. No. 09/745,599.
Excerpts from File History of related U.S. Appl. No. 12/316,129, Abandoned.
Excerpts from File History of related U.S. Appl. No. 09/746,519.
Excerpts from File History of related U.S. Appl. No. 11/405,299.
Excerpts from File History ofrelated U.S. Appl. No. 09/746,107.

* cited by examiner

```
<?xml version = "1.0" encoding = "UTF-8"?>
<formats>
    <msg id = "128" name = "UPDATE_START_CMD">
        <desc> Start PNUT update</desc>
        <byte name = "type" transient = "true" />
        <bytes name = "checksum" size = "2" />
    </msg>
    <msg id = "129" name = "UPDATE_MSG_CMD">
        <desc> PNUT data update packet </desc>
        <bytes name = "packet number" size = "2" />
        <bytes name = "length" size = "2" transient = "true" />
        <bytes name = "data" min_size = "1" max_size = "500"
            transient = "true" max_print = "0" />
    </msg>
    <msg id = "130" name = "UPDATE_LAST_MSG_CMD">
        <desc> Last PNUT update packet </desc>
        <bytes name = "packet number" size = "2" transient = "true" />
        <pad size = "8" />
    </msg>
    <msg id = "132" name = "UPDATE_CNX_CMD">
        <desc> Cancel PNUT update </desc>
        <pad size = "24" />
    </msg>
    <msg id = "136" name = "UPDATE_COMP_CMD">
        <desc> PNUT update complete </desc>
        <bytes name = "status" size = "1" transient = "true">
            <status success = "0">
                <desc val = "0">Successful</desc>
                <desc val = "1">Bad packet checksum</desc>
                <desc val = "2">Flash write failure</desc>
                <desc val = "3">Update cancelled</desc>
            </status>
        </bytes>
        <pad size = "16" />
    </msg>
</formats>
```

FIG.23

METHODS FOR UPDATING THE CONFIGURATION OF A PROGRAMMABLE PACKET FILTERING DEVICE INCLUDING A DETERMINATION AS TO WHETHER A PACKET IS TO BE JUNKED

This application is a continuation of U.S. application Ser. No. 09/746,519, filed Dec. 21, 2000, now U.S. Pat. No. 7,031,267, which is a continuation-in-part of U.S. application Ser. No. 09/611,775, filed Jul. 7, 2000, now U.S. Pat. No. 7,013,482.

FIELD OF THE INVENTION

The present invention relates to systems and methods for hardware-based network communication protocols, and more particularly to PLD-based communication protocols for transmitting, receiving and configuring data across networks, including for use in devices such as data protection systems or firewalls.

BACKGROUND OF THE INVENTION

IP networking generally is based on two models: the OSI Reference Model and the TCP/IP Reference Model. The OSI reference model defines standards and boundaries for establishing protocols so that computer systems may effectively communicate with each other across open networks. As is known in the art, the OSI model is composed of seven layers with each layer corresponding to specific functions. The TCP/IP reference model defines standards for protocols and addressing schemes primarily for packet-switching and routing data packets across the Internet. Both the OSI and TCP/IP models generally require the use of substantial processing resources, such as CPU cores, special controllers, and software-based operating systems in order to implement the network "stack," which not only make implementing heterogeneous networks costly, but also make managing system resources and software difficult.

The present invention provides an alternative to these models and is a logic-based communication protocol, which can enable a wide variety of devices, including FPGA-based security devices, that are connected to packet networks to be updated or to otherwise send or receive commands or information over the packet network. The present invention includes such a PLD-based network update transport protocol, which is often referred to herein as "PNUT". In accordance with preferred embodiments of the present invention, PNUT preferably is a UDP-based protocol designed to allow IP network-based systems to communicate with a variety of networked devices that typically would be unsuited for such communications because they do not include the necessary resources to implement the traditional TCP/IP "stack." Utilizing the PNUT protocol, however, such devices may send and/or receive update or other packets.

The PNUT protocol in accordance with preferred embodiments offers numerous advantages over the traditional OSI- and TCP/IP models, which typically are considered to require a full network protocol stack. A network stack often involves the use of buffers, which temporarily store data for applications. A PLD-based implementation in accordance with the present invention, however, is "stackless" in that it does not require or implement a full network stack. Since some level of buffering may be necessary or desirable, a PLD-based device can extract the data from the bit stream and buffer it to RAM, flip flops or Flash memory. Thus, a PLD-based device implementing a PNUT-type protocol in accordance with the present invention can free up critical system resources, which may normally be occupied by software applications.

Moreover, the PNUT protocol may be used to enable hardware-based products to communicate over Ethernet or other preferably packet-based networks without requiring the use of CPU cores, special controllers, special buses, operating systems, or stringent timings. For example, the PNUT protocol can be implemented across a plurality of bus structures, such as PCI buses, ISA buses, VESA buses, USB ports, infrared ports (e.g., infrared serial data link), cardbuses (e.g., PC cards), etc. The PNUT protocol, therefore, can dramatically reduce the speed and cost of networking PLD-based devices, something that currently poses a barrier to the development of new markets for these devices.

While the present invention will be described in particular detail with respect to PLD-based firewall-type systems, particularly the systems described in co-pending application Ser. No. 09/611,775, filed Jul. 7, 2000 by the inventor hereof for "Real-Time Firewall/Data Protection Systems and Methods," which is hereby incorporate by reference, the present invention also can be used for a wide range of home and office equipment, including pagers, cell phones, VCRs, refrigerators, laptop computers, and security systems. The PNUT protocol also supports a host of functions, such as filtering, updating, logging, polling, testing, debugging, and monitoring. In addition, the present invention addresses many of the common problems with networking these devices, such as cost, speed, robustness, concurrency, versioning, error handling, IP address management, and heterogeneous network computing. The PNUT protocol provides an inexpensive, extensible, and stackless method of network communication between hardware-based home and office equipment.

SUMMARY OF INVENTION

The present invention provides what is referred to herein as a PLD-based network update transport (PNUT) protocol that preferably utilizes UDP or other protocols for transmitting update or other commands or information over a packet-based or IP network. It should be noted that, while particularly useful for updating PLD-type or other devices that do not incorporate or require the full TCP/IP stack, the present invention also may be advantageously utilized for exchanging commands and information that are not for "updating" such a device. As will be appreciated, the use of a PNUT-type protocol in accordance with embodiments of the present invention may be more generally utilized for exchanging commands and information with such PLD-based and other devices. It also should be noted that the present invention is not limited to the use of UDP as a transport layer, although UDP is desirably utilized in preferred embodiments to be explained hereinafter.

The present invention preferably utilizes programmable logic devices to perform, in a particular example, filtering and networking. In other preferred embodiments of the present invention, a PLD-based device, such as a cell phone, PDA, or portable computer, can be updated, debugged, and monitored by using PNUT-type protocols. Protocols in accordance with preferred embodiments preferably contain a set of core commands designed for updating and controlling PLD-based devices, which may be utilized from any suitable operating system. For example, PNUT commands, such as for upgrading an FPGA-based device, may be downloaded from a Java-based update station, which preferably supports Java version 1.1 or greater on a network server. It should be noted that the update station may consist of a plurality of software applications, such as Java, PERL, Python, C-based programs, etc., wherein preferably all of the applications employ socket interfaces. Logic components within the FPGA preferably consist of a command dispatcher, a transmitter/controller, a MAC receiver, a MAC transmitter, and core receiving and transmitting commands. In alternate embodiments of PLD-based devices, logic components may also include a packet parser and packet generator. An application program interface (API) may also be utilized to facilitate the transfer of update or other commands for Java applets that serve as command servers.

Also in accordance with the present invention, devices, methods and systems are provided for the filtering of Internet data packets in real time and without packet buffering. A stateful packet filtering hub is provided in accordance with preferred embodiments of the present invention. The present invention also could be implemented as part of a switch or incorporated into a router, and may use PLD-based communication protocols in accordance with the present invention.

A packet filter is a device that examines network packet headers and related information, and determines whether the packet is allowed into or out of a network. A stateful packet filter, however, extends this concept to include packet data and previous network activity in order to make more intelligent decisions about whether a packet should be allowed into or out of the network. An Ethernet hub is a network device that links multiple network segments together at the medium level (the medium level is just above the physical level, which connects to the network cable), but typically provides no capability for packet-type filtering. As is known, when a hub receives an Ethernet packet on one connection, it forwards the packet to all other links with minimal delay and is accordingly not suitable as a point for making filtering-type decisions. This minimum delay is important since Ethernet networks only work correctly if packets travel between hosts (computers) in a certain amount of time.

In accordance with the present invention, as the data of a packet comes in from one link (port), the packet's electrical signal is reshaped and then transmitted down other links. During this process, however, a filtering decision is made between the time the first bit is received on the incoming port and the time the last bit is transmitted on the outgoing links. During this short interval, a substantial number of filtering rules or checks are performed, resulting in a determination as to whether the packet should or should not be invalidated by the time that the last bit is transmitted. To execute this task, the present invention performs multiple filtering decisions simultaneously: data is received; data is transmitted; and filtering rules are examined in parallel and in real time. For example, on a 100 Mbit/sec Ethernet network, 4 bits are transmitted every 40 nano seconds (at a clock speed of 25 MHz). The present invention makes a filtering decision by performing the rules evaluations simultaneously at the hardware level, preferably with a programmable logic device.

The present invention may employ a variety of networking devices in order to be practical, reliable and efficient. In addition, preferred embodiments of the present invention may include constituent elements of a stateful packet filtering hub, such as microprocessors, controllers, and integrated circuits, in order to perform the real time, packet-filtering, without requiring buffering as with conventional techniques. The present invention preferably is reset, enabled, disabled, configured and/or reconfigured with relatively simple toggles or other physical switches, thereby removing the requirement for a user to be trained in sophisticated computer and network configuration. In accordance with preferred embodiments of the present invention, the system may be controlled and/or configured with simple switch activation(s).

An object of the present invention is to provide methods and protocols for network communications that carry out bit stream transport in real time and without the use of a conventional network stack.

Another object is to provide hardware-based methods and systems for networking to a logic-based device.

It is another object of the present invention is to conduct packet transport without requiring an IP address.

A further object of the present invention is to maintain stateful network transport functions for standard data transmission protocols.

Still a further object of the present invention is to support PLD-based devices so that they may easily update flash-based bit streams and configuration data.

Yet another object of the present invention is to provide a method and system of network communication protocols that do not require CPU cores, special controllers, stringent timings, or operating systems.

Another object is to enable PLD-based devices to communicate over networks without requiring the use of CPU cores, special controllers, stringent timings, or operation systems.

It is another object of the present invention to provide a method and system that is fully compatible with traditional IP programming interfaces, such as sockets.

A further object is to conduct packet transport without requiring a MAC or IP address.

Yet another object of the present invention is to provide a device, method and system for dealing with concurrency, versioning, network latency, and error handling problems that are commonly associated with conventional network devices and applications.

Another object is to enable PLD-based devices to easily and efficiently communicate with networked computer systems and other PLD-based devices.

A further object of the present invention is to make it easier to write programming code without having to address networking problems.

It is another object of the present invention to enable the development of low-cost, extensible networking devices.

The present invention has additional objects relating to the firewall and data protection systems, including in combination with PLD-based communication protocols.

Accordingly, one object of the present invention is to simplify the configuration requirements and filtering tasks of Internet firewall and data protection systems.

Another object is to provide a device, method and system for Internet firewall and data protection that does not require the use of CPU-based systems, operating systems, device drivers, or memory bus architecture to buffer packets and sequentially carry out the filtering tasks.

A further object of the present invention is to perform the filtering tasks of Internet firewall protection through the use of hardware components.

Another object is to utilize programmable logic for filtering tasks.

Still another object is to provide a device, method, and system to carry out bitstream filtering tasks in real time.

Yet another object is to perform parallel filtering, where packet data reception, filtering, and transmission are conducted simultaneously.

A further object of the present invention is to perform the filtering tasks relatively faster than current state-of-the-art, software-based firewall/data protection systems.

Another object is to provide a device, method and system for firewall protection without the use of a buffer or temporary storage area for packet data.

Still another object of the present invention is to design a device, method and system that does not require software networking configurations in order to be operational.

A further object of the present invention is to provide a device, method and system for Internet firewall and data security protection that supports partitioning a network between client and server systems.

It is a yet another object of the present invention to provide a device, method and system for Internet firewall and data protection that supports multiple networking ports.

Another object is to maintain stateful filtering support for standard data transmission protocols on a per port basis.

Still another object of is to configure network functionality using predefined toggles or other types of physical switches.

A further object of the present invention is to conduct packet filtering without requiring a MAC address or IP address to perform packet filtering.

Yet another object of the present invention is to facilitate the shortest time to carry out bitstream filtering tasks.

Finally, it is another object of the present invention to be able to perform filtering rules out of order and without the current state-of-the-art convention of prioritizing the filtering rules serially.

BRIEF DESCRIPTION OF THE DRAWINGS

The present invention may be more fully understood by a description of certain preferred embodiments in conjunction with the attached drawings in which:

FIG. 23 illustrates an exemplary embodiment of the implementation of the data configurations of PNUT-type commands with a standard formatting specification.

DETAILED DESCRIPTION OF THE PREFERRED EMBODIMENTS

The present invention will be described in greater detail with reference to certain preferred and alternative embodiments. As described below, refinements and substitutions of the various embodiments are possible based on the principles and teachings herein.

Figure 1A:
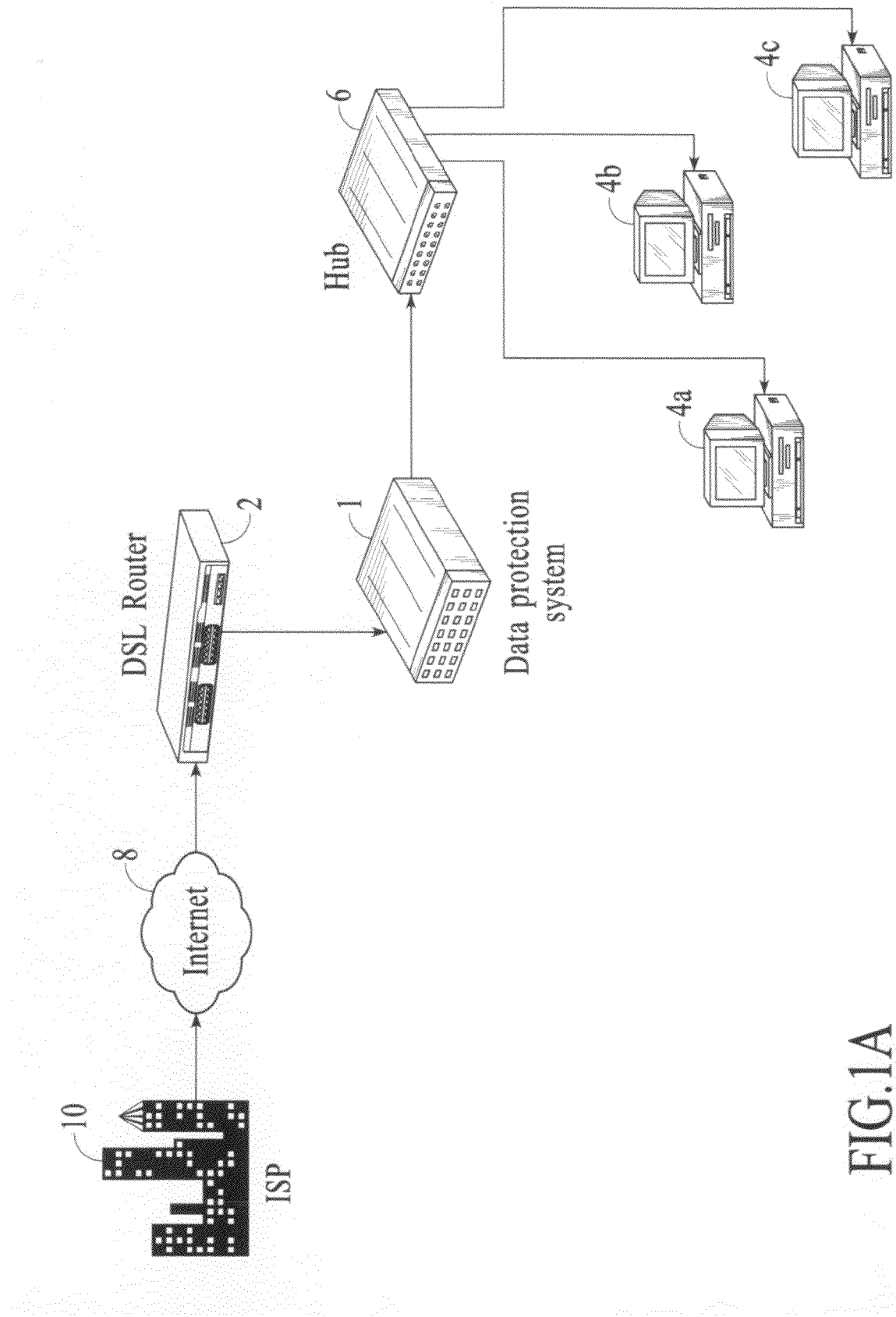
FIGS. 1A and 1B are application level diagrams illustrating exemplary data protection systems in accordance with the present invention.
Figure 1B:
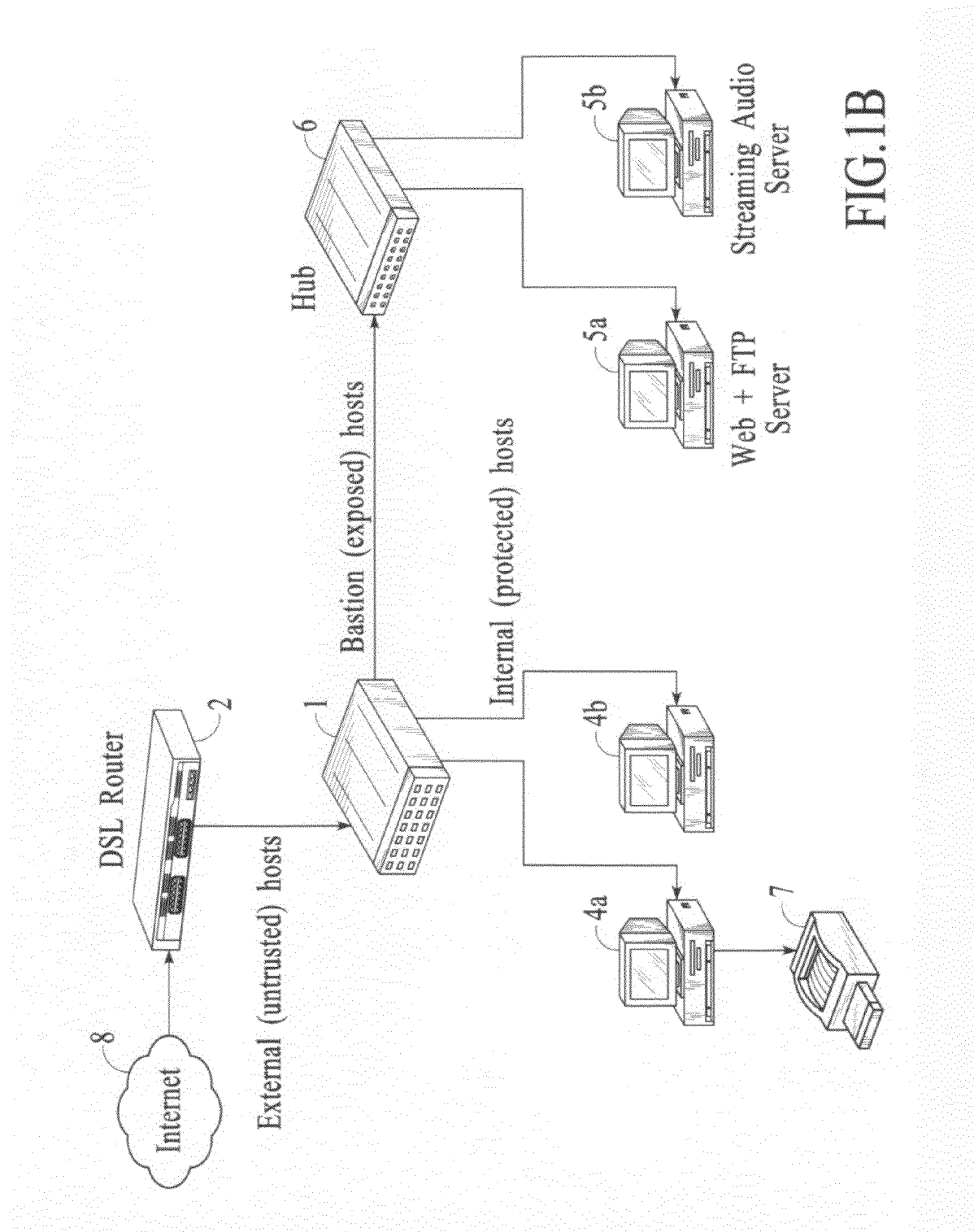

FIG. 1A and FIG. 1B illustrate the physical positioning of a stateful packet filtering hub in accordance with the present invention in two exemplary network configurations. The packet filtering hub of the illustrated embodiments preferably serves as an Internet firewall/data protection system (hereafter "data protection system").

With reference to FIG. 1A, in the illustrated embodiment data protection system 1 is coupled through a port to router 2 (or cable modem or other preferably broadband, persistent network connection access device), which is linked through a broadband connection to other computer systems and networks, exemplified by Internet 8 and Internet Service Provider (ISP) 10. Packets of data are transmitted from an ISP, such as ISP 10, via Internet 8 to router 2. The packets are transmitted to data protection system 1, which analyzes the packets in "real time" and without buffering of the packets, while at the same time beginning the process of transmitting the packet to the internal network(s) in compliance with the timing requirements imposed by the Ethernet or other network standards and protocols. If a packet of data satisfies the criteria of the rules-based filtering performed within data protection system 1, which is executed in a manner to be completed by the time the entire packet has been received by data protection system 1, then it is allowed to pass to hub 6 as a valid packet, which may then relay the cleared packet to computers 4a, 4b, 4c, etc. on the internal network. If a packet of data fails to meet the filtering criteria, then it is not allowed to pass as a valid packet and is "junked." (Junking is defined as changing bits or truncating data, depending on the type of link, in a manner such that the packet is corrupted or otherwise will be detected by the receiving computers as invalid or unacceptable, etc.) Without the intermediate positioning of data protection system 1, the packets would be transmitted directly to unprotected hub 6, thereby exposing computers 4a, 4b and 4c to security risks. It should also be noted that hub 6 is optional in accordance with the present invention; in other embodiments, data protection system 1 may be directly connected to a single computer or may have multiple ports that connect to multiple computers. Similar filtering is performed on packets that are to be transmitted from computers 4a, 4b, and 4c to Internet 8.

With reference to FIG. 1B, in this illustrated embodiment data protection system 1 is coupled via one port to DSL router 2 (again, the network access device is not limited to a DSL router, etc.), which provides the broadband connection to Internet 8. As with the embodiment of FIG. 1A, data protection system 1 also is coupled to a number of computers 4a, 4b, etc., on the internal network, and serves to provide filtering for packets between computers 4a and 4b and Internet 8 in the manner described in connection with FIG. 1A. In this embodiment, data protection system 1 is also connected via another port to hub 6, which serves as the main point of contact for incoming connections from the Internet for bastion hosts 5a and 5b, etc. In accordance with this embodiment, packets are transmitted to router 2 and then to data protection system 1. If the packets are approved by data protection system 1 (i.e., passing the filtering rules/checks performed with data protection system 1 while the packet is being received and transmitted), then the packets are allowed to pass as valid packets to computers 4a, 4b and hub 6. (The rules-based filtering process of preferred embodiments of the present invention will be described in more detail hereinafter.) Hub 6 may relay the packets to other internal host computers 5a, 5b, etc., on the local area network (LAN). These computers may include, for example, a Web and FTP server 5a, or a streaming audio server 5b, etc. Thus, in accordance with the illustrated embodiment, packets that passed the filtering rules/checks are passed as valid packets to computers, such as protected internal host computer 4a, which as illustrated may be connected to printer 7. In this particular embodiment, a bastion port is provided that may be used to service more than one bastion host. In other embodiments, different network configurations may be utilized in accordance with the present invention.

Figure 2:
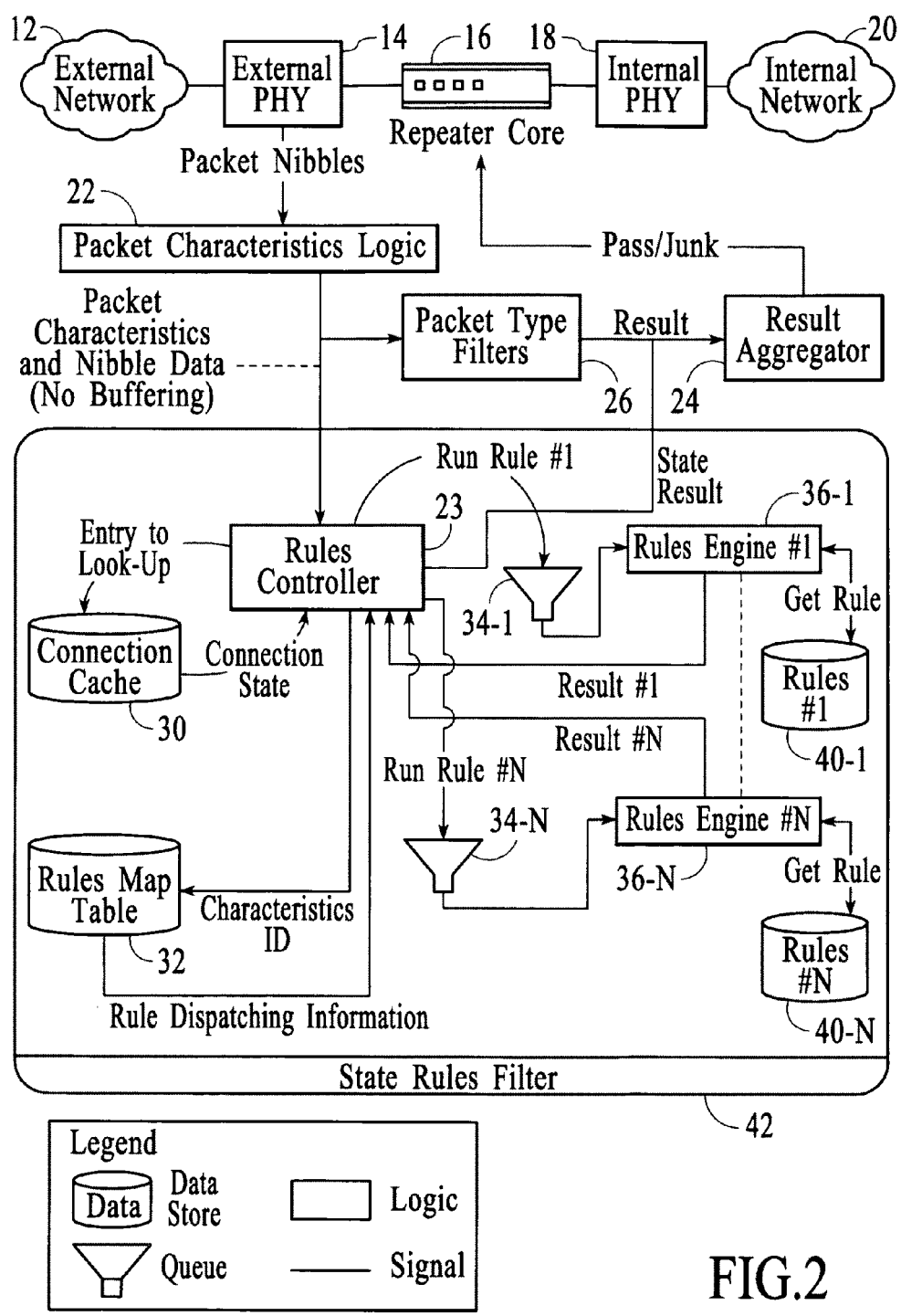
FIG. 2 is a flow diagram illustrating the components and operations of a preferred embodiment of the present invention.

FIG. 2 illustrates the general components and operations of certain preferred embodiments of the present invention. Connection to external network 12 is made by physical interface 14. Physical interface (or PHY) 14 preferably is implemented with commercially available, physical layer interface circuits, as are known in the art (such physical layer interface circuits may be off-the-shelf components, the interface to which is specified in the Ethernet IEEE standard 802.3u.). At a minimum, the data protection system must contain two PHY interfaces: one for the Internet or other external network connection, and one (or more) for the internal network. It should be noted that, in preferred embodiments, PHY controllers are utilized, which implicitly assumes Ethernet-type connections. In other embodiments in accordance with the present invention, other types of PHY interfaces and controllers are utilized for different networking standards.

Repeater core 16 functions as an Ethernet repeater (as defined by the network protocols of the IEEE standard 802.3) and serves to receive packets from external PHY 14, reshape the electrical signals thereof, and transmit the packets to internal PHY 18, which is coupled to internal network 20. While the packet is being received, reshaped, and transmitted between PHYs 14 and 18, however, it is simultaneously being evaluated in parallel with filtering rules to determine if it should be allowed to pass as a valid packet (as will be described in greater detail elsewhere herein). As with the discussion regarding the PHY interfaces and controllers, changes in networking standards may alter the components functionality (such as the characteristics of repeater core 16), but not the basic parallel, real-time packet filtering in accordance with the present invention. (In an alternate embodiment, for example, the data protection system may use switch logic or router logic; in full duplex, the same principles apply.)

The parallel filtering preferably consists of packet characteristics logic 22, packet type filters 26, and state rules filters 42. Packet characteristics logic 22 determines characteristics based on packet data (preferably in the form of 4-bit nibbles from PHY 14), whereas packet type filters 26 make filtering decisions generally based on packet type. State rules filters 42 perform rules-based filtering on several levels simultaneously. The results of filtering by packet type filters 26 and state rules filters 42 are combined by aggregator 24, which may be considered a type of logical operation of pass/fail signals (described in greater detail elsewhere herein). In preferred embodiments, if any one or more of the performed filtering rules indicates that the packet should be failed (or not allowed to pass as a valid packet), then the output of aggregator 24 is a fail; otherwise, the packet is allowed and the output of aggregator 24 is a pass. Thus, as packet data is being received and transmitted from PHY 14 to PHY 18 via repeater core 16, it is being evaluated in parallel via packet type filters 26 and state rules filters 42 (based in part on packet characteristics determined by logic 22 from the data received from PHY 14). In accordance with the present invention, the results of filtering by packet type filters 26 and state rules filters 42 are provided to aggregator 24 by the time that the entire packet reaches repeater core 16, so that, based on the output of aggregator 24, the packet will either be allowed to pass as a valid packet or will be failed and junked as a suspect (or otherwise invalidated) packet.

Packet characteristics logic 22 receives packet data from PHY 14 and examines the packet data to determine characteristics, such as the packet type, datagram boundaries, packet start, packet end, data offset counts, protocols, flags, and receiving port. The packet type may include, for example, what are known in the art as IP, TCP, UDP, ARP, ICMP, or IPX/SPX. Such packet characteristics data is provided to packet type filters 26. Packet type filters 26 preferably make a decision about whether the packet should be passed or failed, with the result being transmitted to aggregator 24. In accordance with preferred embodiments, packet type filters 26 do not require the use of what may be considered an extensible rules system. The filters of packet type filters 26 preferably are expressed as fixed state machines or may be expressed using more flexible rules syntax. What is important is that packet type filtering is performed by filters 26 in the shortest time interval possible and in parallel with the packet data being received and transmitted to internal PHY 18, so that a pass/fail determination may be made prior to the time when the entire packet has been received by repeater core 16.

State rules filters 42 receive packet characteristics data from logic 22 and, based on this data as well as cached/stored connection and communication state information, executes a plurality of rules under the control of rules controller 28, preferably using a plurality of rules engines 36-1 to 36-N, so that a desired set of filtering decisions are promptly made and a pass/fail determination occurs before the entire packet has been received by repeater core 16. State rules filters 42 preserve a cache of information 30 about past network activity (such as IP addresses for established connections, port utilization, and the like), which is used to maintain network connection state information about which hosts have been exchanging packets and what types of packets they have exchanged, etc. Rules controller 28 preferably accesses rules map table 32 based on packet characteristics information, which returns rules dispatch information to rules controller 28. Thus, based on the connection state information stored in connection cache 30 and the characteristics of the packet being examined, rules controller 28 initiates filtering rules via a plurality of rules engines 36-1 to 36-N that simultaneously apply the desired set of filtering rules in parallel. (Preferably, N is determined by the number of rules that need to be performed in the available time and the speed of the particular logic that is used to implement state rules filters 42.)

As will be appreciated, while the packet pass/fail decision is being made in real time, and thus must be concluded by the time that the entire packet has been received, a large of number of filtering rules must be performed quickly and in parallel. Preferably, rules controller 28 utilizes a plurality of rules engines 36-1 to 36-N, which logically apply specific rules retrieved from corresponding storage areas 40-1 to 40-N. Rules controller 28, based on the connection state and packet characteristics, determines which rules should be run based on which information. The rules to be run are then allocated by rules controller 28 to the available rules engines 36-1 to 36-N. As each rules engine 36-1 to 36-N may be required to execute multiple rules in order to complete the filtering decision process in the required time, corresponding queues 34-1 to 34-N are preferably provided. Thus, rules controller 28 determines the list of rules that should be performed (again, based on the stored connection state and packet characteristics data) and provides the list of rules (and accompanying information to carry out those rules) to the plurality of rules engines 36-1 to 36-N via queues 34-1 to 34-N. Rules engines 36-1 to 36-N, based on the information from the queues 34-1 to 34-N, look up specific rule information from storage areas 40-1 to 40-N, carry out the rules, and preferably return the results to rules controller 28. As the rules are essentially conditional logic statements that notify the data protection system how to react to a particular set of logical inputs, it has been determined that providing a plurality of rules engines may enable the necessary decision making process to quickly provide the outcome of the rules-based filtering by the time the entire packet has been received.

Still referring to FIG. 2, rules controller 28 preferably uses rules map table 32 to dispatch the rules to rules engines 36-1 and 36-N, so that a filtering decision may be reached in the optimal amount of time. In a preferred operation, each rules engine extracts a rule ID from its queue, looks up the rules definition in its own rules table 40-1 to 40-N, evaluates the rule, returns the result to rules controller 28, and looks for another rule ID in its queue 34-1 to 34-N. The results from packet type filter 26 and rules controller 28 are combined into one result via aggregator 24: pass or fail. If a decision is not reached before the end of the packet is transmitted, then in preferred embodiments the packet will be processed as an invalid packet and junked.

It should be appreciated that the data protection system must make a filtering determination before the current packet is completely transmitted. Since the networking standards impose strict timing thresholds on the transit delay of packets, filtering is performed in real time, in parallel and without buffering the packet. (The transit delay threshold is the time it takes to get from the transmitting station to the receiving station.) Given that a filtering decision must be made in real time (before the last bit is received and forwarded to the applicable interfaces), the filter rules are evaluated in parallel by rules engines that possess independent, direct access to the rules set collected in storage areas 40-1 and 40-N, which are preferably implemented as RAM tables. (In a preferred embodiment of data protection system 1, the tables are implemented using on-chip, dual port RAM up to 4K in size. A programmable logic device, such as Xilinx Spartan II XC2S100, has 40K dual port synchronous block RAM. For example, an initial 110-bit segment of the rules controller RAM block may be a range table that delineates where each look up code begins and what the number of entries are.) Rules controller 28 dispatches the rules to each rules engine by placing a rules ID entry in a queue. Because each rules engine is assigned its own queue, a pipeline is created allowing the rules engine to continuously run and operate at maximum efficiency.

To operate efficiently the rules engines must also be capable of evaluating rules in any order. In accordance with the preferred embodiments, each rule has a priority and the highest priority result is accepted. Therefore, the rules must be evaluated in any order yet still obtain the same result, as if the rules were being evaluated serially from highest to lowest priority. This operation is accomplished in preferred embodiments by rules map table 32, which notifies rules controller 28 which rule is assigned to which rules engine. Thus, this decision is statically determined based on the rules set and the number of rules engines. It should be noted that the rule set in general is greater than the number of rules engines.

Figure 3:
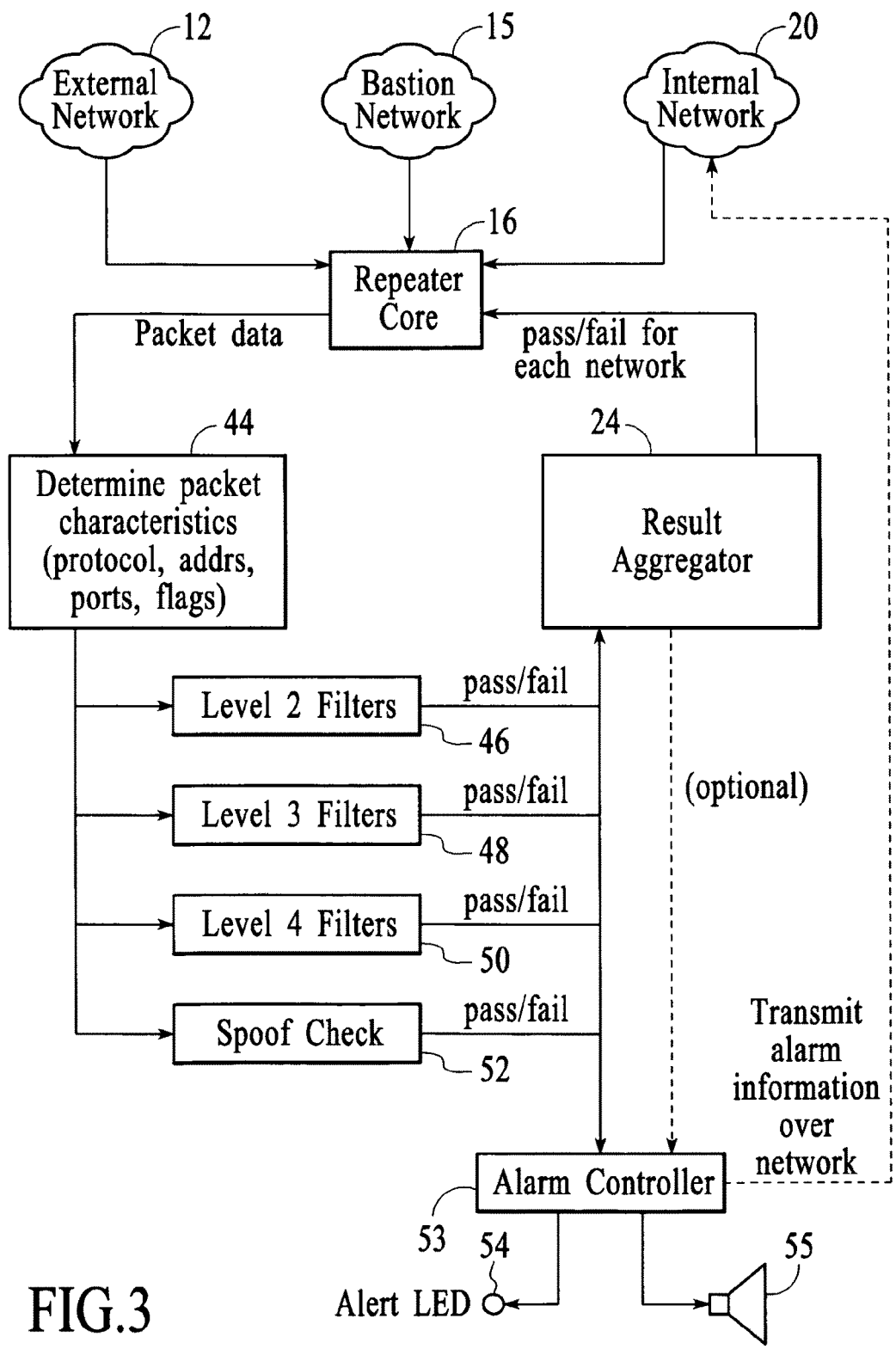
FIG. 3 is a flow chart illustrating the basic functions of a repeater core and four filter levels in accordance with preferred embodiments of the present invention.

FIG. 3 is a flow chart illustrating further aspects of preferred embodiments of the present invention. As previously described, preferred embodiments of the data protection system 1 utilize programmable logic, or other suitable preferably hardware-based logic, to perform a large number of filter rules in parallel and at high speed. Such embodiments may be considered to provide an external interface, for instance, to the Internet, to external network 12, and one or more internal network interfaces, such as to internal network 20 and/or to bastion network 15 (see, for example, FIGS. 1A and 1B). As repeater core 16 (or the PHYs in FIG. 2) receives and transmits packet data, the packet is simultaneously subjected to a plurality of filtering rules. At step 44, the packet characteristics are determined (which, as previously described, may include protocol, addresses, ports, flags, etc.). The filtering rules are based on the packet characteristics, connection state information (depending upon the particular rules), and/or toggle or other physical switch state information. This filtering process may be represented by filtering steps 46, 48, 50 and 52, which, as depicted in FIG. 3, are performed at least in substantial part in parallel, and thus can make filtering decisions by the time the packet has been completely received.

As illustrated, after the packets are transmitted to repeater core 16, their characteristics are analyzed at step 44. Data packets generally consist of several layers of protocols that combine to make a protocol stack. Preferably, each layer of the stack is decoded and the information is passed to various filter blocks, as exemplified in steps 46, 48, 50 and 52. In accordance with the present invention, this filtering process is executed in parallel and in real time. In other embodiments, a variety of filter blocks or rules-based filters may be employed, incorporating parallel execution, real-time filtering, etc., as may be necessary to complete the filtering decision in the required time.

Referring again to preferred embodiments illustrated in FIG. 3, Level 2 filters at step 46 may examine information in the link layer header for all incoming packets and decide whether a packet should be junked based on the packet protocol. While Level 2 filters preferably distinguish the packet type, Level 3 filters at step 48 and Level 4 filters at step 50 preferably distinguish IP datagram characteristics. Level 3 filters at step 48 may examine information in the networking layer headers. (For the IP protocol, these headers would equate to the ARP, RARP, IP, ICMP, and IGMP protocol headers.) Level 4 filters at step 50 preferably operate by examining IP, TCP and UDP headers along with data transmitted between the client and server processes, utilizing two techniques: stateful and non-stateful packet filtering. (Level 2, 3 and 4 filters are described in greater detail elsewhere herein.) Preferably a spoof check filter at step 52 detects whether the packet originated from an authorized IP address or not. To determine whether the packet should be allowed to pass as a valid packet, the filters must implement rules in parallel preferably based on programmable logic and register one of two values: pass or fail. After the values are registered, the outcome is collected in result aggregator 24, which logically combines the results to determine if the packet should be allowed to pass as a valid packet or should be denied as an invalid one. If the packet is passed, then repeater core 16 continues to send correct bits. If the packet is failed, then it is junked.

In accordance with preferred embodiments of the present invention as illustrated in FIG. 3, a spoof check is performed on all packets entering a port at step 52. To prevent IP spoofing, the spoof check filtering of step 52 monitors IP addresses from the internal network and discards any incoming packets with IP source addresses that match internal IP addresses. A spoof check ensures that a host on one network is not trying to impersonate a computer on another network, such as a computer on the Internet assuming the IP address of a computer connected to an internal port. In accordance with preferred embodiments, spoofed packets are always junked by the data protection system. In such embodiments, the data protection system performs this check by keeping track of the IP addresses of packets arriving on the internal and bastion ports. The source and destination addresses of each packet are checked against the known port addresses to ensure they are valid for the appropriate port.

FIG. 3 also illustrates alarm controller 53, which preferably is coupled to result aggregator 24. Alarm controller 53, which could be a separate logic block or within the result aggregator, receives signals indicating when packets are being rejected, either directly from the logic performing the filtering or from result aggregator 24. As described in greater detail elsewhere herein, alarm controller 53 desirably is utilized to provide visual feedback of the system status or operation (such as whether the data protection system is under attack) via LED(s) 54 (or other light source, LCD, or other alphanumeric or graphic display, etc.); alarm controller 53 also may be coupled to an audio feedback device, such as speaker 55, which similarly may be used to provide audio feedback of the system status or operation. For example, if a packet is rejected; a first visual indication may be provided via LED(s) 54 (e.g., yellow light); if packets are being rejected in a manner or at a rate that suggests an internal computer is under attack, then a second visual indication may be provided via LED(s) 54 (e.g., a red light). Similarly, first and second tones or other audible indicators (different tones, volumes, sequences, etc.) may be provided via speaker 55 to indicate the detected condition). In preferred embodiments, such feedback, audio and/or visual, may maintain the alert state until reset by the user, such as by depressing a toggle. Thus, if the internal system has been determined to be under attack while the user is away, this fact will be made known to the user when the user returns and sees and/or hears the visual and/or audio feedback. It also should be noted that alarm controller 53 also may generate a UDP packet (indicated by the dashed line that is coupled to internal network 20) that informs the internal client computer of the attack or suspected attack, thereby providing an additional optional mechanism to inform the user of suspect activity.

Figure 4:
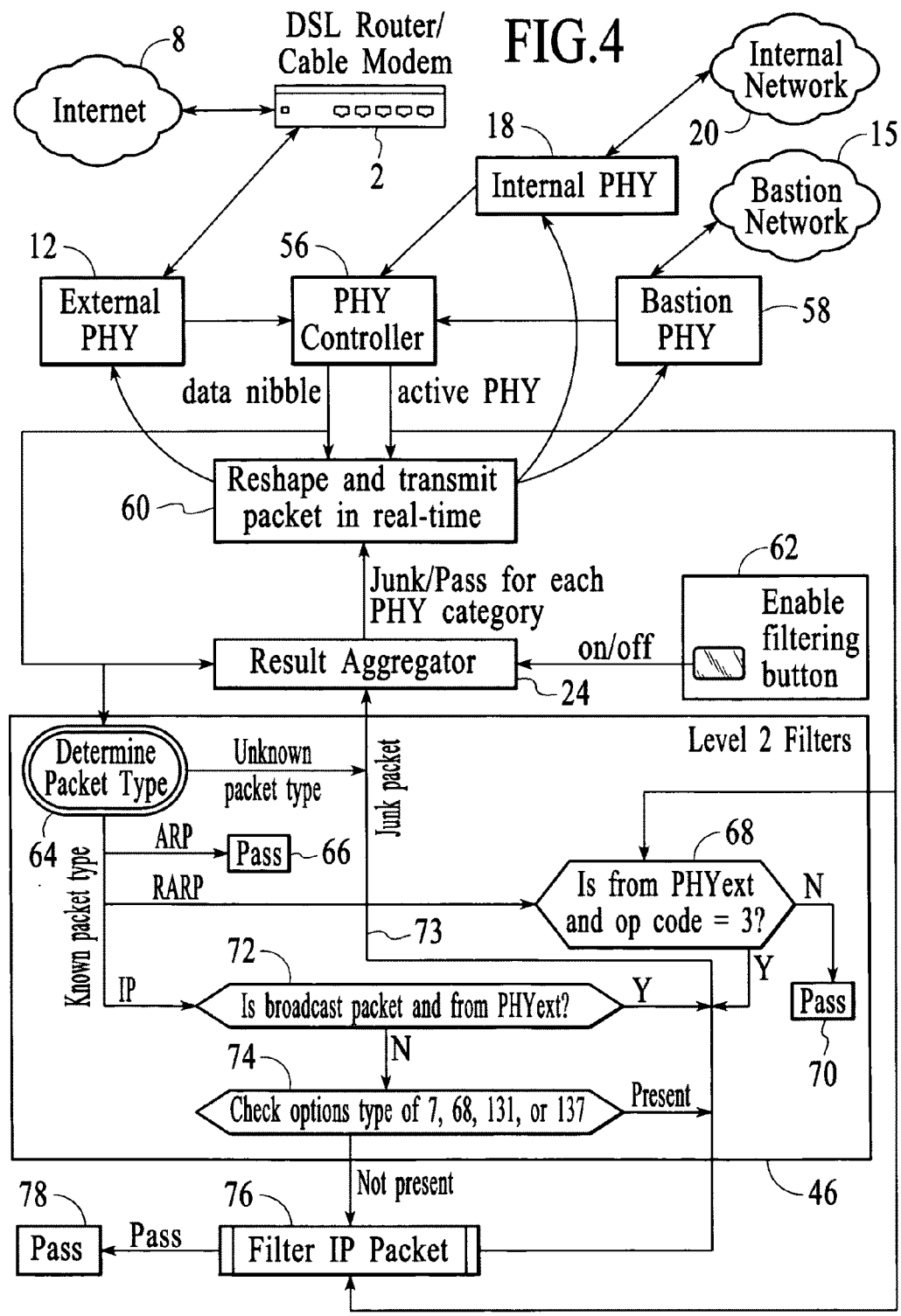
FIG. 4 is a diagram illustrating filtering functions of Level 2 filters in relation to the flow of packet data from internal and external networks in accordance with preferred embodiments of the present invention.

FIG. 4 illustrates exemplary packet filtering functions of Level 2-type filtering in relation to the flow of packet data from internal and external networks. External PHY 12 receives packet electrical signals off the physical wire or other medium. Similarly, internal PHYs 18 and 58 receive packet electrical signals from internal network 20 or bastion network 15, respectively. Packet data comes in from one of PHYs 12, 18 or 58 to PHY controller 56. PHY controller 56 in general receives incoming data from network PHYs 12, 18 or 58, detects collisions, indicates the start and end of packet data, and forwards the packet data to other appropriate components of the data protection system (such as described herein). From PHY controller 56, data from the packet being received, along with information indicating which PHYs are active (i.e., on which PHY a packet is being received and to which PHYs the packet is being transmitted, etc.), and the packet is reshaped and transmitted in real time via block 60 (i.e., the packet is not received into a buffer, after which it is sequentially processed to determine if the packet should be allowed to pass, etc., as in conventional firewalls). In the case of a packet received from Internet 8, the packet is received by PHY controller 56 from external PHY 12, and reshaped and transmitted in real-time to the internal PHY 18 and/or bastion PHY 58.

As will be appreciated, block 60 in essence performs the repeater functionality of passing the incoming data to the non-active PHYs after reformatting the preamble. Block 60 also preferably receives "junk" or "pass" signals from the filtering components and a collision detection signal from PHY controller 56. In preferred embodiments, a "jam" signal is propagated to each PHY upon detection of a collision. A packet is invalidated for all PHYs that belong to a network category that receives a "junk" signal. (For example, if the packet is invalidated for internal networks, then the packet is invalidated for all internal network ports.) Preferably, block 60 also receives a single output signal from result aggregator 24 for each PHY category (i.e., internal or external). As will be explained in greater detail hereinafter, result aggregator 24 generates the signals provided to block 60 based on "junk" or "pass" signals from each filter component.

In accordance with the present invention, the packet is also simultaneously routed through a plurality of filtering steps. In the exemplary illustration of Level 2 filters in FIG. 4, the packet type is determined at step 64. At step 64, the network packet is examined to determine the enclosed Level 3 datagram type, such as ARP, RARP, IP, or IPX. This information is used to perform Level 2 filtering and to decide how to deconstruct the enclosed datagram to perform Level 3 filtering. If an unknown packet type is received from the external network, then the packet preferably is junked if filtering is enabled. Unknown packet types received from the internal network preferably are forwarded to other hosts on the internal network and may be forwarded to the bastion port, but are not forwarded to the external network.

If it is a known packet type, then it is routed through additional filtering steps based on particular packet protocols. In the illustrated embodiment, at step 66, if the packet is an Address Resolution Protocol (ARP) type packet, then it is passed. At step 68, if the packet is a Reverse Address Resolution Protocol (RARP) type packet and is from external PHY 12 and the op code is 3, then it is junked; otherwise, it is passed as indicated at step 70. As is known in the art, RARP generally is a protocol used by diskless workstations to determine their address; in accordance with preferred embodiments, RARP responses are the only RARP packets allowed to enter internal networks from external hosts. At step 72, if the packet is an Internet Protocol (IP) type packet, is from the external PHY and has been broadcast, then it is junked. (For example, broadcast packets from the external network preferably are not allowed; a broadcast packet is determined by examining the IP address or the physical layer address). Otherwise, the process proceeds to step 74. Step 74 preferably examines the IP header, which contains a protocol fragment where an application can place handling options. Certain options (such as the illustrated list) may be considered to provide internal, potentially sensitive network information, and thus packets that contain these options preferably are not allowed into the internal network. At step 74, if a handling option of 7, 68, 131, or 137 is present, then the packet is junked; if these options are not present, then the process proceeds to filter IP packet step 76 (exemplary details of step 76 are explained in greater detail hereinafter). If the packet passes the filtering rules applied in filter IP packet step 76, then the packet is passed, as indicated by step 78. If the packet does not pass the filtering rules applied in filter IP packet step 76, then the packet is junked.

As illustrated in FIG. 4, any signals indicating that the packet should be junked are provided to result aggregator 24, as indicated by line 73. The filtering results are thus routed to result aggregator 24, which records whether any of the packets were junked and thus invalidated. Result aggregator 24 provides one or more signals to the logic of block 60 at a time early enough so that a Frame Check Sequence (FCS) character may be altered to effectively invalidate the packet. Therefore, prior to complete forwarding of the packet, the filtering decision is made and the FCS character is either altered in order to ensure that it is corrupted, if the packet is to be junked, or forwarded unchanged, if the packet is to be passed. In effect, a system in accordance with the present invention acts like a hub or repeater by receiving packet nibbles (2 or 4 bits at a time) on one interface wire and by broadcasting those nibbles on other interfaces. Thus, the data protection system cannot make a decision about a packet before forwarding the nibbles on the non-receiving interfaces since this may result in an inoperable Ethernet network. If the system is enabled to filter a packet, it must still transmit data while receiving data to ensure the Ethernet network functions correctly and efficiently. The data protection system filters packets by transmitting a nibble on the non-receiving interfaces for each collected nibble on the receiving interface, but ensures that the Ethernet packet FCS character is not correct if the packet is suspect. Thus, the sending station may perceive that it successfully transmitted the packet without collision, but in fact all receiving stations will discard the corrupted packet. It should be noted that, in alternative embodiments, in lieu of or in addition to the selective alteration of a FCS or checksum-type value, the data contents of the packet also may be selectively corrupted in order to invalidate packets. In such embodiments, the packet contents are selectively altered to corrupt the packet (e.g., ensure that the checksum is not correct for the forwarded packet data or that the data is otherwise corrupted) if the packet did not pass the filtering rules.

FIG. 4 also illustrates physical switch or toggle 62, the state of which can be used to enable or control packet filtering in accordance with the present invention. The state of switch/toggle 62 is coupled to the data protection system in a manner to enable or disable packet filtering. In the illustrated example, the state of switch/toggle 62 is coupled to the logic of block 60; if, for example, packet filtering is disabled, then block 60 can receive and forward packets while disregarding the output of result aggregator 24 (alternatively, result aggregator 24 can be controlled to always indicate that the packet should not be invalidated, etc.). In other embodiments, the state of such a switch/toggle can control result aggregator 24 or all or part of the particular filtering steps. As will be appreciated in accordance with the present invention, the data protection system may be controlled and configured without requiring the implementation of complex software. The data protection system preferably utilizes toggle buttons or other physical switches to selectively enable various functions, such as Internet client applications, Internet server applications, and filtering features. The system, for example, also may contain a button for retrieving updated core logic or filtering rules from a data source. The data source for such updating of the core logic may include a wide range of forms of digital media, including but not limited to a network server, a floppy disk, hard drive, CD, ZIP disk, and DVD. Configuration, therefore, may be determined by physical interface components attached or linked to the system.

Figure 5:
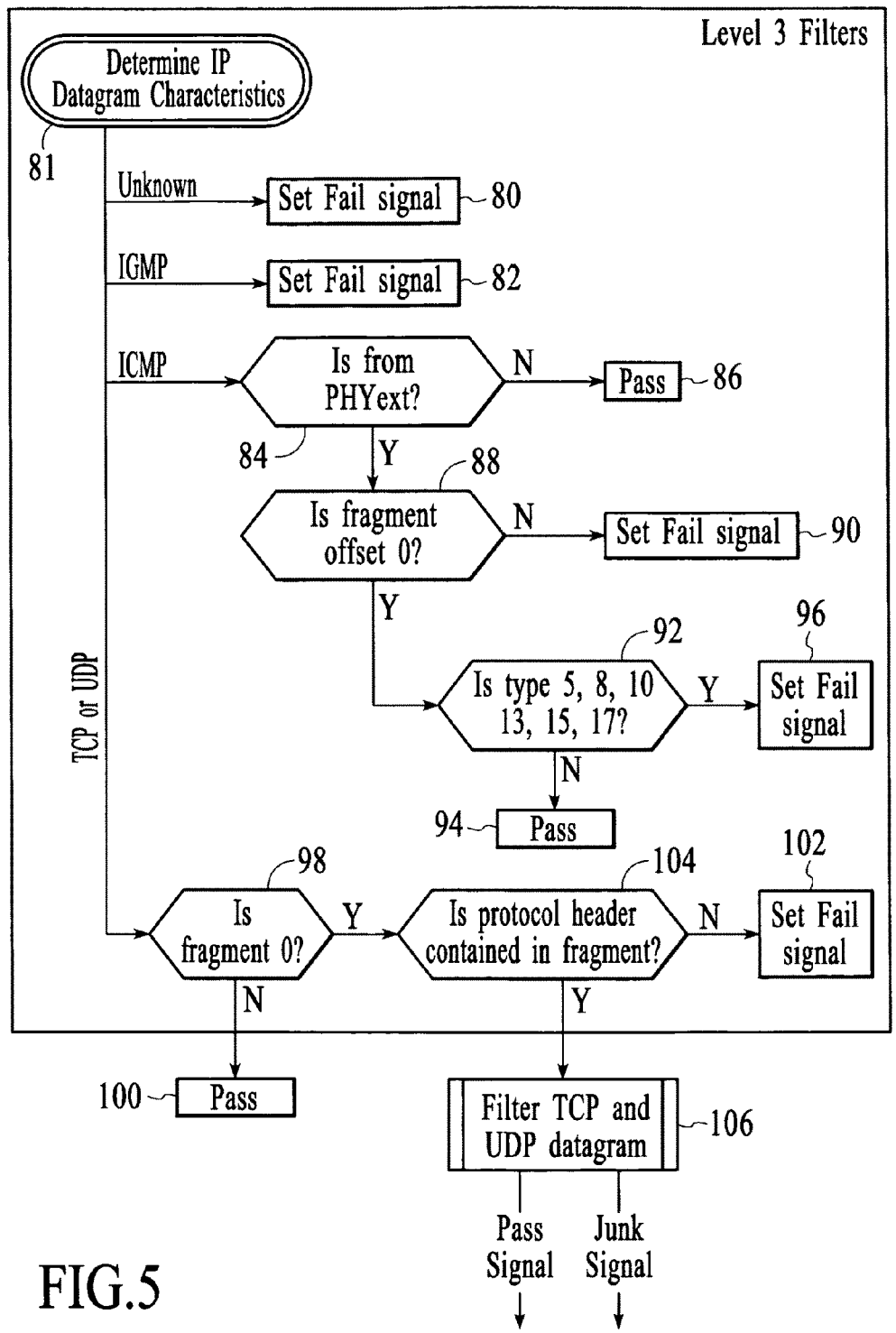
FIG. 5 is a flow chart illustrating packet filtering functions of Level 3 filters in accordance with preferred embodiments of the present invention.

Referring to FIG. 5, additional details of preferred filter IP packet step 76 will now be described. FIG. 5 is a flow chart illustrating the packet filtering functions of the Level 3 filters first illustrated in FIG. 3. At step 81, the Level 3 filtering processes determine the IP datagram characteristics, which preferably include: datagram type (ICMP, IGMP, TCP, UDP, unknown); source and destination IP addresses; fragment offset; and fragment size. Based on the IP datagram characteristics, further filtering operations are performed. Preferred functions for Level 3 filtering will now be described in greater detail.

At step 80, if the IP datagram type is unknown, then the fail signal is set, sending a signal to the result aggregator that the packet should be invalidated. At step 82, if the IP datagram type is Internet Group Management Protocol (IGMP), then the fail signal is set, preventing 'GNU' packets from passing. At step 84, if the type is Internet Control Message Protocol (ICMP) and the packet is from the external PHY, then the filtering proceeds to step 88. At step 84, if the type is ICMP and the packet is not from the external PHY, then the packet is passed as indicated by step 86. At step 88, if the type is ICMP, and the packet is from the external PHY and does not contain a fragment offset of 0, then the fail signal is set, preventing fragmented ICMP packets from passing, as indicated by step 90; otherwise, the filtering proceeds to step 92. At step 92, if the type is ICMP, the packet is from the external PHY and contains a fragment offset of 0, then the packet type is further evaluated for request and exchange data. This data preferably includes one of the following ICMP message types: 5 for redirect; 8 for echo request; 10 for router solicitation; 13 for timestamp request; 15 for information request; or 17 for address mask request. Accordingly, if the packet type satisfies the criteria for step 92, then the fail signal is set as indicated by step 96. Otherwise, the packet is allowed to pass, as indicated by step 94. As will be appreciated, the ICMP filtering branch serves to keep potentially harmful ICMP packets from entering from the external network. (The listed message types represent an exemplary set of ICMP packets that may expose the internal network topology to threats or cause routing table changes.)

If IP datagram characteristics indicate that the packet is a Transmission Control Protocol (TCP) or User Datagram Protocol (UDP) packet, then the filtering proceeds to step 98. At step 98, it is determined whether the packet is a fragment 0 packet. If it is not, then the packet is allowed to pass, as indicated by step 100. This filtering process follows the convention of filtering only the first fragments, as subsequent fragments will be discarded if the first one is not allowed to pass; in other words, the data protection system ignores all but the first packet of a TCP or UDP datagram. At step 104, if the packet is TCP or UDP and is a first fragment packet, then it is determined whether a proper protocol header is included in the fragment; if it is not, then the fail signal is set as indicated by step 102 (in the illustrated embodiment all TCP and UDP packets that have improper headers are junked). If the packet is TCP or UDP, is a first fragment, and a proper protocol header is included in the packet, then the filtering proceeds to step 106 (further exemplary details of which will be described in connection with FIG. 6).

Figure 6:
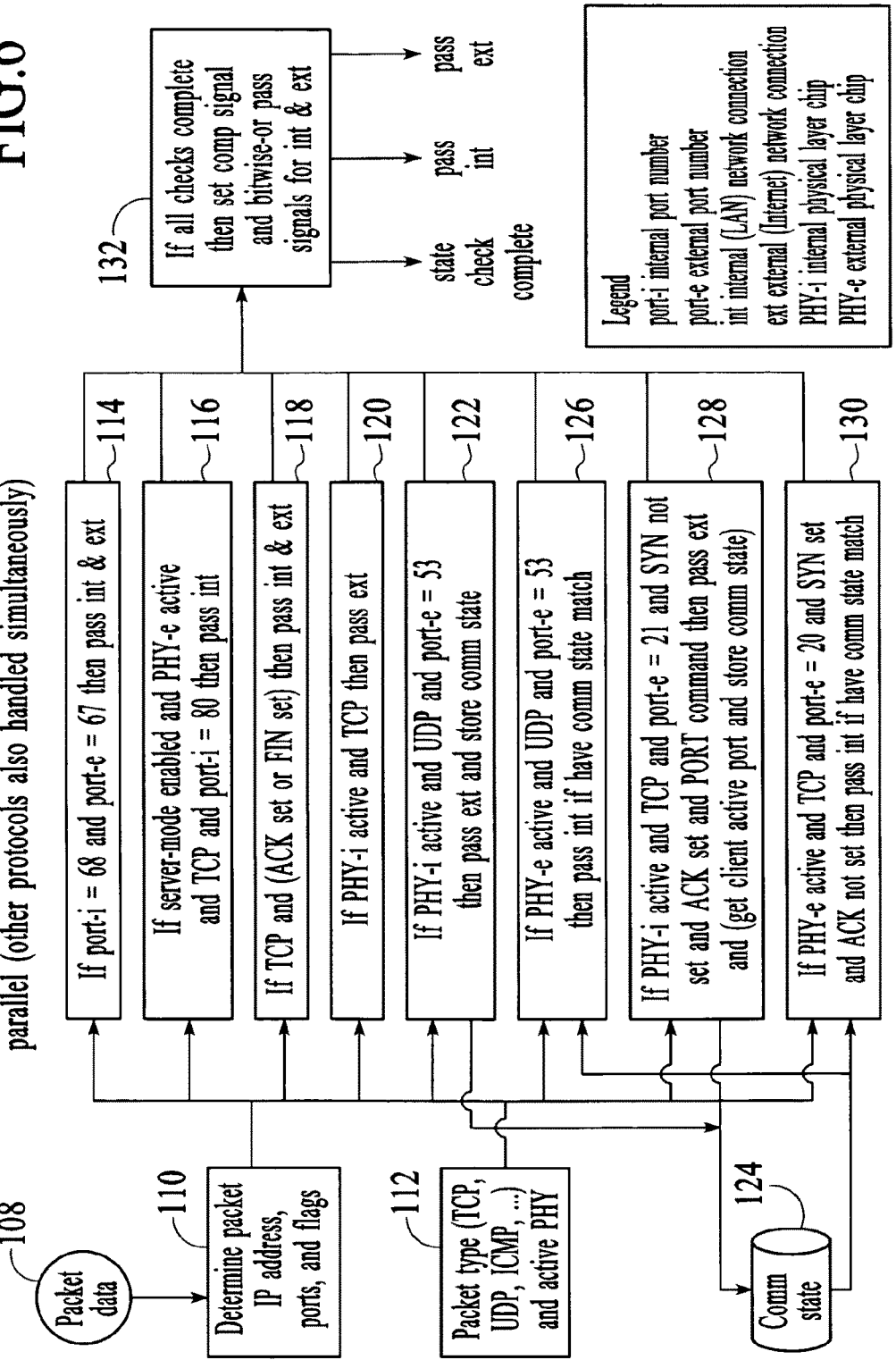
FIG. 6 illustrates the rules by which TCP and UDP packets are evaluated in parallel in accordance with preferred embodiments of the present invention.

FIG. 6 is a flow chart that illustrates a preferred example of how TCP and UDP packets are evaluated in parallel in accordance with the present invention (see, e.g., the multiple rules engines and related discussion in connection with FIG. 2 and the Level 4 filters of FIG. 3). As is known, TCP and UDP are host-to-host protocols located in the Transport Layer of the protocol stack. FIG. 6 illustrates how packet data 108 is unbundled and decoded for packet characteristics at step 110 (e.g., IP addresses, ports, flags, etc.) as well as for packet type and PHY activity at 112 (i.e., whether it is an internally generated packet or an externally generated one). In the preferred embodiments, the packets are evaluated in parallel according to the following rules.

As indicated at step 114, if the internal port number is 68 and the external port number is 67, then the packet is passed, regardless of whether it originated on the internal network or the external network. As indicated at step 116, if the packet type is TCP, the server-mode is enabled (such as may be controlled by a toggle or other physical switch), the external PHY is active, and the internal port number is 80, then the packet is passed to the internal network(s). (The server mode is explained in greater detail in connection with FIG. 7 below). As indicated at step 118, if the packet type is TCP and either the Acknowledge ("ACK") bit or Final ("FIN") bit is set, then the packet is passed, regardless of whether it originated on the internal network or the external network. As indicated at step 120, if the packet type is TCP and an internal PHY is active, then the packet is passed to the external network. As indicated at step 122, if the packet type is UDP, an internal PHY is active, and the external port number is 53, then the packet is passed to the external network and the communication state (e.g., source and destination port numbers) is stored as indicated by comm or communication state store 124. As indicated at step 126, if the packet type is UDP, the external PHY is active and the external port number is 53, then the packet is passed to the internal network(s) if there is a match in the communication state. As indicated at step 128, if the packet type is TCP, an internal PHY is active, the external port number is 21, the Synchronize Sequence Numbers ("SYN") bit is not set but the ACK bit is set, and the packet is a PORT command, then the packet is passed to the external network and the client (internal network) active port is determined and the communication state is stored. As indicated at step 130, if the packet type is TCP, the external PHY is active, the external port number is 20, and the SYN bit is set but the ACK bit is not set, then the packet is passed to the internal network(s) if there is a communication state match. As indicated at step 132, if all checks have been completed, then a complete signal is set, and signals indicative of whether the packet passes to internal or external network(s) as previously described are bitwise logically ORed to generate pass internal and pass external signals, as illustrated. It should be noted that, in preferred embodiments, if the completion signal is not generated by the time that the packet has been completely received, then the packet is junked.

Figure 7:
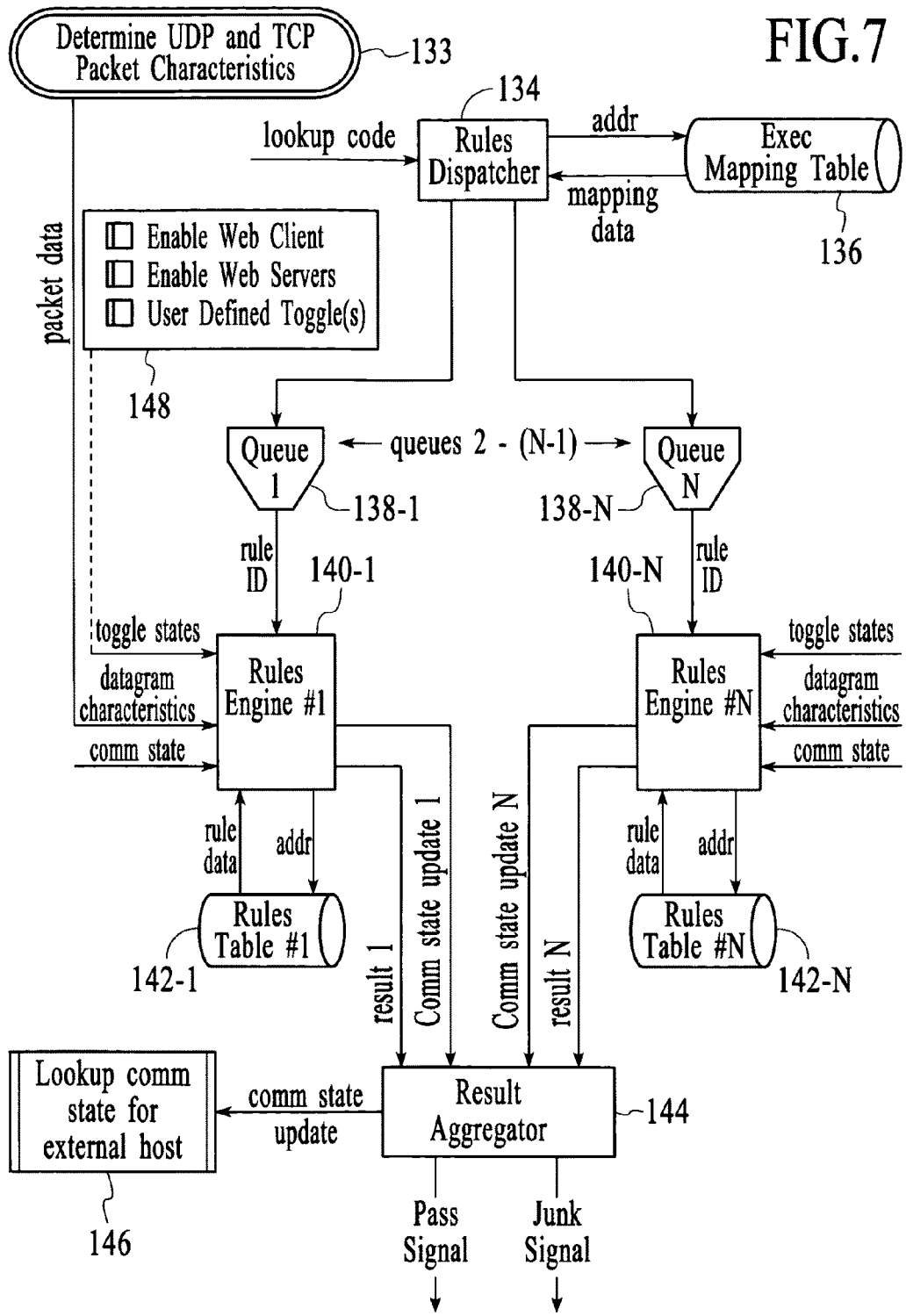
FIG. 7 is a diagram illustrating parallel rule evaluation for TCP and UDP packets in accordance with preferred embodiments of the present invention.

Referring now to FIG. 7, Level 4 filtering in accordance with the present invention will be further described. The embodiment of FIG. 7 is a table-based filter, which uses an approach similar to that described in connection with FIG. 2. This approach preferably utilizes a programmable logic device (PLD) that includes low latency, high-speed ROM and RAM blocks.

As previously described, Level 4 filtering is based on TCP and UDP packet characteristics, the determination of which is illustrated in FIG. 7 by block 133. TCP and UDP characteristics, as noted elsewhere herein, may include not only source and destination port numbers, but also the state of the SYN, ACK, FIN and/or RESET flags in the case of TCP packets. The TCP/UDP characteristics are determined by the TCP/UDP header information. The TCP/UDP characteristics and active PHY information are used in the generation of a lookup code, which in the embodiment of FIG. 7 is coupled to rules dispatcher 134. Rules dispatcher 134 uses a lookup code to determine the filtering rules to be applied to a packet and then places the identifiers of the rules to be run in queues 138-1 to 138-N for each of the rules engines 140-1 to 140-N. Mapping table 136 is coupled to and receives address data from rules dispatcher 134. Mapping table 136 preferably is a ROM block that identifies the rules associated with each lookup code and the rules engine for which each rule is to be dispatched. The mapping data for the rules and rules engines are returned to rules dispatcher 134.

The identifiers of the rules to be run are dispatched by rules dispatcher 134 to the appropriate queues 138-1 to 138-N, which are preferably FIFO-type structures that hold the rule identifiers for corresponding rules engines 140-1 to 140-N. Queues 138-1 to 138-N not only enable rules dispatcher 134 to assign rules at maximum speed, but also allow each rules engine to retrieve rules as each one is evaluated. The rules engines 140-1 to 140-N are a plurality of filtering engines/logic that use a rule table to read a definition specifying whether a rule applies to a packet and whether the packet passes or fails the rule test. Rules tables 142-1 to 142-N preferably are ROM blocks that contain a definition of a set of filtering rules that are controllably run by the rules engines 140-1 to 140-N. Rules tables 142-1 to 142-N may contain different rules as may be appropriate to provide all of the rules necessary to adequately filter packets within the timing constraints imposed by the real-time filtering of the present invention, and the speed of the hardware used to implement the data protection system.

In addition, as illustrated in FIG. 7, rules engines 140-1 to 140-N may receive as inputs signals indicative of a stored communication state, IP datagram characteristics, or physical switch/toggle states. As indicated by block 148, toggles may be utilized for a variety of features, such as enabling web client, web servers or other user-defined features. With at least some of the executed rules based on the stored communication state, stateful rules are implemented with the illustrated embodiment. A communication state table or cache is provided. A cache of communication state information between different hosts provides a set of bits that represent rule defined state information. For example, source and destination port information may be stored in the cache and used for state-dependent filtering.

In the illustrated embodiment, communication state information from rules engines 140-1 to 140-N may be provided to result aggregator 144, which in turn may store the communication state information to the communication state cache or storage area. Result signals, representing pass or fail of the packet based on the applied rules, also are provided to result aggregator 144. Result aggregator 144 combines the pass/fail results signals and provides a pass or junk signal or signals, which may be provided to the repeater core or to another result aggregator.

Figure 8:
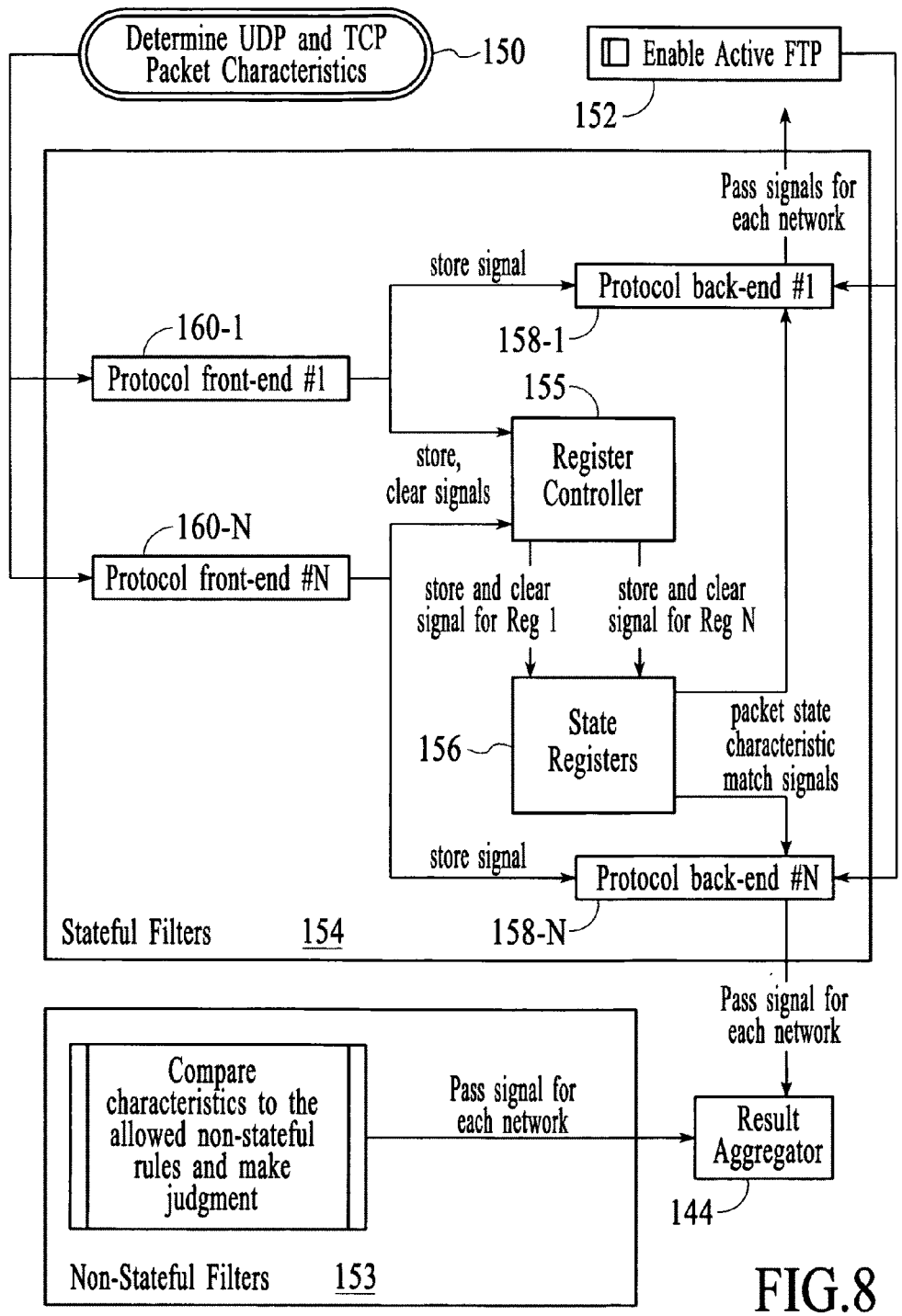
FIG. 8 is a flow chart illustrating packet filtering functions of Level 4 filters in accordance with preferred embodiments of the present invention.

FIG. 8 illustrates an alternative preferred embodiment, in which the Level 4 filtering is implemented with a register-based filtering methodology. As with the Level 4 filtering of FIG. 7, both stateful filters 154 and non-stateful filters 153 may be implemented. As with the embodiment of FIG. 7, Level 4 filtering requires that TCP and UDP packet characteristics be determined, as illustrated by box 150. In addition to the Level 3 packet characteristics, Level 4 filters in accordance with this embodiment also require the source and destination port numbers and the TCP header values for the SYN, RST, FIN flags and the ACK value. This information preferably is used by both non-stateful and stateful filters 153 and 154. The implementation of the non-stateful filters is executed with a state machine or other logic preferably in the PLD that compares characteristics to the allowed non-stateful rules and makes a judgement as to whether the packet should be passed or failed. The non-stateful rules engine/logic uses a set of static rules to decide if a packet is allowed to pass through the firewall. These rules preferably are specified using a combination of control inputs, active PHY, and network packet characteristics.

Stateful filters are implemented to handle communication channel interactions that span multiple transmissions between hosts. The interactions typically occur at the Application Layer of the protocol stack, where examples may include FTP, RealAudio, and DHCP. These interactions may also take place at lower levels in the protocol stack, such as ARP and ICMP request/response.

In this embodiment, stateful filters 154 use protocol front-end and protocol back-end logic, along with a plurality of state registers to implement state-dependent filters. Each protocol that requires stateful packet filtering preferably has protocol handlers in the form of front-end and back-end logic, which decide when to issue a pass signal for a packet or store the identifying characteristics of a bitstream for later reference. Front-end logic 160-1 to 160-N monitors the network traffic to identify when the current communication state needs to be stored, deleted or updated. Front-end logic 160-1 to 160-N informs a corresponding back-end logic 158-1 to 158-N that a register will be allocated for storage for a bitstream. All store and delete state register requests are sent to back-end logic 158-1 to 158-N so it may update its internal information. Register controller 155 controls the actual selection of registers in state registers 156 and informs the corresponding back-end logic 158-1 to 158-N. Back-end logic 158-1 to 158-N monitors which state registers are dedicated to its protocol and issues a pass signal for packets that match an existing bitstream, as indicated by the appropriate packet characteristics and a matching state register. It should be noted that in alternate embodiments, different organizations of the functions of the programmable logic may be implemented in accordance with the present invention, incorporating various types of protocol handlers and state registers, as may be necessary.

Register controller 155 consolidates multiple store and clear signals from the various front-end logic 160-1 to 160-N and directs them to the appropriate registers in state registers 156. Register controller 155 also informs the various back-end logic 158-1 to 158-N which registers of state registers 156 are to be used for storage. The registers of state registers 156, under control of register controller 155, store the communication state of a bitstream; for example, a particular register records information about the two communication ends of the bitstream and also monitors each network packet to see if it matches the stored end-point characteristics. State registers 156 then sets a signal when its state matches the current packet characteristics. A "garbage collection" function also is implemented (as further illustrated in FIG. 13 below) to help free up state registers when the protocol information during the three-way handshake is not accessed within specific time frames.

As is known in the art, many protocols provide a way of identifying the end of a communication session. Accordingly, in preferred embodiments the data protection system detects when a stateful stream ends and frees up the associated state registers. Since clients and servers do not always cleanly terminate a communication session, the system preferably implements session time-outs to free state registers after a period of bitstream activity and to prevent indefinite state register exhaustion. If the network experiences a high rate of bitstreams requiring stateful inspections, the system's resources, which are allocated to tracking application data, can become exhausted. In this case, the system preferably resorts to allowing network traffic based on a set of static rules to pass through the non-stateful rules designed specifically for each protocol. This stateful to non-stateful transition is called "stateful relaxation." To maintain maximum security, a protocol handler that cannot gain access to an open state register will free up all of its state registers to help prevent other protocol handlers from entering into a relaxation state. The system will then wait for a state register to open, start a timer, and record protocol communication data in the state registers, while relying on the static rules. When the timer expires, the state filter will cease relying upon the static rules and approve packets solely on state register information.

FIG. 8 also illustrates toggle 152, which, in the additional illustrated example, selectively enables FTP (File Transfer Protocol) communications based on the switch state. Protocol back-end logic 158-1 to 158-N, as appropriate, utilize such toggle state information to selectively generate the pass/fail signals for the applicable protocols. For example, when the toggle switch is enabled, which is the default mode in most FTP client applications, it may send a signal to the internal FTP server to open a TCP connection to the client. Front-end logic 160-1 monitors the network traffic for data from the internal network, PORT command, source port number (greater than 1024) and destination port number (equal to 21). When this information is matched, front-end logic 160-1 requests state register controller 155 to store both the PORT command IP address and the port number as the destination end and the destination IP address, as well as store port 20 as the source end of a future communication packet. (In other embodiments, additional checks may be conducted to ensure the active connection IP address is the same as the current source IP address.) When back-end logic 158-1 recognizes the storage request, it waits for the allocated state register in state registers 156 to be sent by register controller 155. For example, when the state register number is set as register #1, then it records that register #1 is dedicated to allowing active FTP connections through the data protection system. Back-end logic 158-1 then waits for register #1 to signify that the current packet matches its stored state. When back-end logic 158-1 recognizes that the three-way TCP handshake has been completed for the new connection, it will notify front-end logic 160-1 to delete the state register. If the state register is junked, then back-end logic 158-1 records that register #1 is no longer dedicated to active FTP connections, allowing register controller 155 to allocate that register to a different protocol or network connection in the future.

Figure 9:
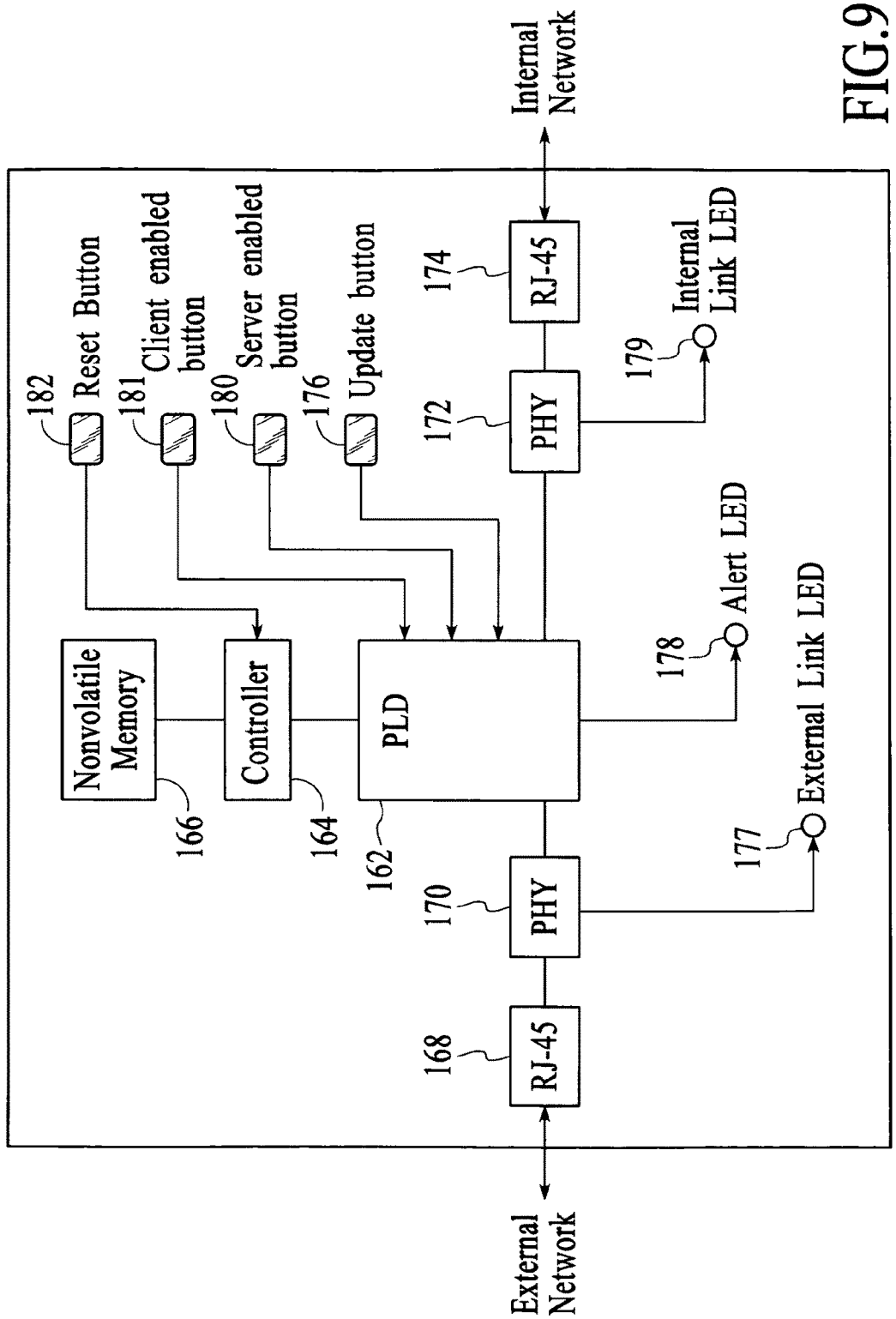
FIG. 9 is a block diagram of the hardware components of a preferred embodiment of the present invention.

FIG. 9 illustrates a preferred physical implementation of one embodiment of the present invention. In this embodiment, one external network connection and one internal network connection are provided. It will be appreciated that the components of FIG. 9 can be altered to implement, for example, bastion network connections, multiple internal network connections, etc.

The Internet connection, for example, via a cable modem, DSL router or other network interface, preferably is coupled with a physical cable to connector 168, which may be an RJ-45 connector. The signals received via connector 168 are coupled to and from PHY 170, which provides the physical interface for the data signals received from, or coupled to, the external network. Signals are coupled between PHY 170 and PLD 162, and signals are coupled between PLD 162 and PHY 172, which couples signals between connector 174 (which again may be an RJ-45 connector). The connection to the internal network may be made through connector 174.

In the preferred embodiment, PLD 162 implements the various levels of filtering as previously described. PLD 162 provides logic/hardware based, parallel filtering rules logic/engines, which make a decision about whether the packet should be allowed to pass or fail prior to the time that the packet is passed on by the repeater core portion of PLD 162 (as described elsewhere herein). The logic of PLD 162 to implement the filtering rules is programmed/loaded by controller 164, which may be a RISC CPU, such as a MIPS, ARM, SuperH-type RISC microprocessor, or the like. The PLD code preferably is stored in memory 166, which preferably is a reprogrammable, non-volatile memory, such as FLASH or EPROM. In this manner, the PLD code may be updated by reprogramming memory 166, and the updated PLD code may then be programmed/loaded in to PLD 162 under control of processor 164.

FIG. 9 also illustrates the use of LEDs 177, 178 and 179 to provide visual feedback of the data protection system status. In accordance with the present invention, the use of such displays or light sources may be used to convey various types of information to the user. For example, LEDs 177 and 179 may be provided to indicate that PHYs 170 and 172 are detecting an active network connection (and thus provide an indication that the network connections are present and functioning properly). LED 178 preferably provides alarm type information. For example, LED 178 may be provided in the form of a multi-color LED, which may provide a first colored light (e.g., yellow) if the data protection system has rejected one or more packets (thereby indicating that the system may be detecting an attack), and which may provide a second colored light (e.g., red) if the data protection system is continually rejecting packets or rejecting packets at a high rate (thereby indicating that the system is likely under attack). Such visual indicators, which may be coupled with audio feedback as described elsewhere herein, serve to inform the user that the user's computer or network may be under attack, thereby enabling the user to take further action, such as disconnecting from the network.

It should be noted that such visual feedback may be implemented in a variety of forms. In addition to multi-colored or multiple LEDs, other lights sources or other displays, a single LED could be provided with the LED blinking at a rate that indicates the level of severity as predicted by the data protection system. For example, if no packets have been rejected, then the LED may be in an off or safe (e.g., green) state. If packets have been rejected but not on a continual or high rate basis, then the LED (e.g., red) may be controlled to blink on and off at a first, preferably lower speed rate. If packets are being rejected on a continual or high rate basis (or otherwise in a manner that that system recognizes as suspect), then the LED may be controlled to blink on and off at a second, preferably higher speed rate. Thus, the LED blink rate desirably may be controlled to blink at a rate that corresponds to the level of severity of the security threat that is determined by the data protection system. Optionally coupled with audio feedback, such visual indicators may provide the user with alarm and status information in a simple and intuitive manner.

As further illustrated in the preferred embodiments of FIG. 9, a variety of physical switches or toggles 176, 180, 181 and 182 may be coupled to PLD 162 or controller 164. As illustrated by update button 176, toggles may be used to control the updating of the PLD code (for instance, to reconfigure or update the system, providing updated filtering algorithms). As illustrated by buttons 180 and 181, toggles may be used to selectively activate/deactivate filtering steps based on whether a protected computer is enabled to operate in a server mode or client mode (the state of such toggles preferably being used to control filtering decisions made within the filtering logic). As illustrated by reset button 182, toggles may also be used to control the reset of the data protection system (for example, to cause the PLD code to be re-loaded, as when the system enters an inoperable state caused by power supply irregularities or other unusual circumstances). The use of such physical switches/toggles allows the data protection system to be controlled in a straightforward manner, simplifying the user operability of embodiments of the present invention.

With reference to FIG. 9, additional details of preferred update program and protocols will now be described. The data protection system may be controlled to operate in an update mode by pressing update button or toggle 176, which preferably is provided on an external case (further described in FIG. 10 below). In accordance with preferred embodiments, during the interval when the update button is pressed by the user and the update either completes or is canceled by the user, the data protection system will not forward any packets (i.e., filtering is not active, so packet transmission is blocked). The user may then run an update program (which may be a browser-based or stand-alone application) from an internal host computer.

In the illustrated embodiment, it is assumed that the user previously downloaded a system update or is downloading an update through a browser. The update program preferably breaks the update into 1K size packets and forwards them, using a limited broadcast destination address (for example, 255.255.255.255). The source and destination ports are set to a predetermined value, such as 1 (1-4 are currently unassigned according to RFC 1010), and an IP option is set in the IP header. The program data preferably is preceded by the system update header that has the following structure in the illustrated embodiment: II) (1)/count (1)/bit length (2). The numbers in parentheses represent the field size in bytes. The ID for the entire transaction remains unchanged, except for the count field increments for each packet. In a preferred embodiment, the data protection system may receive the packets in order and perform several checks, such as ensuring the ID and count fields are correct, verifying the UDP checksum, and storing the configuration data in non-volatile memory. Preferably, these checks may be controlled by controller 164. Thereafter, the updated PLD code may be loaded into the PLD, with the filtering operations being based on this updated code.

As a result of the parallel filter rules evaluation as previously described, packets do not need to be buffered, except, for example, to create octets that facilitate determining protocol elements. (As is known, data needs to be combined into 8-bit, 16-bit, or 32-bit words because header and packet data often exist in these sizes or straddle a 4-bit nibble boundary.) Instead of buffering each packet, the data protection system generates another distinct data packet or chunk. This process of packet generation occurs while a plurality of filtering rules are applied in real time and in parallel, producing improved data protection systems and methods.

Figure 10:
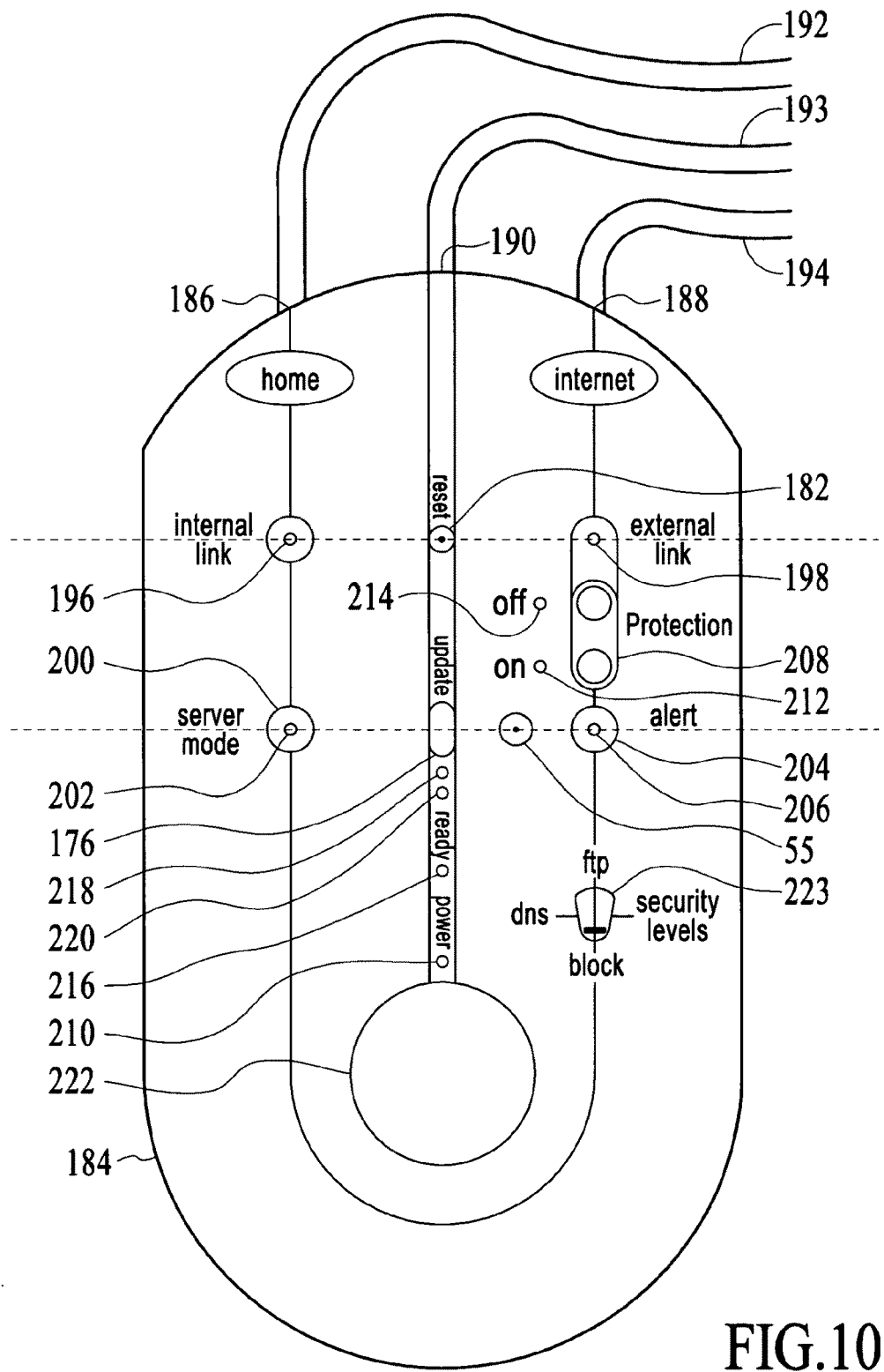
FIG. 10 is an illustration of an exemplary design of an external case in accordance with preferred embodiments of the present invention.

FIG. 10 illustrates a preferred embodiment of an exemplary design of an external case of a data protection system in accordance with the present invention (wherein all switches, lights, ports, etc., and other physical arrangements are exemplary). For example, external case 184 may be a molded plastic box in the shape of a "U" or folded tube as illustrated. The exemplary features of this external case may include ports, buttons (or toggle switches), LEDs, a removable logo disk, and a power supply connector. Home port 186, Internet port 188, and power supply connector 190 are preferably located on the same side of external case 184 with power supply connector 190 set between the two ports. Home port 186 connects to the internal network via cable 192; Internet port 188 connects to the external network via cable 194. Power supply connector 190 is coupled to an external DC power supply via cable 193. The PHY of each port preferably is coupled to a link LED as previously described: home port 186 is coupled to internal link LED 196; and Internet port 188 is coupled to external link LED 198. The link LEDs are thus coupled to the internal and external PHYs, respectively, and serve to indicate whether the PHYs have detected a network connection.

In the preferred embodiment, on side of the U-shaped case, server mode button 200 is provided to allow the user to selectively enable filtering, based on whether the internal computer is operating in server mode. Thus, the state of server mode button 200 may be used to selectively control filtering decisions based on whether internal computers will be operating in a server mode, etc. Server mode button 200 preferably includes server mode LED 202. When illuminated (e.g., green), server mode LED 202 indicates that the internal computers are enabled to operate in a server mode and the filtering decisions will be controlled accordingly. Server mode button 200 and server mode LED 202 are coupled to PLD 162, as described in FIG. 9.

In the preferred embodiment, parallel to server mode button 200 on the external side of the case is alert button 204, which contains alert LED 206. Alert LED 206 is coupled to alarm controller 53 (as illustrated in FIG. 3), which preferably is implemented as a part of PLD 162 (as illustrated in FIG. 9). Alert LED 206 may contain a single or multi-colored LED, which, when illuminated, indicates the data protection system is under attack and is rejecting suspect packets. The data protection system preferably registers the frequency of attacks and sends signals to alert LED 206 based on such information. In a preferred embodiment, alert LED 206 may contain a LED (e.g., red), which remains consistently illuminated during irregular attacks or blinks at regular intervals under heavy attack. In another preferred embodiment, alert LED 206 may contain a multi-colored LED, which similarly indicates when the system is under attack and is rejecting packets. With a multi-colored LED, the increase in frequency or intervals of attacks may be indicated by a change in color: for example, green (indicating no registered attacks by suspect packets) to yellow (indicating a few irregular attacks) to red (indicating more frequent attacks) to blinking red (indicating a heavy attack). The alert alarm may be reset by depressing alert button 204.

In a preferred embodiment, speaker 55 (or some form of audio transducer) may be coupled to alarm controller 53 to also indicate the presence or severity of attacks (as described in connection with FIG. 3). For example, when the data protection system is under heavy attack and alert LED 206 is blinking (e.g., red), an alarm signal may be transmitted to speaker 55 to emit audio information to indicate a suspected severe attack or emergency. Alarm-type information may also be coupled to the internal network (such as via a UDP packet, as described elsewhere herein), and thus transmit alarm information over the network to a software interface on the desktop. In other embodiments of the data protection system, an array of different features, including buttons, LEDs, alarms, and graphical user interfaces, may be utilized to indicate the class, frequency and severity of attacks on the system.

Adjacent to alert button 204 on the external network side of the case preferably is protection button 208, which is coupled to protection-on LED 212 and protection-off LED 214. When protection button 208 is set in the "on" position, protection-on LED 212 preferably illuminates (e.g., red) and the filtering system is enabled; when protection button 208 is set in the "off" position, protection-off LED 214 preferably illuminates (e.g., yellow) and the filtering system is disabled.

Still referring to FIG. 10, power LED 210 is coupled in a manner to indicate power is being provided via power supply connector 190. When power LED 210 is illuminated (e.g., green), it indicates the power supply is providing power to data protection system 1. It should be noted that in the illustrated embodiment, the present invention does not require an on/off switch for the power supply because the system is designed to be enabled once a DC power supply is provided. As previously described, reset button 182 is coupled to controller 164 and may be used to initiate loading or re-loading of the PLD code.

Adjacent to reset button 182 is update button 176, which is coupled to update-enabled LED 218 and update-failed LED 220, as well as PLD 162 (as illustrated in FIG. 9). As previously described, an update program preferably is utilized to update the logic programming and rules tables. Preferably, after pressing update button 176, data protection system 1 is automatically restarted, causing the new PLD code to load. The load version bit preferably will be set in the flash configuration header, which causes the system to load using the new program file. In a preferred embodiment, update-enabled LED 218 will illuminate (e.g. green) to indicate data protection system 1 is ready to receive the new updated programming. After the update begins, the system may continually flash update-enabled LED 218 until the successful completion of the update; LED 218 is extinguished upon successful completion of this process. However, if an update is incomplete and fails to occur, update-failed LED 220 may illuminate (e.g. red) and blink. The user extinguishes LED 220 by pressing the update button a second time. If possible, data protection system 1 may generate a UDP packet to inform the internal client of the reason for the failure. As an additional example, if the system contains an LCD, it may display an error code. It should be noted that data protection system 1 will continue to filter packets after update-failed LED 220 is extinguished. LED 216 is preferably provided to illuminate when the system is operating and filtering packets in the manner described.

In addition to the various toggles on the present invention, a removable logo disk 222 may be located on a preferred embodiment of the case. This removable disk may include a company logo, registered trademark, and/or other copyrighted material that may be valuable for branding and marketing the data protection system under a separate wholesaler. The disk is thus removable and replaceable for a variety of branding purposes.

In an alternate embodiment, relax button 224 may be implemented to allow network traffic to pass through non-stateful rules designed for each protocol. To prevent a stateful to non-stateful transition from occurring without protection, the data protection system may wait for a state register to open, initiate a timer, and record protocol communication data in the state registers (as illustrated in FIG. 8), while relying on the static rules. Three-position relax button 224 may preferably include a variety of features for timer positions, protocol communication data, stateful rules registers information, and other rules-based filtering functions.

In other embodiments, different designs may be used in accordance with the present invention, incorporating various buttons, LEDs, ports, cables, slots, connectors, plug-ins, speakers, and other audio transducers, which in turn may be embodied in a variety of external case shapes, as may be necessary.

Figure 11:
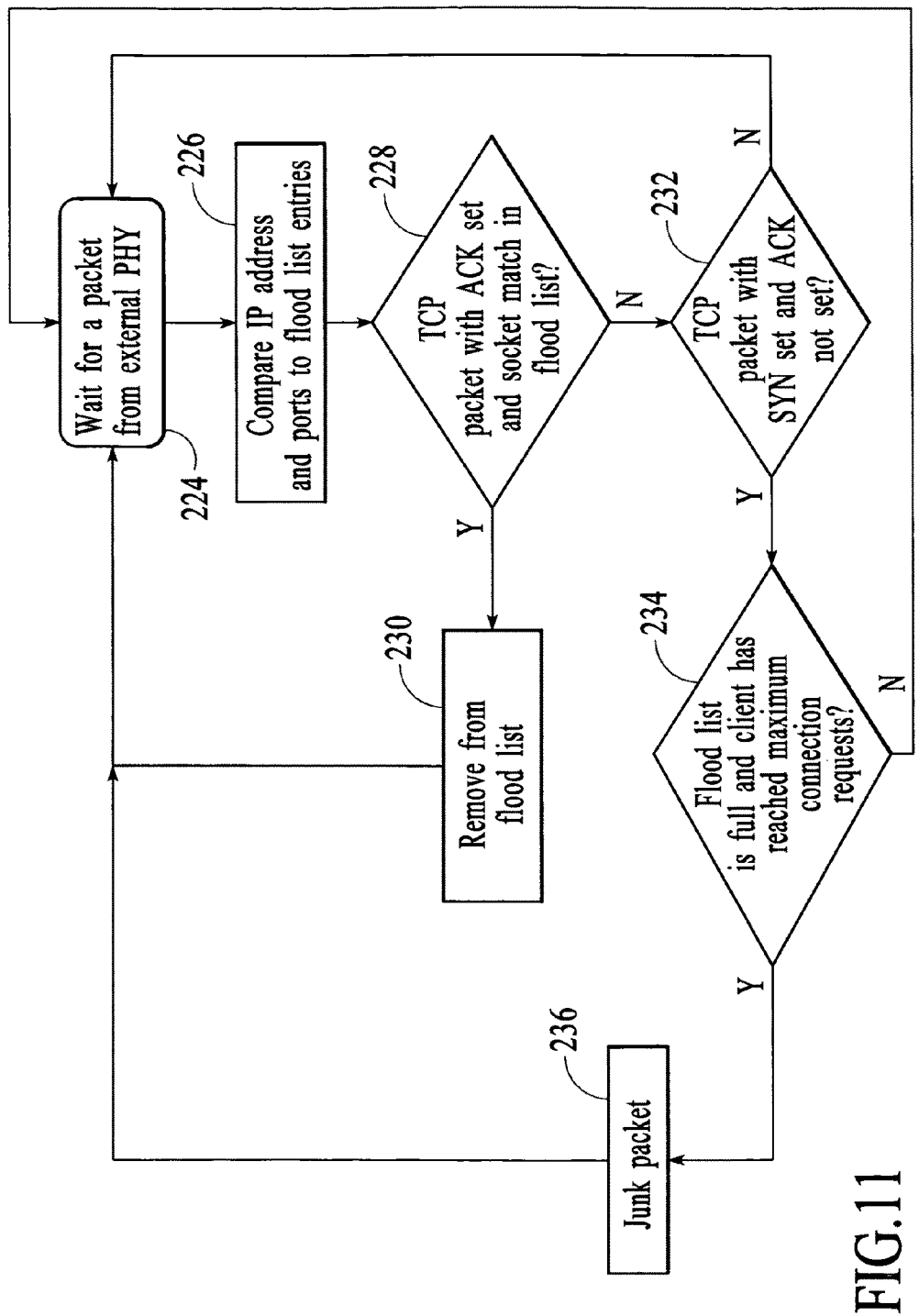
FIGS. 11 and 12 are flow diagrams illustrating SYN flood protection in accordance with preferred embodiments of the present invention.
Figure 12:
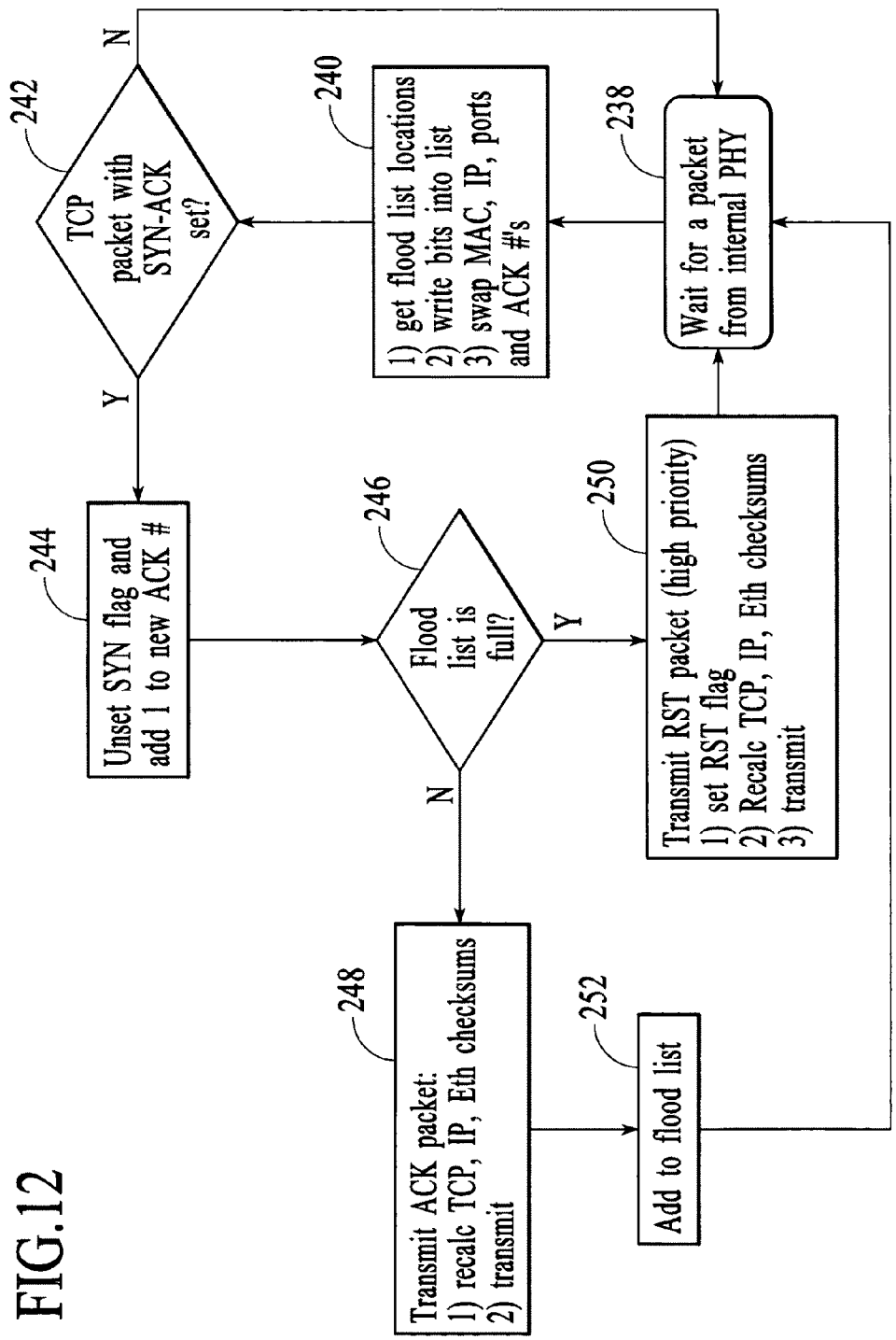

FIGS. 11 and 12 are flow diagrams illustrating examples of "SYN flood" protection in accordance with preferred embodiments of the present invention. Such SYN flood protection is optionally provided as an additional computer protection mechanism in accordance with certain preferred embodiments.

As is known in the art, SYN flood is a common type of "Denial of Service" attack, in which a target host is flooded with TCP connection requests. In the process of exchanging data in a three-way handshake, source addresses and source TCP ports of various connection request packets are random or missing. In a three-way handshake, the system registers a request from an IP address, then sends a response to that address based on its source, and waits for the reply from that address.

As illustrated in FIG. 11, data protection system 1 waits for a packet from external PHY 14 (as illustrated in FIG. 2) at step 224. When the system receives a packet from the external PHY, it compares the IP address and ports to the flood list entries at step 226, then proceeds to step 228. At step 228, the system determines whether the packet type is TCP, the ACK bit is set, and the packet matches an entry in the flood list. If this criteria are met, then the system proceeds to step 230, where the packet is removed from the flood list. If the packet is removed from the flood list, then the system returns to step 224 and waits for the next packet from the external PHY. Otherwise, if the criteria at step 228 are not met, then the system proceeds to step 232, where the system determines whether the packet type is TCP, the SYN bit is set and the ACK bit is not set. If the criteria at step 232 are met, then the system proceeds to step 234; otherwise, the system returns to step 224. At step 234, the system determines if the flood list is full and if the client has reached the maximum connection requests. If the flood list is not full, then the system returns to step 224 to wait for more packets from the external PHY. However, if the flood list is full at step 234, then the system proceeds to step 236, where the packet is junked and the system returns to step 224.

As illustrated in FIG. 12, data protection system 1 also waits for a packet from internal PHY 18 (as illustrated in FIG. 2) at step 238. When the system receives a packet from the internal PHY, it accesses the flood list location and writes the bits into the list, swapping ACK bits as well as MAC, IP and port addresses. The system then proceeds to step 242, where it determines if the packet type is TCP and whether the SYN and ACK bits are set. If the criteria at step 242 are met, then the system proceeds to step 244; if not, then the system returns to step 238 and waits for another packet from the internal PHY. At step 244, the SYN flag is unset and number 1 is added to the new ACK number. The system then proceeds to step 246, where it determines if the flood list is full. If the flood list at step 246 is full, then the Reset flag is set, the checksums for TCP, IP and Ethernet protocols are recalculated, and the Reset packet is transmitted. The system then returns to step 238. However, if the flood list at step 246 is not full, then the system proceeds to step 248, where the checksums for TCP, IP and Ethernet protocols are recalculated and the ACK packet is transmitted. The system then proceeds to step 252, where the recalculated packet is added to the flood list and the system returns to step 238, where it waits for another packet from the internal network.

In accordance with the present invention, SYN flood protection as described does not require either an IP or MAC address. The data protection system uses the destination MAC address as the source Ethernet address when framing the response packet that completes the TCP three-way handshake. In all cases, when forming the new packet, the source and destination header information is swapped, so that the source IP address and port become the destination IP address and port. It should be appreciated that SYN flood protection, as preferably implemented by the system, does not buffer the incoming packet, but builds the TCP response packet in real time. The new TCP packet is placed in a queue for transmission at the earliest time possible based on the rules dictated by the link level protocol.

Figure 13:
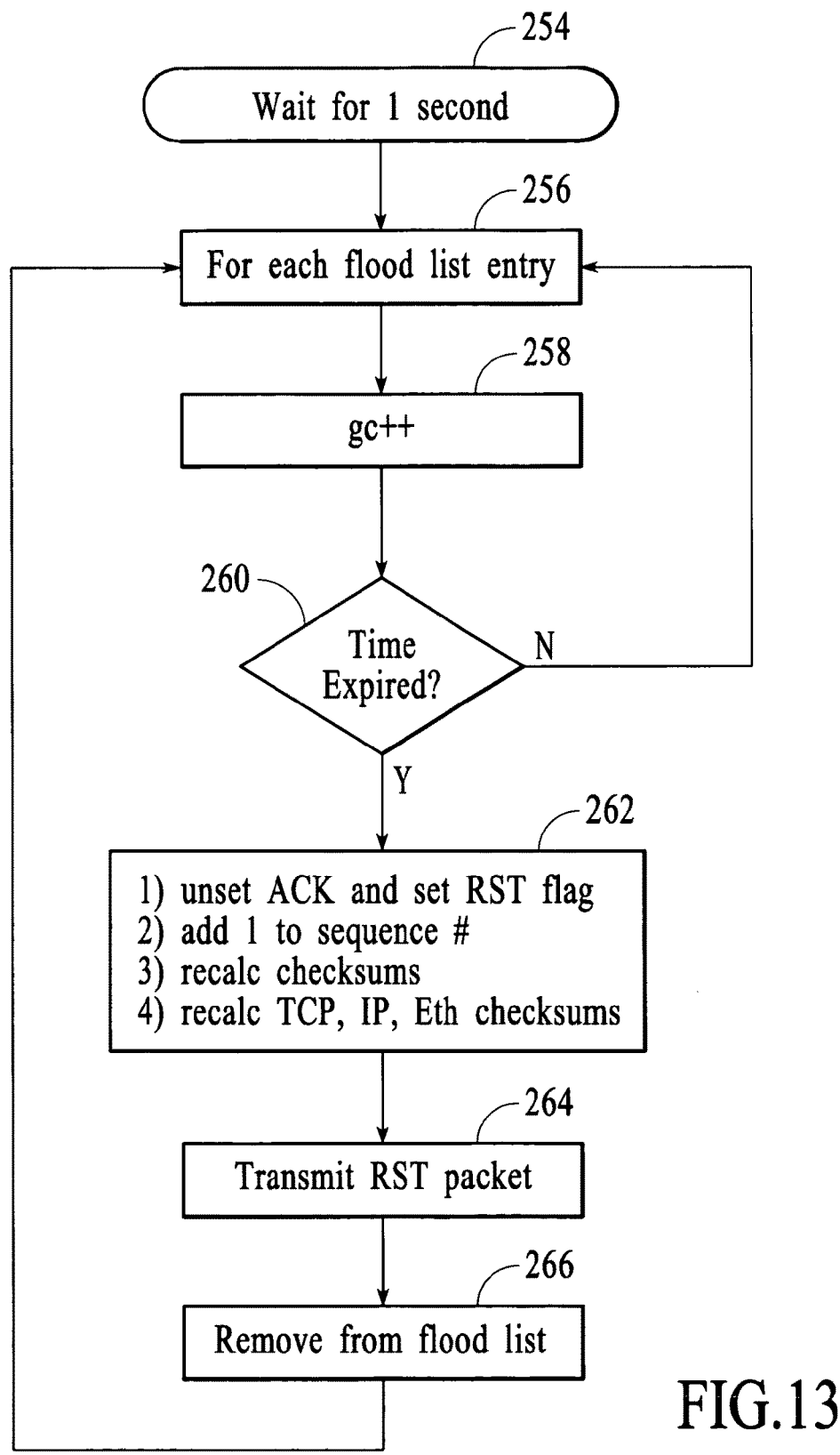
FIG. 13 is a flow chart illustrating the process of "garbage collection" in flood lists in accordance with preferred embodiments of the present invention.

As illustrated in FIG. 13, in order to keep the flood lists from filling up with stale entries, the data protection system must free up state registers when the protocol information is not accessed within specific time frames, such as when a three-way handshake is initiated by a client but the transaction is not closed. After the system receives a packet, it waits for one second at step 254, then proceeds to step 256, where the packet is checked against each flood list entry and passed to step 258. At step 258, the system checks for stale entries (and garbage collection) in the flood lists and proceeds to step 260, where it determines if time has expired. If time has expired at step 260, then the packet proceeds to step 262; if not, then the system returns to step 256 to check each flood entry list again. At step 262, the system unsets the ACK bit and sets the Reset flag, adds 1 to the sequence number, recalculating the checksums, and then recalculates the checksums for TCP, IP, and Ethernet protocols. The system proceeds to step 264, where the Reset packet is transmitted; it then proceeds to step 266 and removes the packet from the flood list. The system then returns to step 256. It should be noted that if time expires for the request, then the system sends the Reset flag, terminating the connection.

With reference to FIGS. 14-24, preferred embodiments of the present invention directed to PNUT-type command protocols, and exemplary methods and systems for utilizing such protocols, will now be described. Again, it should be understood that PNUT-type protocols in accordance with the present invention may desirably be utilized to update the configuration of PLD-based devices connected to a network, although the present invention is not limited to updating such PLD-based devices but more generally may be used to transmit to and/or receive from such PLD-based devices commands or other information. A PNUT-type protocol in accordance with preferred embodiments is a IMP-based network communication protocol. In a preferred embodiment of the present invention, a PNUT update station provides configuration options for users to change the security protocols and services of a PLD-based device (exemplary security-type devices are described elsewhere herein, although it should be understood that a PNUT-type protocol may be used for a variety of other devices that are not security-type devices, etc.).

Figure 14:
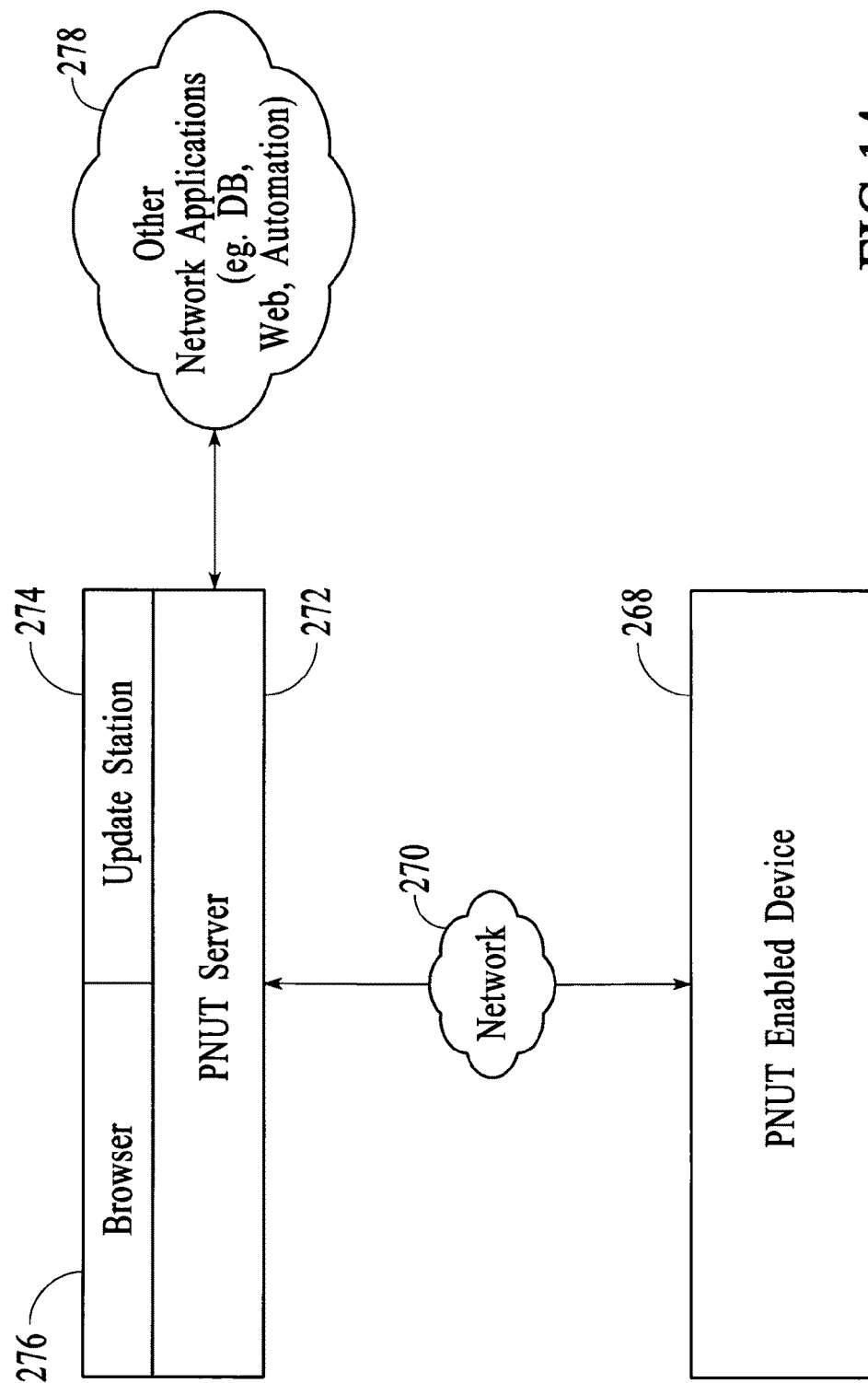
FIG. 14 is a block diagram of an exemplary embodiment of a network configuration in which PNUT-type commands may be transmitted between an update station and a PNUT-enabled device in accordance with the present invention.

FIG. 14 is a block diagram illustrating an exemplary network configuration for updating a PLD-based device or appliance via a network. In accordance with the present invention, to update the protocols of PNUT-enabled device 268 (which may be a security-type device as described elsewhere herein or other type of device), the user runs browser-type application 276 on PNUT server 272, which is coupled to PNUT-enabled device 268 via network 270 as well as other network applications 278. PNUT-enabled device 268 preferably is a hardware-based device, utilizing an FPGA, CPLD, ASIC, controller, etc. PNUT server 272 preferably utilizes a highly concurrent, robust server framework based on a personal computer, workstation or other computing system that dispatches PNUT commands and data to the appropriate command handler in PNUT-enabled device 268. PNUT-enabled device 268, a preferred example of which is data protection system 1 described earlier, initiates a session with update station 274, which may be provided at one of a plurality of file locations on PNUT server 272. Update station 274 preferably consists of or includes a personal computer, workstation or other computing system and transmits data packets automatically without user interaction via a PNUT communication protocol (described in greater detail hereinafter). Update station 274 also preferably provides the user with update procedures and configuration options (which are further described below). In general, browser 276, update station 274 and PNUT server 272 provide a computing-type environment that may expediently interact with a user and transmit and receive PNUT-type packets in accordance with a PNUT-type protocol as described herein.

Figure 15:
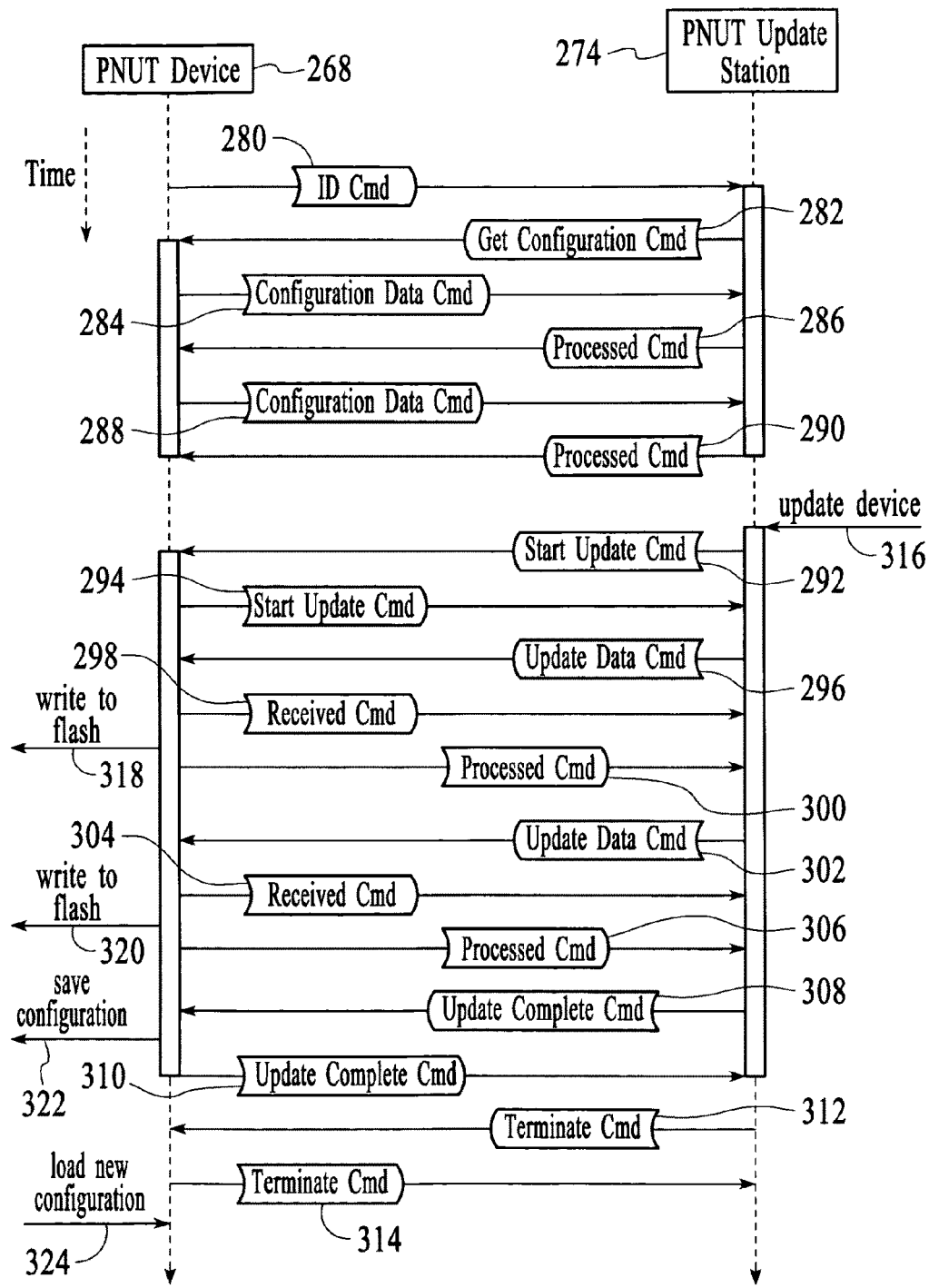
FIG. 15 is a flowchart illustrating the transfer of PNUT-type commands in an exemplary network configuration in accordance with the present invention, such as for updating a PLD-based device.

FIG. 15 illustrates the transfer of PNUT-type commands in an exemplary network configuration. PNUT-type commands for each PNUT-enabled device preferably begin with the device ID or serial number, which identifies the PNUT-enabled device, and the op code for the particular command. Since the device ID of a PNUT-enabled device is unique and independent of a protocol address (such as an IP address), the order of the PNUT command data is critical to PNUT protocols in accordance with preferred embodiments of the present invention. In an exemplary embodiment, PNUT-enabled device 268, such as data protection system 1, preferably sends ID command 280 to update station 274, which may serve the purpose of providing information identifying PNUT-enabled device 268. Update station 274 preferably responds by sending get configuration command 282 to PNUT-enabled device 268, which preferably is a request for configuration data from PNUT-enabled device 268. PNUT-enabled device 268 then preferably transmits its configuration data in the form of configuration data command 284 to update station 274, which preferably responds (if the configuration data was correctly received and processed by update station 274) by sending processed command 286 to PNUT-enabled device 268. In accordance with preferred embodiments, such configuration data as illustrated in FIG. 15 preferably provides sufficient information so that update station 274 may determine the command protocol format/definition to which this particular PNUT-enabled device is responsive. Thus, as will described in greater detail hereinafter, in effect PNUT-enabled device identifies itself to update station 274 and also "tells" the update station the command language (command formats, protocols, etc.) that the update station may use to communicate with this particular PNUT-enabled device (other PNUT-enabled devices, in general, may have a different set of commands/command formats or protocols to which they are responsive, etc.).

It should be noted that PNUT-enabled device 268 desirably may wait a predetermined or other amount of time, such as 3 seconds, for a processed command packet from update station 274 in order to confirm that the configuration data had been correctly received by update station 274. If PNUT-enabled device 268 does not receive a processed command packet from update station 274 in the predetermined or other time frame, then PNUT-enabled device 268 preferably will retransmit configuration data (e.g., configuration data command 288) to update station 274 until the command is acknowledged with a process command (e.g., processed command 290) or other commands (such as an error command, terminate command, etc.). It also should be noted that the sequence of configuration data command 284, 288, etc., each followed by a processed command 286, 290, etc., may be repeated a plurality of times in order for the desired amount of configuration data to be transmitted in a plurality of packets, thereby reducing the size of the packets, such as to avoid fragmentation, etc. In accordance with preferred embodiments, the packets exchanged between the PNUT-enabled device and the PNUT server, etc., divide the data to be transmitted into packets of a size so that the packets will traverse the network(s) without being fragmented. Thus, as the sequence of configuration data commands may be repeated a plurality of times, PNUT-enabled devices (e.g., containing FPGAs, PLDs, etc.) may also be partially or completely reconfigured.

In preferred embodiments, once correct receipt of the configuration data has been confirmed (i.e., the update station knows the command formats and protocol that may be used to communicate with the PNUT-enabled device), a user who is performing the update (in this example) is then notified to initiate the update of PNUT-enabled device 268 via update input 316, such as a GUI button, in browser 276. In alternate embodiments, update input 316 may be a hardware switch activation on PNUT-enabled device 268 (see, e.g., update button 176 of data protection system 1 as illustrated in FIG. 9). What is important is that the update procedure preferably has a further user input in order to have the update procedure initiated only in response to a valid user command input, and after complete exchange and receipt of all appropriate configuration or other data.

The configuration data initially sent by PNUT-enabled device 268, in preferred embodiments, includes information that indicates or specifies the PNUT commands, and preferably the format/protocol of those commands, that are supported or recognized by PNUT-enabled device 268. Thus, update station 274, upon receipt of the configuration information from PNUT-enabled device 268, will know precisely which commands and command protocol(s) may be used to communicate with PNUT-enabled device 268. In the case where there are a plurality of PNUT-enabled devices 268 on the network, which may be installed at different points in time and support different PNUT commands (for example, see the core and custom commands discussed elsewhere herein), this transmission of command and command format/protocol information ensures that update station 274 knows the precise commands for the particular PNUT-enabled device with which it is going to communicate update or other information.

As further illustrated in FIG. 15, after update station 274 confirms receipt of the configuration data from PNUT-enabled device 268 via process command 286 or 290, and after receipt of update input 316, update station 274 then preferably transmits start update command 292 to PNUT-enabled device 268 to begin an update session. Upon receipt of start update command 292, PNUT-enabled device 268 preferably responds by sending start update command 294 to update station 274 to acknowledge receipt of start update command 292 and the beginning of the update session. Update station 274 then preferably transmits update data command 296 (which preferably includes data for updating the configuration of PNUT-enabled device 268, such as data that may be used to reconfigure the FPGA or other PLD-type device within the PLD enabled device 268) to PNUT-enabled device 268, which upon proper receipt responds with received command 298, thereby acknowledging correct receipt of update data command 296. PNUT-enabled device then preferably writes the new command data to flash or other non-volatile memory (e.g., EEPROM, battery-backed-up RAM, etc.) within PNUT-enabled device 268 (as illustrated by step 318), and preferably after completion of command data write acknowledges completion of these operations by transmitting processed command 300 to update station 274. In preferred embodiments, after receipt of an update data packet, PNUT-enabled device 268 preferably stores the update data in flash or other non-volatile memory (step 318), thus retaining the update data even in the event of power failure or other service interruption. The partial set of stored data is preferably coded as incomplete or not valid, such as by setting of an appropriate flag, so that PNUT-enabled device 268 knows that only part of the update data has been received. It is important that the configuration of PNUT-enabled device 268 not be changed until the complete set of updated configuration data has been received and stored, and at which time the flag may be set to indicate that the entire updated configuration data has been properly received (see the save configuration step 322, discussed below).

In a preferred embodiment of the present invention, if update station 274 does not receive a processed command packet from PNUT-enabled device 268 in a predetermined or other time frame, then update station 274 preferably will retransmit an update command (e.g., update data command 296, 302, etc.) to PNUT-enabled device 268 until the command is acknowledged with a received command (e.g., received command 298, 304, etc.). After each of the update packets have been sent and received, a command confirms that the update packet has been received and processed by PNUT-enabled device 268 (e.g., processed command 300, 306, etc.). PNUT-enabled device 268 preferably then writes the new command data to flash or other preferably non-volatile storage (as illustrated in step 318, 320, etc.), as previously described. Update station 274 may wait a predetermined or other amount of time, such as 3 seconds, for a received command packet from PNUT-enabled device 268 before resending the prior update data command, etc.

It should also be noted that the sequence of PNUT-type commands (such as receipt of packet acknowledgement, acknowledgement of packet processed, etc.) may be repeated a plurality of times in order to provide complete configuration data or other data from update station 274 to PNUT-enabled device 268 in the event that such data exceeds the size of what is desired to be transmitted in a single packet. For example, new configuration data may be sent via multiple N packets, with PNUT-enabled device 268 acknowledging receipt of each packet with a received-type command as illustrated in FIG. 15. It should also be noted that, in preferred embodiments, data from update data commands 296, 302, etc. are written to flash or other non-volatile memory/storage after receipt, which enables such packets to be retained even in the event of disruption of the update data transmission, such as a power failure or the like.

With reference to FIG. 15, if PNUT-enabled device 268 has finished processing the new configuration data and transmitted a processed command 300, 306, etc. to update station 274, then update station 274 preferably (but optionally) sends update complete command 308 to PNUT-enabled device 268, which informs PNUT-enabled device 268 that all of the data command packets have been sent (complete command 308 is optional in that a first data command packet could inform PNUT-enabled device 268 of the number of packets to follow, or PNUT-enabled device 268 could know in advance that a predetermined number of data command packets are to follow, etc.). As update, configuration or other data is preferably being written to flash or other memory after receipt, the data preferably is stored prior to receipt of update complete command 308. At step 322, PNUT-enabled device 268 preferably analyzes the data, which also may include a data decompression and/or decryption (if the configuration data was originally compressed and/or encrypted, etc.), to ensure that it is complete and appears valid, such as by a checksum check or the like. If the total set of update data appears complete, then PNUT-enabled device 268 preferably sets a bit or flag that indicates that the data is valid and saved in flash or other non-volatile storage/memory (as indicated by save configuration step 322), and thus may be used to update or reconfigure PNUT-enabled device 268. This provides an additional level of protection, in that actual reconfiguration of PNUT-enabled device 268 cannot be performed until all of the update data has been received and validated (a reconfiguration based on data that has not been validated to ensure accuracy and completeness in general could be expected to provide unpredictable or undesired results, etc.). Thereafter, PNUT-enabled device 268 preferably responds by sending update complete command 310 to update station 274 to acknowledge that all of the update data has been received, validated and stored as valid data.

Upon receipt of update complete command 310 from PNUT-enabled device 268 in accordance with the present invention, update station 274 then preferably transmits terminate command 312 to end the update session. To acknowledge the ending of the update session, PNUT-enabled device 268 preferably sends terminate command 314 to update station 274. During this update session, PNUT-enabled device 268 preferably enters a mode whereby it loads the new configuration (as illustrated in step 324, which may be a reloading of configuration data for the PLD, FPGA, etc.), and thereafter may operate in accordance with the updated configuration. In other embodiments, PNUT-enabled device 268 may send another command that confirms that the reloading of the PLD has been successfully completed, or alternatively terminate command 314 could be sent after PLD reload to confirm that the configuration of the PLD has been successfully updated with new configuration data. It also should be noted that, in alternative embodiments, the PLD or FPGA (consisting of one or a plurality of PLD or FPGA devices) utilizes a plurality of logic areas, one or more of which may be updated with the new configuration data. Thus, for example, a first logic area within the PLD/FPGA may be operating such as to carry out the PNUT-type command exchange, while a second logic area may be updated with the new configuration data (thus, the PLD or FPGA may be considered to have been partially reconfigured in accordance with the present invention).

Figure 16:
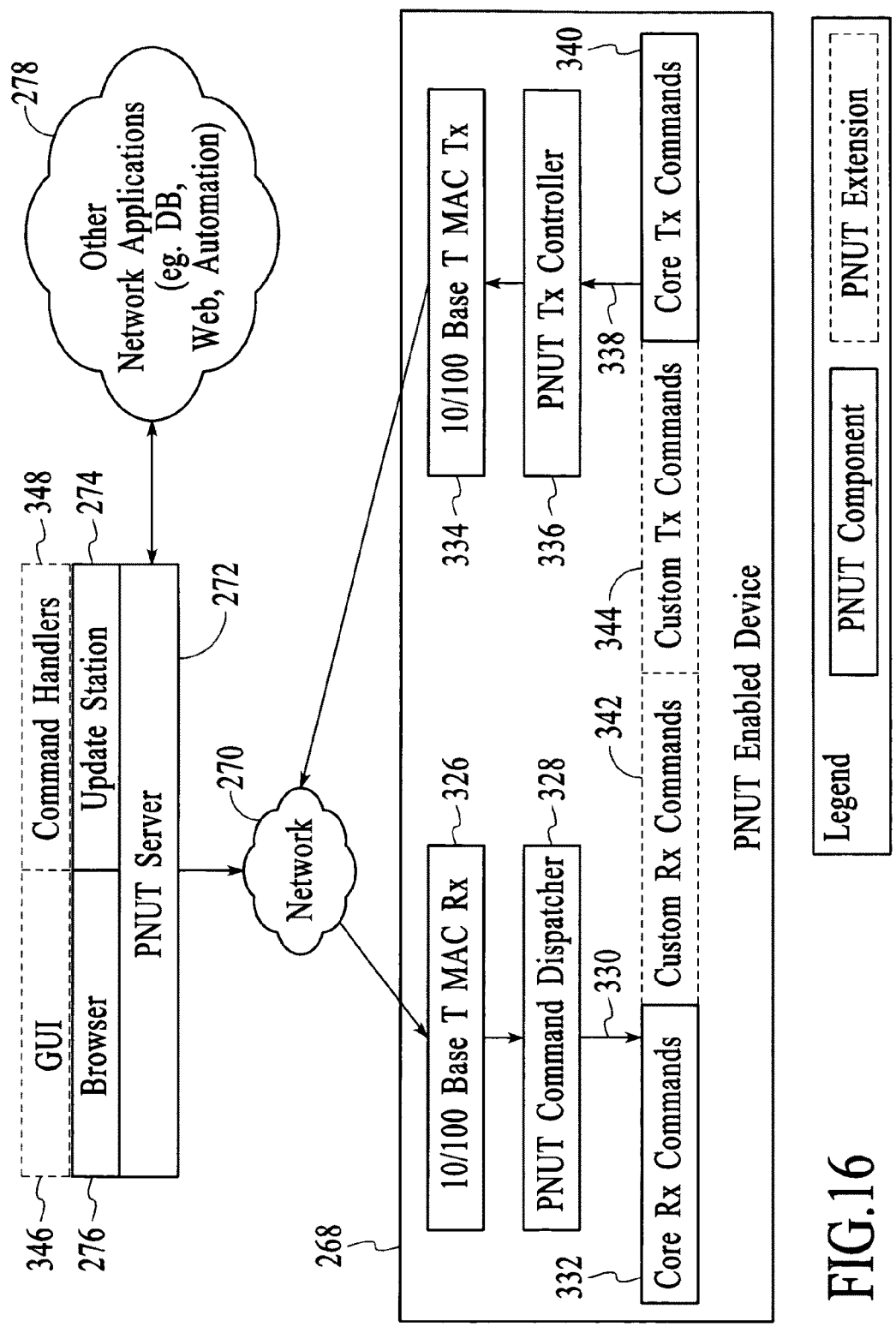
FIG. 16 is a more detailed block diagram of an additional exemplary embodiment of a network configuration in which both core and custom PNUT-type commands may be transmitted between an update station and a PLD-based device in accordance with the present invention.

FIG. 16 is a diagram illustrating a preferably PLD-based device (PNUT-enabled device 268) implementing PNUT command protocols over a network in accordance with a preferred embodiment. PNUT-enabled device 268 is preferably connected to PNUT server 272 via network 270. In a preferred embodiment of the present invention, logic within PNUT-enabled device 268 includes the following components:

1. MAC receiver 326 and MAC transmitter 334 are logic cores dedicated to receiving and transmitting packets, respectively, for LAN networks, such as Ethernet (10Base-T), Fast Ethernet (100Base-T), Gigabit Ethernet, Wireless Ethernet, and Bluetooth protocols (in general, a variety of networks may be used in addition to the foregoing, and may also include optical, infrared, IEEE 80211b, IEEE 802.15, token ring, etc.). It should be noted that MAC receiver 326 and MAC transmitter 334 (and associated logic, etc.) preferably are separated, so that particular PNUT-enabled device 268 may contain receive only, transmit only, or receive/transmit capabilities, as dictated by the needs of the particular application.

2. Command dispatcher 328 filters network traffic from MAC receiver 326 and identifies PNUT commands. In response to receiving what is identified as a PNUT command, command dispatcher 328 dispatches command data corresponding to the received PNUT command via receive command bus 330 to the appropriate PNUT command handlers (discussed below). Command dispatcher 328 preferably serves the functions of recognizing commands and providing command data for processing by the appropriate command handlers.

3. Receive command bus 330 and transmit command bus 338 are bus-type structures through which data derived from the PNUT command/data packets, which may be IP, UDP or other packets, are transferred.

4. Command handlers (i.e., logic for processing commands) for core commands 332 and 340 and custom commands 342 and 344 determine how the commands are to be executed (i.e., what operations within PNUT-enabled device 268 or update station 274 are to be performed in response to particular commands). As illustrated in PNUT-enabled device 268, the command handlers may be separated into receive only, transmit only, or receive/transmit commands. Thus, particular devices may implement either or both types of handlers, etc. (It should be noted that command handlers may also be implemented in a common manner, such as via command handler software application 348 on update station 274 and server 272.) Command handlers for core commands 332 and 340 preferably include logic to implement a plurality of core commands, such as ID command, get configuration command, send configuration command, received command, processed command, terminate command, error command, etc., which are commands that preferably are shared by a plurality of PNUT-enabled devices. Custom commands 342 and 344 preferably include a plurality of custom commands, such as start update command, update data command, and update complete command, which are preferably utilized by one or a subset of the total PNUT-enabled devices on the network. Command handlers for custom commands 342 and 344 may implement customized commands for a variety of functions, such as filtering, updating, logging, polling, testing, debugging, and monitoring. For example, PNUT custom commands for data protection system 1 may include DNS filter command, FTP filter command, SYN flood command, etc. As will be appreciated, with the ability to support a core set of commands and custom commands, the logic requirements for various PNUT-enabled devices may be reduced, as the smaller set of core commands that are likely to be used by a large number of devices may be more widely implemented, while logic for generally more specialized custom commands may be implemented only on the particular devices that are designed to utilize those custom commands.

5. Transmitter controller 336 preferably controls the access to both MAC transmitter 334 and transmit command bus 338, and serves to generate all network packets that are to be transmitted from PNUT-enabled device 268.

As illustrated in FIG. 16, in a preferred embodiment of the present invention, PNUT-enabled device 268, which may be a PLD-based or other logic-based device, is coupled with a physical cable to network 270, such as a LAN or WAN, which is connected via a similar physical cable to server PNUT 272. Update station 274 on server 272 sends PNUT data packets across network 270 to PNUT-enabled device 268. MAC receiver 326 in PNUT-enabled device 268 and coupled to network 270 receives data packets and transmits data from the received packet to command dispatcher 328. Command dispatcher 328 preferably filters data packets for PNUT commands and sends the appropriate command data across receive command bus 330 to command handlers for core commands 332 and 340. In certain preferred embodiments, command dispatcher 328 may also send command data to command handlers for custom commands 342 and 344. Command handlers for core commands 332 and 340 determine which command on receive command bus 330 to execute and which operations to carry out in response to the command, and, as appropriate, forward the command data across transmit command bus 338 to transmitter controller 336. Transmitter controller 336 preferably generates a new command packet and sends it to MAC transmitter 334, which in turn transmits the new command packet across network 270 destined for update station 274 on server 272. The exchange of such packets, and the operations that may be carried out in response to such packets, is described elsewhere herein.

Figure 17:
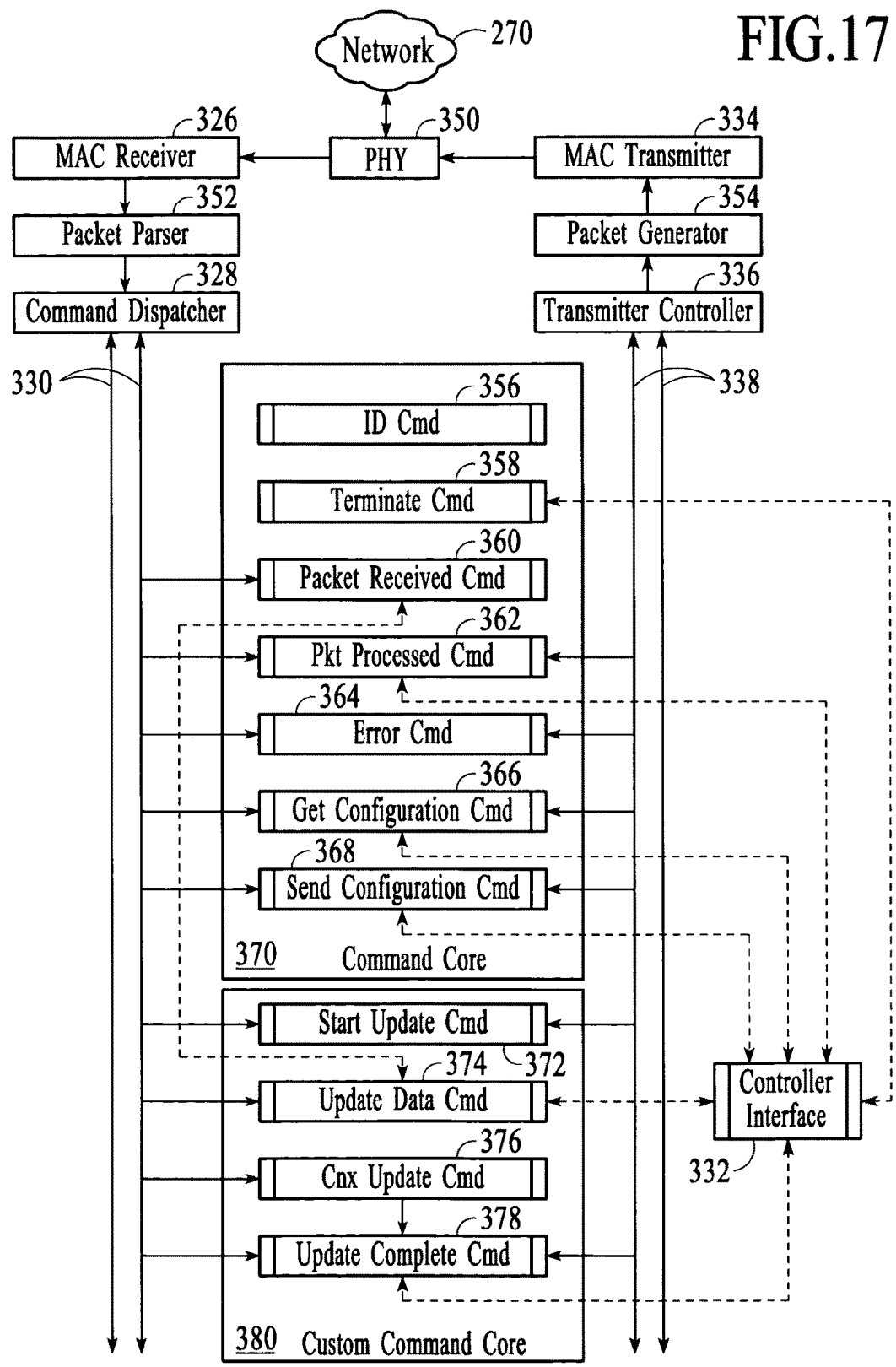
FIG. 17 is a flowchart illustrating the transfer of core and custom PNUT-type commands in an exemplary network configuration in accordance with the present invention.

FIG. 17 illustrates an alternate embodiment/explanation of the use of PNUT commands with a PNUT-enabled device. In accordance with this illustrative embodiment of the present invention, physical layer interface or PHY 350 preferably includes a physical interface coupled to network 270, a physical interface coupled to MAC receiver 326, and a physical interface coupled to MAC transmitter 334. PHY 350 provides the physical interface for data packets not only received from network 270 and transmitted to MAC receiver 326, but also received by network 270 and transmitted from MAC transmitter 334. Network MAC types that may be utilized with the present invention include, for example, Ethernet, Fast Ethernet, Bluetooth, Wireless Ethernet, and Gigabit Ethernet.

In a preferred embodiment of the present invention, PHY 350 sends data packets to MAC receiver 326, which receives the packets (and preferably buffers, checks the CRC bit, etc. of the packet in the case of Ethernet, and otherwise receives the packet in accordance with the network protocol of the particular implementation), and then transmits the packets to packet parser 352. Packet parser 352 processes all incoming packets from MAC receiver 326 and provides the packet data to command dispatcher 328. After packet parser 352 provides the packet data from MAC receiver 326 to command dispatcher 328, command dispatcher 328 filters packet data in order to recognize PNUT commands destined for PNUT-enabled device 268. After receipt of packet data that is recognized as a PNUT command destined for PNUT-enabled device 268, command dispatcher 328 waits until receive command bus 330 is free, then provides PNUT command data/signals on receive command bus 330. Command handlers 356-368 in command core 370 receive the command data/signals from command bus 330 and provide logic for recognizing a specific command to be performed (which may be by command ID number or other signaling), receiving any command information from command dispatcher 328 that may be appropriate for the particular command, and also providing logic for initiating the operations that need to be performed for the particular command. Command core 370 is the logic block where command handlers 356-368 are implemented. It will be understood that the present invention is not limited to any particular logic configuration for packet parser 352 and command dispatcher 328, etc.; what is important is that logic be provided for parsing the incoming packets, recognizing PNUT commands in the incoming packets, and providing appropriate command data/signals to logic that initiates and carries the operations associated with the particular commands.

As further illustrated in FIG. 17, custom command handlers 372-378 in custom command core 380 are also implemented in preferred embodiments, allowing the user to implement customized PNUT commands for particular PNUT-enabled devices, such as previously described. Custom command core 380 is coupled to receive command bus 330 and transmit command bus 338, and may be utilized to implement custom, application-specific PNUT commands. Custom command handlers 372-378 may include, for example, start update command 372, update data command 374, connection update command 376, update complete command 378, etc. As will be apparent to one skilled in the art, these are exemplary custom commands, and alternatives, substitutions and variations of custom commands may be utilized in accordance with the present invention. In particular, custom commands for exchanging particular types of information for particular applications may be provided with such custom commands. As an exemplary list, particular custom commands could be used to transmit and/or receive information such as: configuration information; bar code data; information indicative of a weight of one or more objects or material; information indicative of temperature; information indicative of movement or position; information indicative of a size of one or more objects or material; information indicative of a presence or amount of light; information indicative of pressure; information indicative of friction; information indicative of elevation; information indicative of thickness; information indicative of reflectivity; information indicative of wind; information indicative of a degree of moisture content; camera or other image data; information indicative of the optical characteristics of an object or material; information indicative of success or failure of an operation; information derived from a magnetic card reader; and information indicative of a status condition of an industrial process.

In accordance with the present invention, PNUT protocols define a set of core commands that are practical and useful for a wide range of applications, such as starting and stopping PNUT communication sessions, for reporting the occurrence of errors, for confirming the reception of data, and for confirming the completion of data processing, etc. PNUT commands preferably contain an identification number, such as an ID number, serial number, or a shared default ID number. For example, the shared default ID number, which could be an identification number shared by all PNUT-enabled devices (for example on the particular network), may be all zeros or some other predetermined number, and thus provide a way to poll or ping the entire network for all PNUT-enabled devices or broadcast particular commands. Particular commands may include, for example, ID command, terminate command, packet received command, packet processed command, error command, get configuration command, send configuration command, etc. However, commands that are addressed to PNUT-enabled device 268 but not handled by one of the command handlers preferably will cause command dispatcher 328 to return a PNUT error command to the sender's address. It is important to emphasize that the PNUT identification number is independent of any networking addresses (e.g., IP address or MAC address), and thus PNUT-type commands may be implemented across a plurality of networks.

In a preferred embodiment of the present invention, command handlers 356-368 and custom command handlers 372-378 receive command data from receive command bus 330, and, as appropriate (such as for responding to particular commands), transmit commands across transmit command bus 338 to transmitter controller 336. Transmitter controller 336 preferably allocates access to network MAC transmitter 334 through transmit command bus 338 and packet generator 354, and arbitrates when transmit command bus 338 is accessible, so that command handlers 356-368 can send command data across transmit command bus 338 to transmitter controller 336. Transmitter controller 336 may implement a plurality of priority schemes for arbitrating bus control, such as round robin, process priority scheduling, etc. Transmitter controller 336 then prepares the packet for packet generator 354, which preferably receives the command data and generates a new legal packet based on the command data and encapsulated in, for example, IP or UDP protocols. Thus, packet generator 354 provides transmit commands which specify message data by generating the standard protocol for the particular network and PNUT packet headers. Packet generator 354 then preferably transmits the new packet to MAC transmitter 334, which sends the new packet to PHY 350 and onto network 270.

With reference to FIG. 17, controller interface 382 preferably provides an interface to a controller within PNUT-enabled device 268. Controller interface 382 is coupled to command core 370 and custom command core 380, and exchanges data, commands or signal inputs, as appropriate, with various of the command handlers within command core 370 and custom command core 380. As with the embodiment described in connection with FIG. 16, and with data protection system 1 (such as described in connection with FIG. 9), for example, update data may be received, receipt acknowledged, stored in flash or other non-volatile memory, etc. Controller interface 382, for example, may be coupled to controller 164 of FIG. 9, which may then control the writing of data to non-volatile memory 166, and, after receipt of the entire set of update data, control the updating of the configuration of PLD 162, etc. The use of controller interface 382 to couple to a controller such as controller 164 for such purposes may be implemented in a conventional manner, as will be appreciated by those of skill in the art.

It should be appreciated that PNUT-type command protocols in accordance with the present invention may be implemented with a variety of hardware-based devices and appliances, such as cell phones, pagers, portable computers, refrigerators, freezers, etc.

Figure 18:
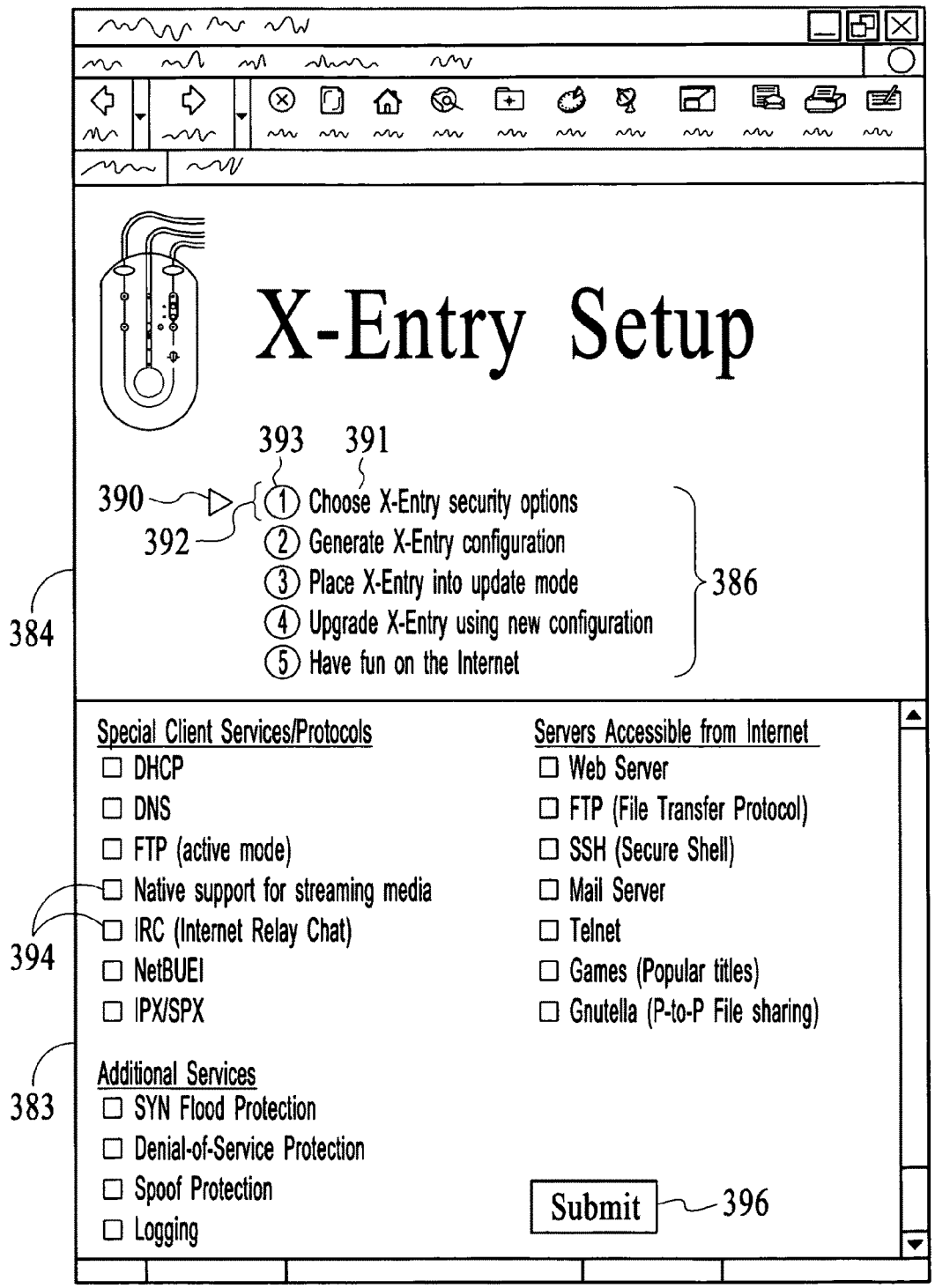
FIGS. 18-20 illustrate exemplary embodiments of browser-based GUIs of an update station, which are used in a preferred example for transmitting PNUT-type commands, such as for updating a PLD-based device.
Figure 19:
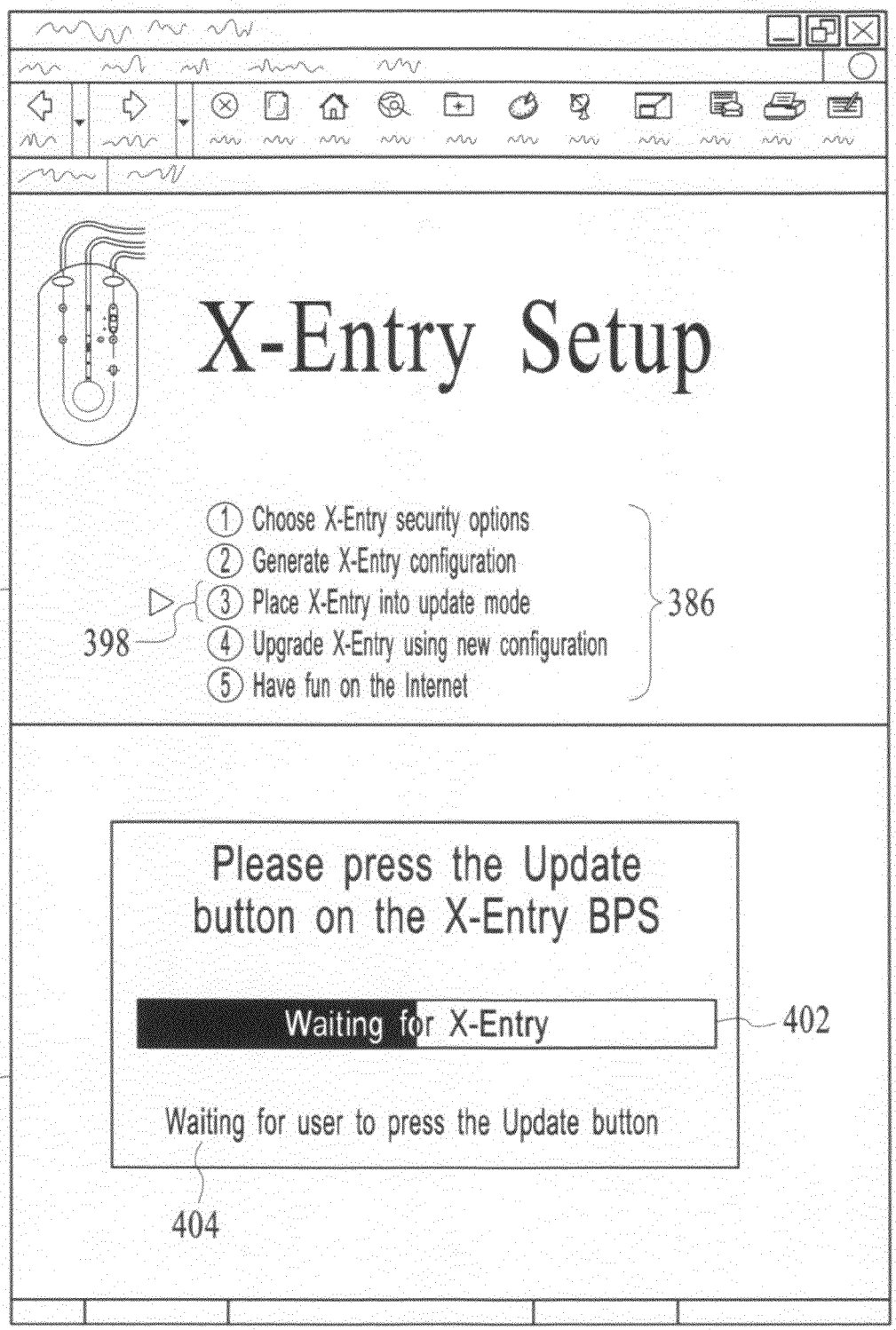
Figure 20:
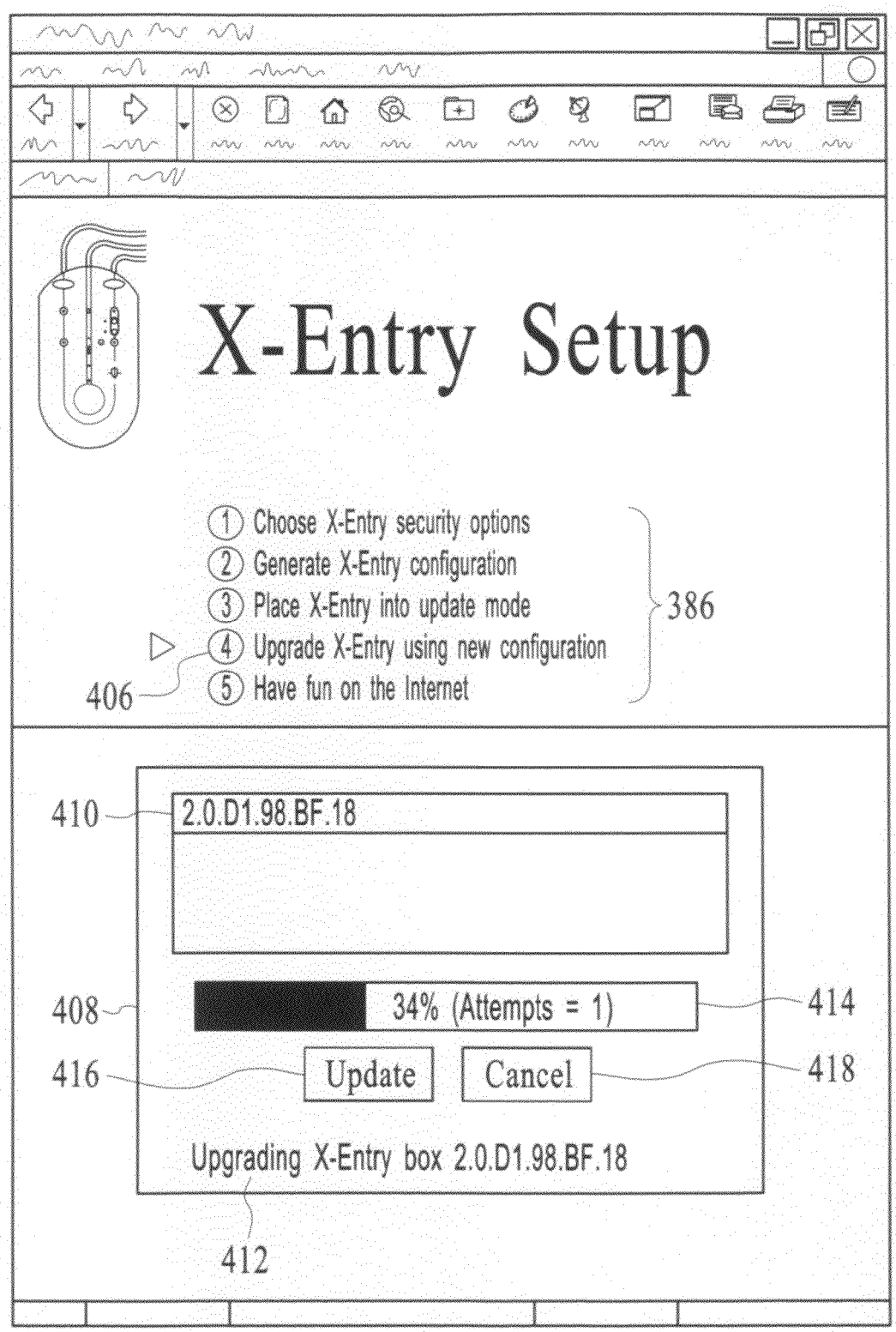

FIGS. 18-20 illustrate exemplary embodiments of browser-type Gills of an update station that may be used to update or otherwise exchange commands or information with a PLD-based device, such as data protection system 1, in accordance with PNUT-type command protocols.

With reference to FIG. 18, in an exemplary embodiment of the present invention, a PNUT-enabled device, such as data protection system 1 (referenced as an "X-Entry" system in FIGS. 18-20), may have its configuration updated by a user operating update station 274. In a preferred embodiment, browser 276 on server 272 initiates the update session by opening window 384 to instruct the user on the steps that will be performed to update data protection system 1. Preferably, this session is initiated without any communication with data protection system 1 (i.e., data protection system 1 preferably continues filtering packets until, for example, a physical button is pushed that puts data protection system 1 in an update mode, discussed further in connection with FIG. 19). In accordance with such preferred embodiments, for example, FPGA or PLD logic, etc., is configured for the packet filtering operations of data protection system 1, and thus continues providing such filtering functions until and unless a specific update command is provided to data protection system 1. The preferred physical switch requirement provides a level of security in that an external hacker would find it impossible to circumvent the physical switch, and thus the physical switch serves to prevent unauthorized persons from operating data protection system 1 in a manner to change its configuration.

Referring again to FIG. 18, for example, window 384 preferably includes update procedure list 386, which preferably provides a list of steps for the update procedures (which may provide the user with a visual display of the progress through the update procedures), and secondary window 388, which preferably specifies a plurality of security or other options that may be selected with check boxes 394. Window 384 also preferably includes update input features, such as submit button 396. The active step in update procedure list 386 is preferably indicated by pointer 390, procedure text 391 and procedure number 393, which may be displayed in a different color or colors than the other steps to convey the progress of the update procedures. The client service/protocol options may include, for example, DHCP, DNS, FTP, and IPX/SPX; server types may include, for example, Telnet, FTP, web, and mail server; and additional filtering or other services may include, for example, Spoof, SYN flood, Denial of Service protection and logging (i.e., logging of filtering events and security alerts or attacks on data protection system 1, etc.).

In an exemplary embodiment of the present invention, step 392 in update procedure list 386 preferably includes procedure text 391 and procedure number 393, which instruct the user to choose from the displayed options and press (i.e., click on) submit button 396, which (based on the selected options) initiates the generation of appropriate configuration data in order to implement the selected options. The user preferably selects the configuration options on browser 276 and presses submit button 396. After the user presses submit button 396, the next step in update procedure list 386 is indicated by browser 276, notifying the user that the updated configuration data is being generated. In preferred embodiments of the present invention, pointer 390 moves down update procedure list 386 during the update process to indicate the active step in update procedure list 386. Secondary window 388 may also change to include group boxes with option buttons, dialog boxes with status bars, pull-down menus with lists of options, etc. After submit button 396 has been pressed, update station 274 generates the new configuration data, which preferably is saved to the file system and/or stored in RAM on the update station. It should be noted that, preferably, the generated configuration data consists generally of a bit stream that may be used to configure/reconfigure the FPGA/PLD of the PNUT-enabled device. At this stage it preferably is stored as a configuration bit stream (and in a subsequent step will be packetized for transmission to PNUT-enabled device 268), although in other embodiments it may be stored in the form of PNUT-type packets that are ready for transmission to PNUT-enabled device 268.

With reference to FIG. 19, after the updated new configuration data has been generated, window 384 indicates that the user is at the next step in the procedures. For example, step 398 in update procedure list 386 instructs the user to place data protection system 1 in update mode. Preferably dialog box 400 in secondary window 388 instructs the user to press update button 176 on data protection system 1 (as illustrated in FIG. 9) and dialog box 400 preferably includes blinking status bar 402 and text message 404, which notes that update station 274 is waiting for the user to press update button 176 on data protection system 1.

As illustrated in FIG. 19, update station 274 preferably requires the user to press update button 176 on data protection system 1 (as illustrated in FIG. 9) in order to activate the update procedures. As previously explained, in preferred embodiments data protection system 1 continues to provide packet filtering operation until such time as update button 176, which preferably is a physical switch on data protection system 1, is activated by a user. After update button 176 is pressed, data protection system 1 switches into update mode, and in preferred embodiments reconfigures the PLD/FPGA code to engage in PNUT-type communications. While the PLD/FPGA device (or devices) included in data protection system 1 may contain sufficient logic to implement the packet filtering functions and the logic (receivers, parsers, dispatchers, command handlers, etc.) to engage in PNUT-type communications, in general this will not be the case. For example, in order to provide the most cost effective data protection system, sufficient logic may be included in the PLD/FPGA device(s) to implement the desired filtering operations, but not the logic for the PNUT communication protocol (the PNUT communication protocol in general will be utilized when the data protection system is not filtering packets and the PNUT communication protocol will not be needed when the data protection system is filtering packets, etc.). Thus, in such embodiments, activation of the update button preferably causes data protection system 1 to configure itself to engage in PNUT communications, while preferably stopping packet filtering (and stopping external packets from entering the internal network, etc.). In alternate embodiments, sufficient logic in one or more PLD/FPGA devices is included, such that PNUT-enabled device 268 does not need to be reconfigured in order to engage in PNUT communications, etc.

Preferably, after data protection system 1 has configured itself and otherwise entered the operation mode for engaging in PNUT communications, data protection system 1 preferably illuminates LED 218 indicating that data protection system 1 is in an update-enabled status (illustrated in FIG. 10), and preferably transmits a data packet containing command data via network 270 to update station 274. After data protection system 1 sends a command packet to update station 274 (see, e.g., FIG. 15 for exemplary initial packet exchanges that may occur between a PNUT server and a PNUT-enabled device, which may serve to identify the particular PNUT-enabled device and the command protocol/format for the particular PNUT-enabled device, etc.), update station 274 receives the packet and then preferably displays window 384 in order to initiate the process of transmitting the new configuration data/bit stream to data protection system 1.

As illustrated in FIG. 20, window 384 indicates that the user is at another step in the procedures. For example, step 406 in update procedure list 386 instructs the user to press update button 416 in dialog box 408. Activation of button 416 preferably is required before the update station begins the process of transmitting the configuration data packets/bit stream to data protection system 1. Dialog box 408 preferably includes field 410, text message 412, status bar 414, update button 416, and cancel button 418. With the update in process, field 410 preferably displays the ID or serial number of data protection system 1. Text message 412 may also notify the user that the updating of the configuration of data protection system 1 is in progress. Status bar 414 may also indicate the number of attempts to transfer new configuration data, the percentage of successfully transferred data, and the estimated time to complete the file transfer to data protection system 1.

In a preferred embodiment of the present invention, the user preferably presses update button 416 and update station 274 transmits packets containing the configuration data bit stream in an update packet op code format, which is followed by a single, last update packet. Upon receipt of the first packet, data protection system 1 preferably transmits a signal to update-enabled LED 218 to flash, which indicates that the update process is actively in process. Prior to transmission of the last update packet, if the user presses cancel button 418, then update station 274 transmits an update cancel command to data protection system 1. Update station 274 preferably transmits the update cancel command up to a predetermined number of times, such as 5 times. If the last packet has been received by data protection system 1, then data protection system 1 preferably transmits a packet to update station 274 confirming receipt of the last packet (see FIG. 15 for an exemplary packet sequence that may be followed). Preferably data protection system 1 then processes the configuration data bit stream from the update packets, which may include a decompression, decryption, checksum check, etc., in order to ensure that the configuration data/bit stream is validated. If an error is detected, then an error packet preferably is sent from data protection system 1 to update station 274, and preferably update-failed LED 220 is illuminated (see FIG. 10). If no error is detected, then data protection system 1 preferably proceeds to load the new configuration data/bit stream, and upon "bootup" proceeds to operate in accordance with the new configuration. Preferably, ready LED 216 is illuminated, indicating that data protection system 1 is operating properly in accordance with the new configuration and thus indicates that the update procedure has been successfully concluded.

In alternate embodiments of window 384 of update station 274, other conventional visual, tactile and audio controls may be implemented for the GUI design in accordance with the present invention, including various tabs, buttons, rollovers, sliders, check boxes, dialog boxes, cascading menus, touch buttons, pop-up windows, drop-down lists, text messages, scroll bars, status bars, and time indicators, etc. Buttons may also appear in a plurality of button states, such as normal, selected, default, and unavailable.

Figure 21:
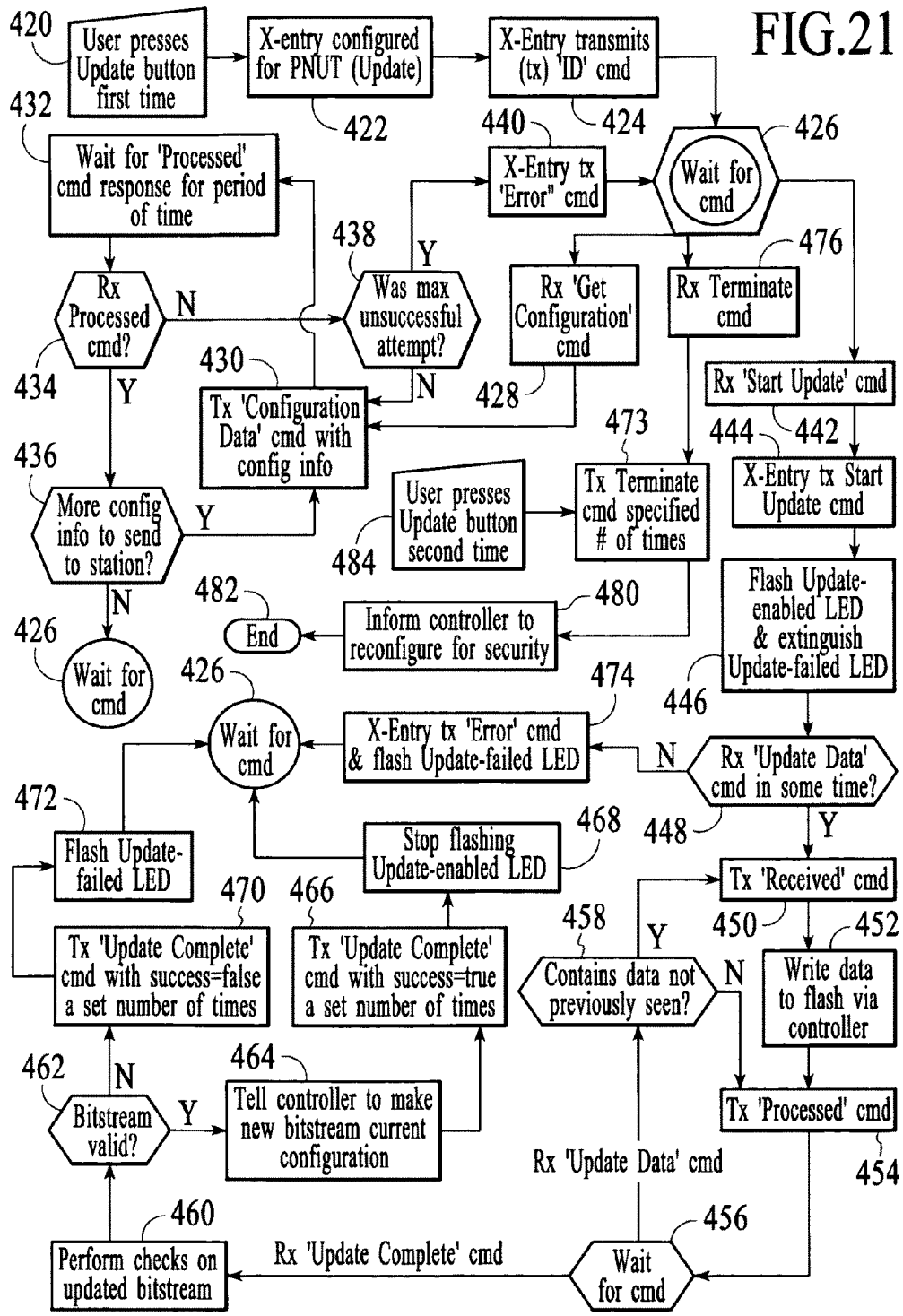
FIG. 21 is a flowchart illustrating an exemplary embodiment of the use of PNUT-type commands by a PLD-based device, such as a data protection system 1.

FIG. 21 represents a flowchart illustrating an exemplary embodiment of the use of PNUT-type commands by a PLD-based device, such as data protection system 1, in accordance with the present invention. At step 420 the user preferably presses update button 176 of data protection system 1 (as illustrated in FIG. 9). At step 422, data protection system 1 is configured for PNUT-type commands (e.g., the PLD/FPGA may be reconfigured from packet filtering to PNUT-type communications, as previously described) and update-enabled LED 218 preferably is illuminated indicating data protection system 1 is ready to update (and ready LED 216 preferably is extinguished). At step 424, data protection system 1 preferably sends ID command 280 to update station 274 (which preferably identifies data protection system 1, such as described elsewhere herein), then proceeds to step 426. At step 426, data protection system 1 preferably waits for the next command from update station 274. At step 428, data protection system 1 preferably receives get configuration command 282 (as discussed in connection with FIG. 15) from update station 274, then proceeds to step 430, where data protection system 1 preferably transmits configuration data command 284 with new configuration information to update station 274 (as illustrated and described in relation to FIG. 15). At step 432, after having transmitted configuration data command 284, data protection system 1 preferably waits for processed command 286 from update station 274 for a specified time interval (as also illustrated in FIG. 15). At step 434 data protection system 1 receives processed command 286, then preferably proceeds to step 436, where data protection system 1 determines if more configuration information must be sent to update station 274. If more configuration information must be transmitted to update station 274, then data protection system 1 preferably returns to step 430 and transmits configuration data command 284 to update station 274. However, if data protection system 1 does not need to transmit more configuration information at step 436, then data protection system 1 preferably proceeds to step 426 and waits for a command from update station 274. The configuration information transmitted from data protection system 1, as discussed in connection with FIG. 15, preferably provides information that defines the PNUT-type command protocols/formats for the commands that the particular PNUT-enabled device, e.g., data protection system 1, in accordance with which the PNUT-enabled device operates. Thus, update station 274 and data protection system 1 may engage in PNUT-type communications based on the particular commands, core or custom, that are supported by the particular PNUT-enabled device.

If, on the other hand, in accordance with the present invention, data protection system 1 does not receive processed command 286 in the specified time interval at step 434, then data protection system 1 preferably proceeds to step 438. At step 438, data protection system 1 preferably determines whether processed command 286 was successfully received within the maximum number of attempts allowable. If data protection system 1 received processed command 286 within the maximum number of allowable attempts, then data protection system 1 proceeds to step 430. However, if data protection system 1 did not receive processed command 286 within the maximum number of allowable attempts, then data protection system 1 proceeds to step 440. At step 440, data protection system 1 preferably transmits error command 364 (as described in connection with FIG. 17) and proceeds to step 426, where data protection system 1 waits for a command from update station 274.

In accordance with the present invention, at step 442 data protection system 1 preferably receives start update command 292 from update station 274 (as illustrated in FIG. 15), then proceeds to step 444. At step 444, data protection system 1 preferably transmits start update command 292, then proceeds to step 446. At step 446, update-enabled LED 218 on data protection system 1 preferably is flashed and update-failed LED 220 is extinguished (as illustrated in FIG. 10) and data protection system 1 then proceeds to step 448. At step 448, data protection system 1 preferably receives update data command 296 from update station 274 in a specified time interval (as illustrated in FIG. 15). If data protection system 1 does not receive update data command 296 from update station 274 at step 448, then data protection system 1 proceeds to step 474, where data protection system 1 preferably transmits error command 364 and sends a signal to flash update-failed LED 220 on data protection system 1 (as described in connection with FIG. 10). Data protection system 1 then proceeds to step 426 and waits for a command from update station 274.

At step 448 if data protection system 1 receives update data command 296 in accordance with the present invention, then data protection system 1 proceeds to step 450 and preferably transmits received command 298 to update station 274 (as illustrated in FIG. 15). At step 452, data protection system 1 preferably writes new command data to flash (or other non-volatile memory) via controller 164 (see FIG. 9), then proceeds to step 454. At step 454, data protection system 1 preferably transmits processed command 300 to update station 274, then proceeds to step 456. At step 456, data protection system 1 waits for a command from update station 274. As explained earlier, data protection system 1 may receive a plurality of update data commands 296, 302, etc. from update station 274 in order for the desired amount of configuration data/bit stream to be transmitted in a plurality of packets. For example, if update station 274 does not receive an update data command from data protection system 1 in a predetermined or other amount of time, then update station 274 preferably retransmits an update data command to data protection system 1 a predetermined or other amount of time, such as 5 seconds, until data protection system 1 acknowledges the command with a received command. Thus, at step 458 upon receipt of update data command 296, 302, etc. from update station 274, data protection system 1 preferably determines whether update data command 296, 302, etc. contains data not previously received. If data protection system 1 recognizes new data in update data command 296, 302, etc., then data protection system 1 proceeds to step 450, where data protection system 1 preferably retransmits received command 298, 304, etc. to update station 274. If, on the other hand, data protection system 1 does not recognize new data in update data command 296, 302, etc., then data protection system 1 preferably proceeds to step 454, where data protection system 1 retransmits processed command 300, 306, etc. to update station 274.

With further reference to FIG. 21, in accordance with the present invention, if data protection system 1 receives update complete command 308 from update station 274 (as illustrated in FIG. 15.), then data protection system 1 performs checks on the updated configuration data/bitstream at step 460; data protection system 1 then proceeds to step 462. At step 462, data protection system 1 determines if the bitstream from update station 274 is valid (for example, data protection system 1 may perform a checksum or other check to ensure that the data for reconfiguring the PLD/FPGA has been completely and accurately received). If the bitstream has been determined to be valid, then data protection system 1 proceeds to step 464, where data protection system 1 preferably notifies the controller to make or indicate the newly-received configuration/bitstream (which preferably has been stored in non-volatile memory) is valid, such as by setting flag or other indicator that the bitstream is valid. Data protection system 1 then proceeds to step 466, where data protection system 1 preferably transmits update complete command 310 with successful code a specific number of times to update station 274 (as illustrated in FIG. 15). At step 468, data protection system 1 preferably terminates flashing update-enabled LED 218 (as illustrated in FIG. 10) and proceeds to step 426, where data protection system 1 waits for a command from update station 274.

However, if the bitstream is invalid at step 462, then data protection system 1 proceeds to step 470, where data protection system 1 preferably transmits update complete command 310 with unsuccessful code to update station 274. In accordance with the present invention, window 384 in browser 276 of update station 274 (as illustrated in FIG. 18) preferably indicates that the update session failed. The user preferably presses update button 176 again to cancel and reset data protection system 1. (In an alternate embodiment, if data protection system 1 is unsuccessful after receiving update complete command 308 for the final update packet, update station 274 preferably transmits a last packet a specified number of times and informs the user via browser 276 that the update was unsuccessful.) Data protection system 1 then proceeds to step 472, where data protection system 1 sends a signal to flash update-failed LED 220 (as described in connection with FIG. 10). Data protection system 1 then proceeds to step 426, where data protection system 1 preferably waits for a new start update command 292 from update station 274. As explained earlier, preferably after data protection system 1 transmits start update command 292, data protection system 1 may continually flash update-enabled LED 218 until the successful completion of the update. Upon receipt of a new start update command 292 (at step 442), data protection system 1 transmits start update command 294 to update station 272 (at step 444) and then preferably extinguishes update-failed LED 220 (at step 446).

If all commands are received and successfully written to nonvolatile memory or storage, such as flash, EPROM, hard drive, or battery backed-up RAM, etc., then data protection system 1 may be rebooted or configured using the new configuration bitstream. At step 476, data protection system 1 preferably receives terminate command 358 (as described in connection with FIG. 17) and proceeds to step 478. At step 478, data protection system 1 preferably transmits terminate command 358 to update station 274 a specified number of times, then proceeds to step 480. At this time the user is preferably notified in browser 276 that the update procedure was successful. At step 480, data protection system 1 preferably informs the controller that it should reconfigure the PLD/FPGA using the new configuration bitstream, which upon completion reconfigures data protection system 1 in order to once again filter packets and provide data security, but based on the new configuration bitstream transmitted during the PNUT communication session. Visual feedback of the successful completion of the PLD/FPGA configuration preferably is given via illumination of ready LED 216. At step 482, the process has ended.

In accordance with alternative embodiments of the present invention, the user may also initiate loading of the new configuration bitstream by pushing the update button a second time. At step 484, the user may press update button 176 of data protection system 1 and data protection system 1 may then proceed to step 478. At step 478, data protection system 1 preferably transmits terminate command 358 to update station 274 a specified number of times, then proceeds to step 480. Again, at step 480, data protection system 1 preferably informs the controller that it should reconfigure the system to provide data security in accordance with the new configuration bitstream, and then the process ends at step 482.

In yet another alternative embodiment, data protection system 1 continues sufficient non-volatile memory to retain the previous configuration bitstream as well as the new configuration bitstream. In accordance with such embodiments, if the loading of the new configuration bitstream does not result in the expected operation, the user may, for example, depress and hold for a predetermined duration reset button 182 (see FIG. 10), which will cause data protection system 1 to reconfigure using the previous configuration bitstream. Still alternatively, in other embodiments in an initial step data protection system 1 transmits the current configuration bitstream using PNUT commands from data protection system 1 to update station 274, which stores the current configuration bitstream prior to sending the updated configuration bitstream to data protection system 1.

As will be appreciated, implementing PNUT protocols with PLD-based devices will allow paralleling, wherein multiple processes can be executed simultaneously, producing faster network communication than conventional systems. It should also be understood that the present invention is not limited to this update configuration, for alternative embodiments of the PNUT-type commands may be implemented. Moreover, it should further be understood that PNUT protocols are not limited to a single application, as exemplified with updating data protection system 1, but can support a variety of applications, including filtering, logging, polling, testing, debugging, monitoring, etc.

Figure 22:
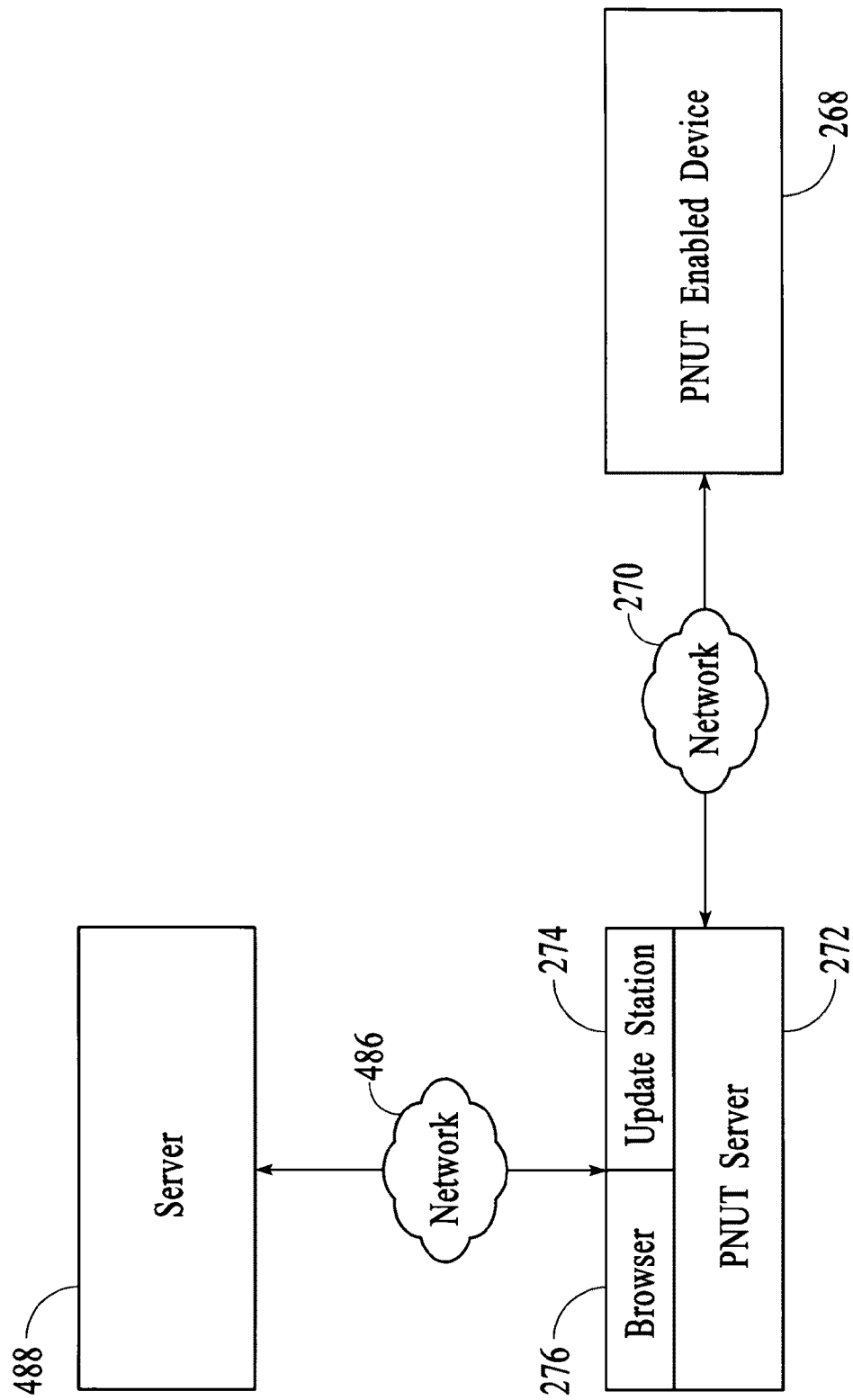
FIG. 22 illustrates an alternate embodiment of a network configuration, such as for updating a PLD-based device on one network with a PNUT command library located on another network.

FIG. 22 illustrates an alternate embodiment of a PLD-based device connected to one server, which is preferably networked to another server for downloading custom and/or core command data. Update station 274 on server 272 may be coupled to network 486, which may be a LAN, WAN, Internet, etc., which in turn is coupled to server 488. In this embodiment, during a communication session PNUT-enabled device 268 preferably transmits one or more configuration data packets, which includes configuration data command 284 that includes a URL or other file location identifier. In accordance with such embodiments, PNUT-enabled device 268 does not send its command protocols/formats to update station 274, but instead sends information from which the location of its command protocols/formats may be determined. This indication may be direct (such as via a URL or other location identifier), or indirect (such as via an ID number for the PNUT-enabled device, which update station 274 may "map" to the URL or other locations identifier). Thus, in accordance with such embodiments, PNUT-enabled device 268 may convey the location (or information from which the location may be determined) where update station 274 may go to obtain the commands and command protocols that are supported or applicable for the particular PNUT-enabled device (which may then be downloaded by update station 274). Thus, the command list and command protocols need not be conveyed via packet transmission from PNUT-enabled device 268 to update station 274 as with other embodiments, but instead update station 274 may go to the specified location to obtain the commands and command protocol information.

Alternatively, PNUT-enabled device 268 may transmit a unique ID number or serial number, which is mapped to the command list and command protocol information, which may reside in a command library on update station 274. What is important is that update station 274 be able to obtain the command list and command protocols for the particular PNUT-enabled device 268 in order to be able to exchange update or other commands with PNUT-enabled device 268 using the commands/command protocols supported by PNUT-enabled device 268. In preferred embodiments, update station 274 need only obtain custom command protocols/formats, as in such embodiments the core commands are common to all (or many) PNUT-enabled devices and are already known to update station 274.

FIG. 23 illustrates an exemplary embodiment of how a PNUT-enabled device may convey the command protocol/format information for PNUT-type commands with a standard formatting specification, such as XML (Extensible Markup Language). The configuration data, or command list and protocols/formats, of PNUT-type commands preferably specifies PNUT custom commands, not core commands (again, core commands preferably are common to all or many PNUT-enabled devices and are known to the update station, although in other embodiments core command information also could be conveyed in the same manner as the custom commands). Configuration data also preferably comprises a plurality of types of data (such as number values, URLs, device descriptions, versioning information, various attributes, etc.) and describes the structure of messages, what values are acceptable, which fields are status flags, and what status flag values mean in descriptive terms. Likewise, configuration data of PNUT-type commands may also contain data on device types and device images (showing current and previous states of LEDs, buttons, etc.).

In preferred embodiments of the present invention, the configuration data of PNUT commands may be implemented with a standard formatting specification, such as XML (Extensible Markup Language). As will be apparent to one skilled in the art, XML is a universal and extensible formatting specification that uses a rules-based classification system. A standard formatting specification, such as XML, may be used to describe all of the PNUT packets and the format of the core and custom PNUT-type commands. As explained earlier, since the order of PNUT-type commands is important to optimal implementation, preferably the order in which PNUT-type commands are placed into XML should show up in the message.

With reference to FIG. 23, in an exemplary embodiment of the present invention, PNUT configuration data (command protocols, formats, etc.) are preferably implemented with XML code 492. In accordance with the present invention, <msg> tag 494 serves as a type of XML tag. As apparent to one skilled in the art, XML provides customizable grammar. For example, <msg> tag 494 may be customized according to developer needs in accordance with PNUT-type commands. XML tags are comprised of attributes and values. For example, in <msg> tag 494, the attribute id at 496 has a value of "128." It is important to note that in preferred embodiments the attribute id is the PNUT op code.

In accordance with the present invention, PNUT command names provide an indirect look-up mechanism that is independent of the op code. Update start command 498, for example, is a PNUT command name that is preferably formatted as "UPDATE_START_CMD."

Each command preferably includes <desc> tag 502, which includes description 504. For example, update start command 498 preferably is described as "Start PNUT update." In accordance with the present invention, descriptions may be preferably printed out as messages in a log file or in a dialog box. This allows application code that communicates with PNUT-based devices to generate user messages through a data driven approach.

As will be apparent to one skilled in the art, it is common in network applications to issue a command and then receive a response about whether the command was successful or not. PNUT protocols provide support for describing a status field within a message using the <status> tag. The <status> tag will have a success attribute that specifies the field value when the command was successful. Additionally, a tag will contain two or more <desc> tags that describe each acceptable value and a descriptive string specified as XML TEXT. (It is not strictly a requirement that all acceptable values must be specified using <desc> tags.) For example, update complete command 513 has an attribute id of "136." Status success field 514 of update complete command 513 contains a plurality of event description values 518, each of which is preferably comprised of value 520 and text description 522. Thus, event description value 518 of status success field 514 includes the value "2" (as indicated at value 520) and the text string "Flash write failure" (as indicated at text description 522). In accordance with the present invention, text description 522 may preferably be printed in a dialog box or logged as "PNUT update could not be completed because of a Flash write failure."

It should be appreciated that in preferred embodiments of the present invention, XML code used for PNUT-type commands preferably includes a plurality of tags (e.g., <msg>, <desc>, <bytes>, <status>, etc.) and a plurality of attributes (e.g., attribute id, attribute name, attribute byte size, attribute minimum byte size, attribute maximum byte size, etc). Furthermore, minimum values (e.g. minimum size 506) and maximum values (e.g. maximum size 508) may be preferably implemented to dynamically define all legal values or specify a type of regular expression. It should be noted that tags, attributes and other specifics illustrated in FIG. 23 are exemplary; what is important is that an expedient way be provided for PNUT-enabled devices to convey the command protocol/format information to an update station, and XML has been determined to be particularly appropriate for this task. It should be further appreciated that in preferred embodiments of the present invention, configuration data as formatted in a standard formatting specifications, such as XML, may be compressed.

Figure 24:
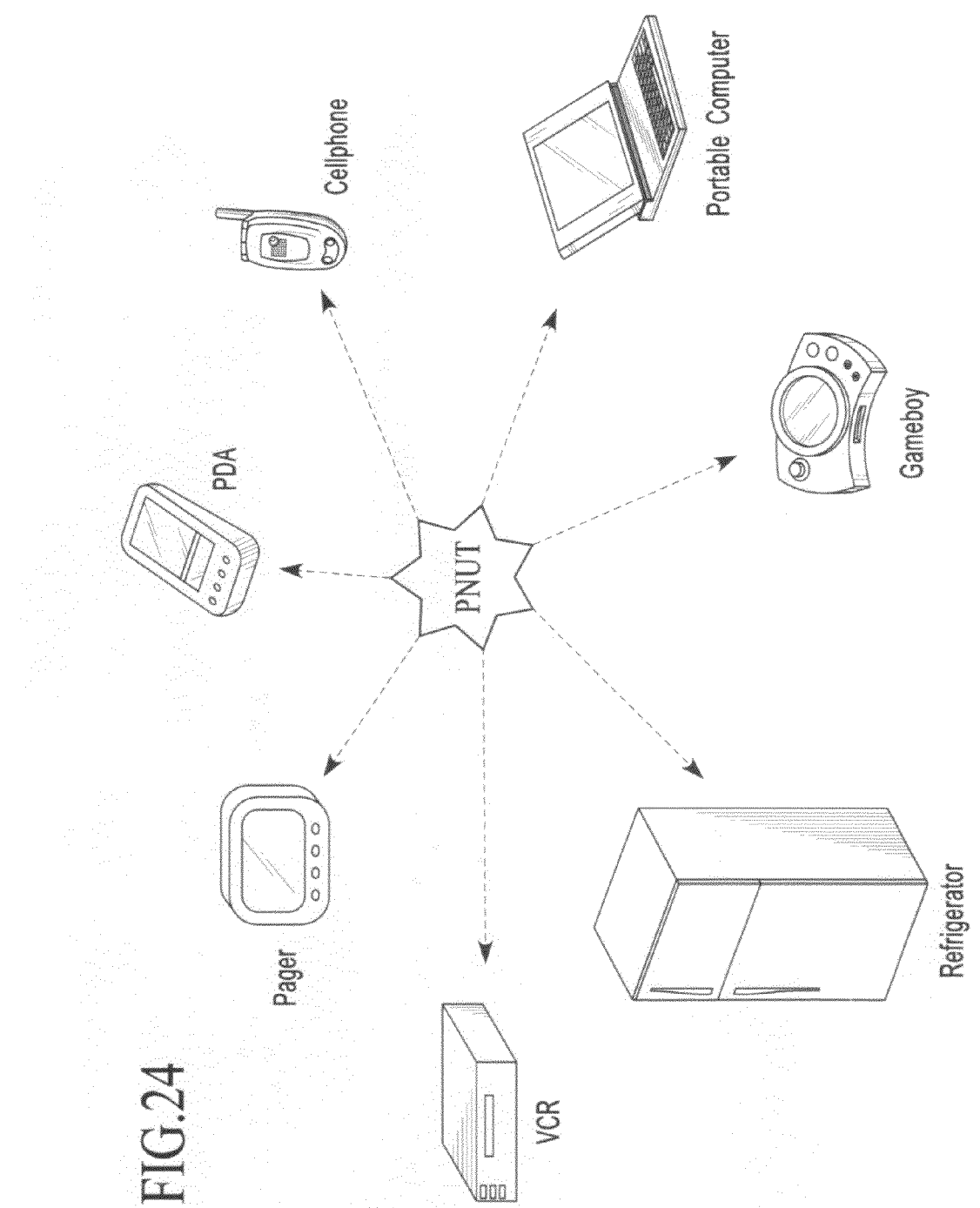
FIG. 24 is an illustration of a plurality of exemplary PLD-based devices and appliances, which may exchange PNUT-type commands in accordance with the present invention.

With reference to FIG. 24, PNUT protocols may be used with data protection system 1 and a variety of other devices that may be connected to the network but do not require or implement the full TCP/IP stack. FIG. 24 illustrates other exemplary devices and appliances that may be used with PNUT protocols in accordance with the present invention. These exemplary devices suggest the range of possible home and office appliances that are PLD-based and may utilize PNUT-type commands in accordance with the present invention for networking to a computer or other PLD-based devices. These devices preferably include: common telecommunications devices, such as pagers, cell phones, PDA's, and WAP phones; common office equipment, such as faxes, photocopiers, printers, desktop and laptop computers; common home appliances, such as freezers, refrigerators, washers, dryers, microwaves, and toaster ovens; and common entertainment equipment, such as radios, televisions, stereo systems, VCRs, handheld video games (e.g., Nintendo Gameboy™), and home video game systems (e.g., Sony Play Station™), etc. Thus, the present invention may support multiple physical layer connections and a wide variety of functions across networks, such as filtering, updating, monitoring, logging, polling, testing, and debugging, etc.

In accordance with the present invention, PNUT-type commands are also useful for transmitting and receiving a plurality of types of data, such as bar code, magnetic card reader, weight, temperature, movement, size, light, color, speed, pressure, friction, elevation, thickness, reflectivity, moisture, camera feed, mouse movement, success/failure rates, etc.

In accordance with the present invention, communication can also occur between PNUT-enabled devices without a PNUT station. For example, a user may connect a PDA to a LAN to update a file on a desktop computer connected to the same LAN using PNUT-type commands. In another embodiment of the present invention, a user may store digital images from a camera to a storage device via a LAN connection. In another embodiment, a user may monitor the temperature of a cell biology database stored in a −80 freezer with a PDA connected to the same LAN, but located in a different building. Thus, PNUT-enabled devices may communicate across a network without a PNUT station.

In accordance with the present invention, PNUT protocols alleviate the currently common problem of "versioning," wherein software applications change with each updated version, but still must interoperate with earlier versions without corrupting the data. In accordance with preferred embodiments, before data protection system 1 or another PLD-based device initiates a communication session with update station 274, update station 274 issues a message requesting data identifying the system's capabilities, particularly the command list and/or command protocol supported or recognized by the system or device. Preferably data protection 1 (or other device) then responds by transmitting a packet containing a description of its capabilities and commands, or alternatively with the location where the command list/protocols may be found, or still alternatively with an ID number, serial number or other identifier that may be used to determine the command list/protocols. For instance, the capabilities may include speeds, device addresses, buffer sizes, etc., whereas the command descriptions may contain message ID, name, size, URL, state machine data (which may dictate the message passing protocol), etc. Upon receiving the packet with capabilities and command descriptions, update station 274 then preferably utilizes this data to generate a set of message formats, which ensure that messages are in their proper formats for the particular PNUT-enabled device, and version information, which ensures the proper communication codes. As previously described, the description data may also include a URL that points to a database that stores and retrieves the description data, thus reducing the processing and storage requirements of a PLD network update transport device. This data may be uploaded in much the same way a printer may upload device drivers during its installation and connection to a computer.

In alternate embodiment of the present invention, PNUT update station 274 on server 272 may be implemented with an Access Control List (ACL). For example, in accordance with the present invention, update station 274 receives the data packet containing the ID number from a PNUT-enabled device, such as data protection system 1, and matches this ID number to a corresponding number in its ACL. If the ID number matches one of the ID numbers in the ACL, then update station 274 preferably communicates with the device. If the ID number of PNUT-enabled device 268 does not match one of the ID numbers in the ACL, then update station 274 terminates the communication session.

In accordance with the present invention, UDP checksum does not require being set, allowing UDP headers to be pre-computed regardless of the data packets transmitted. Ethernet checksum, for example, then may then serve to catch transmittal errors. Since PNUT-enabled devices pre-compute IP and UDP headers, the design is compact. It should be noted that headers may have to be modified if the PNUT packet length is set by a command to a value other than the default length.

PNUT protocols are independent of UDP and therefore do not need to be implemented on UDP. In alternate embodiments, PNUT protocols may preferably be encapsulated within TCP, IP, or at the link layer, such as Ethernet, IPX or Bluetooth. For example, if PNUT protocols are encapsulated within TCP, then they preferably would include alternate commands, such as sequence and acknowledgment bit sets for three-way handshakes. Thus, communication across the transport layer with PNUT would be more reliable and require end-to-end error detection and correction.

In an alternate embodiment of the present invention, PNUT protocols may also be broadcast over the Internet. Such an implementation would require using predefined multicast addresses, assigning IP addresses to PNUT-enabled devices, or using a PNUT station as an Internet gateway. For example, a PNUT station may act as a gateway because the server has an IP address. Therefore, gateways, such as a plurality of PLD-based devices on a plurality of networks, may preferably communicate with each other, integrating PNUT-type commands into other network protocols (e.g., Jini, CORBA, HTTP, DCOM, RPC, etc.). Thus, PNUT protocols may reduce the amount of data required to operate and communicate across networks.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A method for updating the configuration of a programmable packet filtering device operating to filter packets received from a packet-based network, wherein filtering rules are used to determine whether a packet is to be junked, comprising the steps of:
   operating the packet filtering device in accordance with first configuration data, wherein, in accordance with the first configuration data, the packet filtering device receives packets including at least first packets from the network, processes the first packets based on the filtering rules, and transmits the processed first packets to an electronic connection coupled to the packet filtering device, wherein the packet filtering device filters the first packets at least in part based on source or destination address information and based on the first configuration data;
   receiving second configuration data for the packet filtering device sent from a computing system, wherein the second configuration data is selectively received by the packet filtering device, wherein the second configuration data are different from the first configuration data;
   loading the second configuration data into the packet filtering device; and
   operating the packet filtering device in accordance with the second configuration data, wherein, in accordance with the second configuration data, the packet filtering device receives packets including at least second packets from the network, processes the second packets based on the filtering rules, and transmits the processed second packets to the electronic connection coupled to the packet filtering device, wherein packet filtering device filters the second packets at least in part based on source or destination address information and based on the second configuration data;
   wherein a determination is made as to whether each second packet will be junked, wherein bits are changed or data is truncated in a manner such that the second packet is corrupted or rendered invalid or unacceptable.

2. The method of claim 1, further comprising the step of, after receipt of the second configuration data, storing the second configuration data in non-volatile memory coupled to the packet filtering device.

3. The method of claim 2, wherein the non-volatile memory comprises Flash memory, electrically erasable and programmable read only memory or battery-backed-up random access memory.

4. The method of claim 1, wherein the step of receiving second configuration data for the packet filtering device sent from the computing system is selectively performed based on version identification information for the packet filtering device provided from the packet filtering device to the computing system.

5. The method of claim 4, wherein the version identification information is used to determine an identification of the second configuration data that are to be received by the packet filtering device.

6. The method of claim 1, wherein the second configuration data are stored in a location remote from the packet filtering device.

7. The method of claim 6, wherein the location comprises storage coupled to the computing system.

8. The method of claim 6, wherein the location comprises storage on a second network, wherein the computing system accesses the storage via the second network.

9. The method of claim 1, wherein the packet filtering device does not implement a TCP/IP stack.

10. The method of claim 1, wherein the packet filtering device comprises an FPGA.

11. The method of claim 1, wherein the packet filtering device comprises an Internet security system.

12. The method of claim 11, wherein the Internet security system comprises a firewall system.

13. The method of claim 12, wherein the firewall system filters packets received from a second network.

14. The method of claim 1, wherein the packet filtering device comprises programmable logic having at least a first logic portion and a second logic portion, wherein, in response to loading of the second configuration data, the second logic portion is reconfigured and the first logic portion is not reconfigured.

15. A method for updating the configuration of a programmable logic device-based packet filtering system ("packet filtering device") operating to filter packets received from a packet-based network, wherein filtering rules are used to determine whether a packet is to be junked, wherein the packet filtering device is one of a plurality of packet filtering devices coupled to receive packets from the network, comprising the steps of:
   operating the packet filtering device in accordance with first configuration data, wherein, in accordance with the first configuration data, the packet filtering device receives packets including at least first packets from the network, processes the first packets including at least a filtering operation based on the filtering rules, and transmits the processed first packets to an electronic connection coupled to the packet filtering device, wherein the packet filtering device processes the first packets at least in part based on source or destination address information and based on the first configuration data;
   receiving second configuration data for the packet filtering device sent from a computing system over the network, wherein the second configuration data is selectively received via one or more second packets via the network, wherein the second configuration data are different from the first configuration data;
   loading the second configuration data into the packet filtering device; and
   operating the packet filtering device in accordance with the second configuration data, wherein, in accordance with the second configuration data, the packet filtering device receives packets including at least third packets from the network, processes the third packets including at least a filtering operation based on the filtering rules, and transmits the processed third packets to the electronic connection coupled to the packet filtering device, wherein packet filtering device processes the third packets at least in part based on sources or destination address information and based on the second configuration data; wherein a determination is made as to whether each third packet will be junked, wherein bits are changed or data is truncated in a manner such that the third packet is corrupted or rendered invalid or unacceptable.

16. The method of claim 15, wherein after receiving each of the one or more second packets, the packet filtering device saves a portion of the second configuration data from the one or more second packets in non-volatile memory coupled to the packet filtering device.

17. The method of claim 16, wherein the packet filtering device saves a portion of the second configuration data in the non-volatile memory coupled to the packet filtering device from each of the one or more second packets prior to sending at least a fourth packet acknowledging receipt of a corresponding one of the one or more second packets.

18. The method of claim 16, wherein, after receipt by the computing system of a fourth packet that acknowledges receipt by the packet filtering device of a final second packet, the computing system sends at least a fifth packet to the packet filtering device, wherein, in response to the fifth packet, the packet filtering device saves one or more data indicating that all of the second configuration data have been received and stored in the non-volatile memory.

19. The method of claim 15, wherein the second configuration data is loaded into the packet filtering device in response to a user command from a user.

20. The method of claim 19, wherein the user command comprises a command input by a switch.

21. The method of claim 20, wherein the switch comprises a physical switch on the packet filtering device.

22. The method of claim 21, wherein the user command comprises a command entered via the computing system.

23. The method of claim 15, wherein one or more display devices provide visual feedback of the status of the packet filtering device.

24. The method of claim 23, wherein the one or more display devices comprise one or more LEDs.

25. The method of claim 23, wherein the one or more display devices comprise a liquid crystal display.

26. The method of claim 15, wherein at least certain of the packets sent by the computing system comprise broadcast packets having a predetermined address that are directed to a first predetermined port.

27. The method of claim 15, wherein at least certain of the processed first packets transmitted by the packet filtering device comprise packets having a predetermined source address that are directed to a first predetermined port.

28. The method of claim 15, wherein the packet filtering device comprises a device selected from the group consisting of a PDA, a mobile telephone, a portable computer, a game system, a household appliance, a video recording system and a paging device.

29. The method of claim 15, wherein the packet filtering device operates in accordance with a first set of filtering rules based on the first configuration data, wherein the packet filtering device operates in accordance with a second set of filtering rules based on the second configuration data.

30. The method of claim 15, wherein the packet filtering device transmits packets containing information identifying one or more commands to which the packet filtering device responds, wherein the information is transmitted at least in part in the form of XML code.

* * * * *